US009099286B2

(12) United States Patent
Brown et al.

(10) Patent No.: US 9,099,286 B2
(45) Date of Patent: Aug. 4, 2015

(54) COMPACT MASS SPECTROMETER

(71) Applicant: 908 Devices Inc., Boston, MA (US)

(72) Inventors: Christopher D. Brown, Los Gatos, CA (US); Kevin J. Knopp, Brookline, MA (US); Evgeny Krylov, Franklin, MA (US); Scott Miller, Malden, MA (US)

(73) Assignee: 908 Devices Inc., Boston, MA (US)

( * ) Notice: Subject to any disclaimer, the term of this patent is extended or adjusted under 35 U.S.C. 154(b) by 0 days.

(21) Appl. No.: 13/732,066

(22) Filed: Dec. 31, 2012

(65) Prior Publication Data

US 2014/0183350 A1 Jul. 3, 2014

(51) Int. Cl.
*G01N 27/62* (2006.01)
*H01J 49/00* (2006.01)

(52) U.S. Cl.
CPC .................................. *H01J 49/0031* (2013.01)

(58) Field of Classification Search
CPC ..................................... H01J 49/0013–49/0022
USPC .......................................... 250/282, 286, 290
See application file for complete search history.

(56) References Cited

U.S. PATENT DOCUMENTS

| | | | | |
|---|---|---|---|---|
| 2,939,952 A | | 6/1960 | Paul et al. | |
| 5,206,506 A | | 4/1993 | Kirchner | |
| 5,248,883 A | | 9/1993 | Brewer et al. | |
| 5,542,828 A | | 8/1996 | Grenci et al. | |
| 5,613,294 A | | 3/1997 | Ferran | |
| 6,157,031 A | | 12/2000 | Prestage | |
| 6,188,067 B1 | * | 2/2001 | Chutjian et al. | 250/292 |
| 6,336,816 B1 | | 1/2002 | Yatskov et al. | |
| 6,469,298 B1 | | 10/2002 | Ramsey et al. | |
| 6,483,109 B1 | | 11/2002 | Reinhold et al. | |
| 6,521,898 B2 | | 2/2003 | Chutjian et al. | |
| 6,753,523 B1 | | 6/2004 | Whitehouse et al. | |
| 6,762,406 B2 | | 7/2004 | Cooks et al. | |
| 6,797,950 B2 | * | 9/2004 | Schwartz et al. | 250/292 |
| 6,822,225 B2 | | 11/2004 | Xu et al. | |
| 6,933,498 B1 | | 8/2005 | Whitten et al. | |
| 7,095,013 B2 | * | 8/2006 | Bateman et al. | 250/281 |
| 7,442,920 B2 | | 10/2008 | Scheidemann et al. | |
| 7,772,546 B2 | | 8/2010 | Jackson | |
| 7,973,277 B2 | * | 7/2011 | Rafferty | 250/282 |
| 8,101,908 B2 | | 1/2012 | Senko | |
| 2003/0020013 A1 | | 1/2003 | Sakairi | |
| 2003/0141447 A1 | * | 7/2003 | Verentchikov et al. | 250/287 |
| 2004/0217279 A1 | | 11/2004 | Hobbs et al. | |
| 2004/0222374 A1 | | 11/2004 | Scheidemann et al. | |

(Continued)

FOREIGN PATENT DOCUMENTS

| | | |
|---|---|---|
| EP | 1 566 828 | 8/2005 |
| EP | 1688985 | 8/2006 |

(Continued)

OTHER PUBLICATIONS

Winchester et al., 'Emission Characteristics of a Pulsed, Radio-Frequency Glow Discharge Atomic Emission Device', 1992, Anal. Chem. 64, 2067-2074.*

(Continued)

*Primary Examiner* — Robert Kim
*Assistant Examiner* — Eliza Osenbaugh-Stewar
(74) *Attorney, Agent, or Firm* — Fish & Richardson P.C.

(57) ABSTRACT

Mass spectrometers and methods for measuring information about samples using mass spectrometry are disclosed.

27 Claims, 20 Drawing Sheets

(56) References Cited

U.S. PATENT DOCUMENTS

| | | | | |
|---|---|---|---|---|
| 2005/0258353 | A1 | 11/2005 | Berkout et al. | |
| 2006/0076482 | A1 | 4/2006 | Hobbs et al. | |
| 2006/0076483 | A1 | 4/2006 | Scheidemann et al. | |
| 2006/0097147 | A1 | 5/2006 | Anderson et al. | |
| 2007/0039241 | A1 | 2/2007 | Battke et al. | |
| 2007/0045533 | A1 | 3/2007 | Krutchinsky et al. | |
| 2008/0073510 | A1* | 3/2008 | Finlay | 250/288 |
| 2008/0128613 | A1* | 6/2008 | Buttrill | 250/287 |
| 2009/0194684 | A1 | 8/2009 | Guna et al. | |
| 2010/0072358 | A1 | 3/2010 | Jackson | |
| 2010/0078551 | A1 | 4/2010 | Loboda | |
| 2010/0148062 | A1 | 6/2010 | Wollnik et al. | |
| 2011/0005607 | A1 | 1/2011 | Desbiolles et al. | |
| 2011/0036980 | A1 | 2/2011 | Lisa et al. | |
| 2011/0121171 | A1 | 5/2011 | Clemmer et al. | |
| 2011/0127416 | A1 | 6/2011 | Campuzano et al. | |
| 2011/0127418 | A1 | 6/2011 | Thomson | |
| 2011/0127419 | A1 | 6/2011 | Thomson et al. | |
| 2011/0147581 | A1* | 6/2011 | Chen et al. | 250/282 |
| 2011/0253891 | A1 | 10/2011 | Hashimoto et al. | |
| 2011/0290648 | A1 | 12/2011 | Majlof et al. | |
| 2013/0001415 | A1 | 1/2013 | Chen et al. | |
| 2013/0015342 | A1 | 1/2013 | Steiner et al. | |
| 2013/0043382 | A1 | 2/2013 | Berkout et al. | |
| 2013/0056633 | A1 | 3/2013 | Hashimoto et al. | |

FOREIGN PATENT DOCUMENTS

| | | |
|---|---|---|
| WO | WO 94/29006 | 12/1994 |
| WO | WO 2012/025470 | 2/2012 |

OTHER PUBLICATIONS

Office Action in U.S. Appl. No. 13/732,218, dated May 3, 2013.

Whitten et al., "High-pressure ion trap mass spectrometry," *Rapid Communications in Mass Spectrometry* 18: 1749-1752 (2004).

International Search Report and Written Opinion in PCT Patent Application No. PCT/US2012/072328, dated Oct. 2, 2013.

Alberici et al., "Ambient mass spectrometry: bringing MS into the 'real world,'" Anal. Bioanal. Chem. 398: 265-294 (2010).

Albrieux et al., "Ion trajectory simulations in a high-pressure cylindrical ion trap," European J. Mass Spectrom. 16: 557-565(2010).

Amini et al., "Microfabricated Chip Traps for Ions," Atom Chips (2011).

Austin et al., "Simulations of Ion Trapping in a Micrometer-Sized Cylindrical Ion Trap," J. Am. Soc. Mass Spectrom. 17: 430-441 (2006).

Badman et al., "A Miniature Cylindrical Quadrupole Ion Trap: Simulation and Experiment," Anal. Chem. 70: 4896-4901 (1998).

Badman et al., "Miniature mass analyzers," J. Mass Spectrom. 35: 659-671 (2000).

Blain et al., "Micro Mass Spectrometer on a Chip," Sandia Report SAND2005-6838 (2005).

Brewer et al., "Planar ion microtraps," Phys. Rev. A 46(11): R6781-R6784 (1992).

Chen et al., "A Micro Ionizer for Portable Mass Spectrometers using Double-gated Isolated Vertically Aligned Carbon Nanofiber Arrays," IEEE Trans. Electron Devices 58(7): 2149-2158 (2011).

Cheung, Kerry, "Chip-Scale Quadrupole Mass Filters for a Micro-Gas Analyzer," Ph.D. Thesis, Massachusetts Institute of Technology, 2009.

Cruz et al., "Design, microfabrication, and analysis of micrometer-sized cylindrical ion trap arrays," Rev. Sci. Instrum. 78: 015107 (2007).

Falconer et al., "High Pressure Ion Detection for Miniaturized Mass Spectrometers," Presentation at 58th ASMS Conference 2010, Salt Lake City, UT, May 23, 2010.

Ferran et al., "High-pressure effects in miniature arrays of quadrupole analyzers for residual gas analysis from 10-9 to 10-2 Torr," J. Vac. Sci. Technol. A 14(3): 1258-1265 (1996).

Gao et al., "Handheld Rectilinear Ion Trap Mass Spectrometer," Anal. Chem. 78: 5994-6002 (2006).

Gao et al., "Design and Characterization of a Multisource Hand-Held Tandem Mass Spectrometer," Anal. Chem. 80 (19): 7198-7205 (2008).

Gao, Liang, "Miniaturization of the Ion Trap Mass Spectrometer," Ph.D. Thesis, Purdue University, 2009.

Goeringer et al., "Theory of High-Resolution Mass Spectrometry Achieved via Resonance Ejection in the Quadrupole Ion Trap," Anal. Chem. 64: 1434-1439 (1992).

Hadjar et al., "High-efficiency cross-beam magnetic electron-impact source for improved miniature Mattauch-Herzog mass spectrometer performance," Rev. Sci. Instrum. 83: 064101 (2012).

Harris et al., "Transportable real-time single-particle ion trap mass spectrometer," Rev. Sci. Instrum. 76: 064102 (2005).

Harris et al., "Ambient Sampling/Ionization Mass Spectrometry: Applications and Current Trends," Anal. Chem. 83: 4508-4538 (2011).

Hood, Derrell L., "Development of a Novel Loeb-Eiber Mass Filter," M.S. Thesis, Ohio State University, 2009.

Huang et al., "Direct analysis of melamine in complex matrices using a handheld mass spectrometer," Analyst 135: 705-711 (2010).

Keil et al., "Ambient Mass Spectrometry with a Handheld Mass Spectrometer at High Pressure," Anal. Chem. 79: 7734-7739 (2007).

Kornienko et al., "Electron impact ionization in a microion trap mass spectrometer," Rev. Sci. Instrum. 70(10): 3907-3909 (1999).

Kornienko et al., "Micro Ion Trap Mass Spectrometry," Rapid Commun. Mass Spectrom. 13: 50-53 (1999).

Li et al., "Ion Trap Array Mass Analyzer: Structure and Performance," Anal. Chem. 81: 4840-4846 (2009).

March, Raymond E., "An Introduction to Quadrupole Ion Trap Mass Spectrometry," J. Mass Spectrom. 32: 351-369 (1997).

March, Raymond E., "Quadrupole Ion Trap Mass Spectrometer," Encyclopedia of Analytical Chemistry, pp. 11848-11872 (2000).

Misharin et al., "Development and characterization of a field deployable ion trap mass spectrometer with atmospheric pressure interface," Anal. Chem. 84(22): 10105-10112 (2012).

Moxon et al., "Double resonance ejection in a micro ion trap mass spectrometer," Rapid Commun. Mass Spectrom. 16: 755-760 (2002).

Moxon et al., "Analysis of Volatile Organic Compounds in Air with a Micro Ion Trap Mass Analyzer," Anal. Chem. 75: 3739-3743 (2003).

Moxon et al., "Sample pressure effects in a micro ion trap mass spectrometer," Rapid Commun. Mass Spectrom. 18: 721-723 (2004).

Orient et al., "Miniature, high-resolution, quadrupole mass-spectrometer array," Rev. Sci. Instrum. 68: 1393-1397 (1997).

Ouyang et al., "Rectilinear Ion Trap: Concepts, Calculations, and Analytical Performance of a New Mass Analyzer," Anal. Chem. 76: 4595-4605 (2004).

Pau et al., "Microfabricated Quadrupole Ion Trap for Mass Spectrometer Applications," Phys. Rev. Lett. 96: 120801 (2006).

Pau et al., "Planar Geometry for Trapping and Separating Ions and Charged Particles," Anal. Chem. 79: 6857-6861 (2007).

Peng et al., "New Approaches to Miniaturizing Ion Trap Mass Analyzers," Trends Anal. Chem. 30(10): 1560-1567 (2011).

Shiea, Jentaie, "Ionization methods for miniature mass spectrometers," Presentation at PITTCON 2012, Orlando, FL, Mar. 14, 2012.

Sokol et al., "Miniature mass spectrometer equipped with electrospray and desorption electrospray ionization for direct analysis of organics from solids and solutions," Int. J. Mass Spectrom. 306: 187-195 (2011).

Song, Qingyu, "Development of Mass Spectrometers using Rectilinear Ion Trap Analyzers," Ph.D. Thesis, Purdue University, 2008.

Syms, R.R.A., "Advances in microfabricated mass spectrometers," Anal. Bioanal. Chem. 393: 427-429 (2009).

Telrandhe, Mangesh, "Fabrication and testing of a cylindrical ion trap microarray for tunable mass spectrometers," M. S. Thesis, University of South Florida, 2004.

Van Amerom et al., "Microfabrication of Cylindrical Ion Trap Mass Spectrometer Arrays for Handheld Chemical Analyzers," Chem. Eng. Comm. 195: 98-114 (2008).

(56) References Cited

OTHER PUBLICATIONS

Wells et al., "A Quadrupole Ion Trap with Cylindrical Geometry Operated in the Mass-Selective Instability Mode," Anal. Chem. 70(3): 438-444 (1998).
Whitten et al., "High-pressure ion trap mass spectrometry," Rapid Commu. Mass Spectrom. 18: 1749-1752 (2004).
Wolfe et al., "RF amplifier optimization for improved resolution in microscale cylindrical ion traps," Presentation at 59th ASMS Conference 2011, Denver, CO, Jun. 5, 2011.
Xu et al., "Ion Trap Mass Analysis at High Pressure: A Theoretical View," J. Am. Soc. Mass Spectrom. 20: 2144-2153 (2009).
Xu et al., "Nondestructive Ion Trap Mass Analysis at High Pressure," Anal. Chem. 83(3): 685-689 (2011).
Zhang et al., "Paul Trap Mass Analyzer Consisting of Opposing Microfabricated Electrode Pairs," Anal. Chem. 81: 5241-5248 (2009).
Final Office Action in U.S. Appl. No. 13/732,218, dated Oct. 2, 2013, (33 pages).

* cited by examiner

COMPACT MASS SPECTROMETER

TECHNICAL FIELD

This disclosure relates to identification of substances using mass spectrometry.

BACKGROUND

Mass spectrometers are widely used for the detection of chemical substances. In a typical mass spectrometer, molecules or particles are excited or ionized, and these excited species often break down to form ions of smaller mass or react with other species to form other characteristic ions. The ion formation pattern can be interpreted by a system operator to infer the identity of the compound.

SUMMARY

In general, in a first aspect, the disclosure features mass spectrometers that include an ion source, an ion trap, an ion detector, and a gas pressure regulation system, where during operation of the mass spectrometers, the gas pressure regulation system is configured to maintain a gas pressure of between 100 mTorr and 100 Torr in at least two of the ion source, the ion trap, and the ion detector, and the ion detector is configured to detect ions generated by the ion source according to a mass-to-charge ratio of the ions.

Embodiments of the mass spectrometers can include any one or more of the following features.

During operation, the gas pressure regulation system can be configured to maintain a gas pressure of between 100 mTorr and 100 Torr in the ion trap and the ion detector. During operation, the gas pressure regulation system can be configured to maintain a gas pressure of between 100 mTorr and 100 Torr in the ion source and the ion trap. During operation, the gas pressure regulation system can be configured to maintain a gas pressure of between 100 mTorr and 100 Torr in the ion source and the ion detector. During operation, the gas pressure regulation system can be configured to maintain a gas pressure of between 100 mTorr and 100 Torr in the ion source, the ion trap, and the ion detector.

The ion source can include a glow discharge ionization source. The ion source can include a capacitive discharge ionization source. The ion source can include a dielectric barrier discharge ionization source.

The gas pressure regulation system can include a gas pump configured to control the gas pressure in the at least two of the ion source, the ion trap, and the ion detector. The mass spectrometers can include a controller configured to activate the gas pump to control the gas pressure in the at least two of the ion source, the ion trap, and the ion detector. The gas pump can include a scroll pump.

During operation, the gas pressure regulation system can be configured to maintain a gas pressure of between 500 mTorr and 10 Torr in the at least two of the ion source, the ion trap, and the ion detector. During operation, the gas pressure regulation system can be configured to maintain gas pressures in at least two of the ion source, the ion trap, and the ion detector that differ by an amount less than 10 Torr. During operation, the gas pressure regulation system can be configured to maintain gas pressures in the ion source, the ion trap, and the ion detector that differ by an amount less than 10 Torr. During operation, the gas pressure regulation system can be configured to maintain the same gas pressure in at least two of the ion source, the ion trap, and the ion detector. During operation, the gas pressure regulation system can be configured to maintain the same gas pressure in the ion source, the ion trap, and the ion detector.

The mass spectrometers can include: a gas path, where the ion source, the ion trap, and the ion detector are connected to the gas path; and a gas inlet connected to the gas path and configured so that, during operation, gas particles to be analyzed are introduced into the gas path through the gas inlet, and a pressure of the gas particles to be analyzed in the gas path is between 100 mTorr and 100 Torr. The gas inlet can be configured so that during operation, a mixture of gas particles including the gas particles to be analyzed and atmospheric gas particles are drawn into the gas inlet, and the mixture of gas particles is not filtered to remove atmospheric gas particles before being introduced into the gas path.

The mass spectrometers can include a sample gas inlet connected to the gas path, and a buffer gas inlet connected to the gas path, where the sample gas inlet and the buffer gas inlet are configured so that during operation of the mass spectrometer: gas particles to be analyzed are introduced into the gas path through the sample gas inlet; buffer gas particles are introduced into the gas path through the buffer gas inlet; and a combined pressure of the gas particles to be analyzed and the buffer gas particles in the gas path is between 100 mTorr and 100 Torr. The buffer gas particles can include nitrogen molecules and/or noble gas molecules.

The ion source and the ion trap can be enclosed within a housing that includes a first plurality of electrodes, and the mass spectrometers can further include a support base featuring a second plurality of electrodes configured to releasably engage the first plurality of electrodes so that the housing can be repeatedly connected to and disconnected from the support base. The mass spectrometers can include an attachment mechanism configured to secure the housing to the support base when the first plurality of electrodes is engaged with the second plurality of electrodes. The attachment mechanism can include at least one of a clamp and a cam.

The first plurality of electrodes can include pins, and the second plurality of electrodes can include sockets configured to receive the pins.

The ion detector can be enclosed within the housing. The gas pressure regulation system can include a pump, and the pump can be enclosed within the housing.

The support base can include a voltage source coupled to the second plurality of electrical contacts, and a controller connected to the voltage source, where the controller is further connected to the ion source and the ion trap when the housing is connected to the support base. During operation, the controller can be configured to determine the gas pressure in the at least one of the ion source, the ion trap, and the ion detector, and control the gas pressure by activating the gas pressure regulation system.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In another aspect, the disclosure features methods that include maintaining a gas pressure of between 100 mTorr and 100 Torr in at least two of an ion source, an ion trap, and an ion detector of a mass spectrometers, and detecting ions generated by the ion source according to a mass-to-charge ratio of the ions.

Embodiments of the methods can include any one or more of the following features.

The methods can include maintaining a gas pressure of between 100 mTorr and 100 Torr in the ion trap and the ion detector. The methods can include maintaining a gas pressure of between 100 mTorr and 100 Torr in the ion source and the ion trap. The methods can include maintaining a gas pressure of between 100 mTorr and 100 Torr in the ion source and the ion detector. The methods can include maintaining a gas pressure of between 100 mTorr and 100 Torr in the ion source, the ion trap, and the ion detector. The methods can include maintaining a gas pressure of between 500 mTorr and 10 Torr in the at least two of the ion source, the ion trap, and the ion detector. The methods can include maintaining gas pressures in at least two of the ion source, the ion trap, and the ion detector that differ by an amount less than 10 Torr. The methods can include maintaining gas pressures in the ion source, the ion trap, and the ion detector that differ by an amount less than 10 Torr. The methods can include maintaining the same gas pressure in at least two of the ion source, the ion trap, and the ion detector. The methods can include maintaining the same gas pressure in the ion source, the ion trap, and the ion detector.

The methods can include introducing gas particles to be analyzed into a gas path connecting the ion source, the ion trap, and the ion detector through a gas inlet, so that a pressure of the gas particles to be analyzed in the gas path is between 100 mTorr and 100 Torr. The methods can include introducing a mixture of gas particles into a gas path connecting the ion source, the ion trap, and the ion detector through a gas inlet, where the mixture of gas particles includes gas particles to be analyzed and atmospheric gas particles, and the mixture of gas particles is not filtered to remove atmospheric gas particles before being introduced into the gas path.

The methods can include introducing gas particles to be analyzed into a gas path connecting the ion source, the ion trap, and the ion detector through a sample gas inlet, and introducing buffer gas particles into the gas path through a buffer gas inlet, where a combined pressure of the gas particles to be analyzed and the buffer gas particles in the gas path is between 100 mTorr and 100 Torr. The buffer gas particles can include nitrogen molecules and/or noble gas molecules.

Embodiments of the methods can also include any of the other features disclosed herein, in any combination, as appropriate.

In a further aspect, the disclosure features mass spectrometers that include a support base featuring a first plurality of electrodes, and a pluggable module featuring a second plurality of electrodes, where the pluggable module is configured to releasably connect to the support base by engaging the second plurality of electrical connectors with the first plurality of electrical connectors, and where the pluggable module includes an ion trap connected to a gas path.

Embodiments of the mass spectrometers can include any one or more of the following features.

The pluggable module can include an ion trap connected to the gas path. The second plurality of electrodes can include pins, and the first plurality of electrodes can include sockets configured to receive the pins.

The support base comprises a first attachment mechanism and the pluggable module comprises a second attachment mechanism configured to engage with the first attachment mechanism.

The first and second attachment mechanisms can be configured so that the pluggable module releasably connects to the support base in only one orientation. One of the first and second attachment mechanisms can include an asymmetric extended member, and the other one of the first and second attachment mechanisms can include a recess configured to receive the extended member. At least one of the first and second attachment mechanisms can include a flexible sealing member. At least one of the first and second attachment mechanisms can include at least one of a clamp and a cam.

The mass spectrometers can include a gas inlet connected to the gas path. The mass spectrometers can include an ion detector attached to the support base. The pluggable module can include an ion detector connected to the gas path. The ion detector can be positioned on the support base so that when the pluggable module is connected to the support base, the ion detector is connected to the gas path.

The mass spectrometers can include a pump attached to the support base. The pluggable module can include a pump connected to the gas path. The pump can be positioned on the support base so that when the pluggable module is connected to the support base, the pump is connected to the gas path. The pump can include a scroll pump.

The ion source can include a glow discharge ionization source and/or capacitive discharge ionization source.

The mass spectrometers can include an ion detector connected to the gas path, and a controller attached to the support base and connected to the ion trap. During operation of the mass spectrometers, the controller can be configured to detect ions generated by the ion source using the detector, determine information related to an identity of the detected ions, and display the information using an output interface.

The mass spectrometers can include a pump connected to the gas path and configured to maintain the pressure of the gas particles in a range from 100 mTorr to 100 Torr. The mass spectrometers can include a controller connected to the ion trap and the pump, where during operation of the mass spectrometers, the controller can be configured to determine a pressure of gas particles in the gas path, and activate the pump to maintain the pressure of the gas particles in a range from 100 mTorr to 100 Torr.

The pump can be configured to maintain the pressure of the gas particles in a range from 100 mTorr to 100 Torr.

The mass spectrometers an include an enclosure surrounding the support base and the pluggable module, where the enclosure includes an opening positioned adjacent to the pluggable module to allow a user of the mass spectrometers to connect and disconnect the pluggable module from the support base through the opening. The mass spectrometers can include a covering member that, when deployed, seals the opening in the enclosure. The covering member can include a retractable door. The covering member can include a lid that fully detaches from the enclosure.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In another aspect, the disclosure features mass spectrometer systems that include any of the mass spectrometers disclosed herein that feature a first pluggable module, and one or more additional pluggable modules, where each of the additional pluggable modules includes an ion trap and a third plurality of electrodes, and each of the additional pluggable modules is configured to releasably connect to the support base by engaging the third plurality of electrodes with the first plurality of electrodes.

Embodiments of the systems can include any one or more of the following features.

At least one of the additional pluggable modules can include an ion trap that is substantially similar to the ion trap of the first pluggable module.

The first pluggable module can include an ion source, and at least one of the additional pluggable modules can include an ion source that differs from the ion source of the first pluggable module. For example, the ion source of the first pluggable module can include a glow discharge ionization source, and at least one of the additional pluggable modules can include an ionization source that is different from a glow discharge ionization source (e.g., an electrospray ionization source, a dielectric barrier discharge ionization source, and/or a capacitive discharge ionization source).

At least one of the additional pluggable modules can include an ion trap that differs from the ion trap of the first pluggable module. A diameter of the ion trap of the first pluggable module can differ from a diameter of an ion trap of at least one of the additional pluggable modules. Alternatively, or in addition, a cross-sectional shape of the ion trap of the first pluggable module can differ from a cross-sectional shape of an ion trap of at least one of the additional pluggable modules.

The first pluggable module can include an ion detector and each of the additional pluggable modules can include an ion detector, and the ion detector of the first pluggable module can differ from the ion detector of at least one of the additional pluggable modules.

At least one surface of the first pluggable module can include a first coating, and at least one surface of at least one of the additional pluggable modules can include a second coating different from the first coating.

Embodiments of the systems can also include any of the other features disclosed herein, in any combination, as appropriate.

In a further aspect, the disclosure features mass spectrometers that include a support base, an ion source mounted to the support base, an ion trap mounted to the support base, an ion detector mounted to the support base, and an electrical power source mounted to the support base and electrically connected through the support base to the ion source, the ion trap, and the ion detector, where during operation of the mass spectrometers, the electrical power source is configured to provide electrical power to the ion source, the ion trap, and the ion detector.

Embodiments of the mass spectrometers can include any one or more of the following features.

A maximum dimension of the mass spectrometers can be less than 35 cm. A total mass of the mass spectrometers can be less than 4.5 kg.

The mass spectrometers can include a gas pressure regulation system mounted to the support base and electrically connected through the support base to the electrical power source, where during operation of the mass spectrometers, the electrical power source is configured to provide electrical power to the gas pressure regulation system. The mass spectrometers can include a controller mounted to the support base and electrically connected through the support base to the ion source, the ion trap, the ion detector, and the gas pressure regulation system. The ion source, the ion trap, and the ion detector can be connected to a gas path, and during operation of the mass spectrometers, the gas pressure regulation system can be configured maintain a gas pressure in the gas path in a range from 100 mTorr to 100 Torr (e.g., in a range from 500 mTorr to 10 Torr). The gas pressure regulation system can include a scroll pump.

The support base can include a printed circuit board.

The mass spectrometers can include a gas inlet connected to the gas path, where the gas inlet is configured so that during operation of the mass spectrometers, a mixture of gas particles are introduced into the gas path through the gas inlet, the mixture including gas particles to be analyzed and atmospheric gas particles, and the mixture of gas particles is introduced into the gas path without filtering the atmospheric gas particles. The gas inlet can include a valve that is electrically connected to the controller, and during operation of the mass spectrometers, the controller can be configured to introduce the mixture of gas particles into the gas path through the gas inlet during an interval of at least 30 seconds.

During operation of the mass spectrometers, the controller can be configured to use the ion detector to detect ions generated by the ion source, and adjust a duty cycle of the ion source based on the detected ions. The controller can be configured to adjust the duty cycle of the ion source by adjusting a time interval during which the ion source generates ions. The controller can be configured to adjust the duty cycle of the ion source by adjusting at least one of a duration and a magnitude of an electrical potential applied to an electrode of the ion source.

During operation of the mass spectrometers, the controller can be configured to determine information related to an identity of the detected ions, and display the information using an output interface.

The ion source can include a glow discharge ionization source and/or a dielectric barrier discharge ionization source.

Embodiments of the mass spectrometers can also include any of the other features disclosed herein, in any combination, as appropriate.

In another aspect, the disclosure features mass spectrometers that include: an ion source, an ion trap, and a detector connected to a gas path; a gas inlet connected to the gas path and featuring a valve; a pressure regulation system configured to control gas pressure in the gas path; and a controller connected to the valve, the ion source, the ion trap, and the detector, where during operation of the mass spectrometers, the pressure regulation system is configured to maintain a gas pressure in the gas path of greater than 100 mTorr, and the controller is configured to: (a) activate the valve to introduce a mixture of gas particles into the gas path, where the mixture comprises gas particles to be analyzed and atmospheric gas particles, and where the mixture of gas particles is introduced without filtering the atmospheric gas particles; (b) activate the ion source to generate ions from the gas particles to be analyzed; and (c) activate the detector to detect the ions according to a mass-to-charge ratio for the ions.

Embodiments of the mass spectrometers can include any one or more of the following features.

The atmospheric gas particles can include at least one of molecules of nitrogen and molecules of oxygen. The pressure regulation system can configured to maintain a gas pressure in the gas path of greater than 500 mTorr (e.g., greater than 1 Torr). The controller can be configured to activate the valve to continuously introduce the mixture of gas particles into the gas path over a period of at least 10 seconds (e.g., over a period of at least 30 seconds, over a period of at least 1 minute, over a period of at least 2 minutes).

The mass spectrometers can include: a housing enclosing the ion source and the ion trap, and featuring a first plurality of electrodes connected to the ion source and the ion trap; and a support base featuring a second plurality of electrodes configured to engage the first plurality of electrodes, where the housing forms a pluggable module configured to releasably connect to the support base. The controller can be connected to the support base.

A maximum dimension of the mass spectrometers can be less than 35 cm. A total mass of the mass spectrometers can be less than 4.5 kg.

During operation, the controller can be configured to adjust a duty cycle of the ion source based on the detected ions. For example, the controller can be configured to adjust the ion source so that ions are produced from the gas particles to be analyzed for a continuous period of 10 seconds or more (e.g., for a continuous period of 30 seconds or more, for a continuous period of 1 minute or more, for a continuous period of 2 minutes or more).

Embodiments of the mass spectrometers can also include any of the other features disclosed herein, in any combination, as appropriate.

In a further aspect, the disclosure features methods that include: introducing a mixture of gas particles into a gas path of a mass spectrometer, where the mixture includes gas particles to be analyzed and atmospheric gas particles, and where the mixture of gas particles is introduced without filtering the atmospheric gas particles: maintaining a gas pressure in the gas path of greater than 100 mTorr; generating ions from the gas particles to be analyzed using an ion source connected to the gas path; and detecting the ions according to a mass-to-charge ratio for the ions using a detector connected to the gas path.

Embodiments of the methods can include any one or more of the following features.

The atmospheric gas particles can include at least one of molecules of nitrogen and molecules of oxygen.

The methods can include maintaining a gas pressure in the gas path of greater than 500 mTorr (e.g., greater than 1 Torr). The methods can include continuously introducing the mixture of gas particles into the gas path over a period of at least 10 seconds (e.g., over a period of at least 30 seconds, over a period of at least 2 minutes). The methods can include adjusting the ion source so that ions are produced from the gas particles to be analyzed for a continuous period of 10 seconds or more (e.g., for a continuous period of 30 seconds or more, for a continuous period of 2 minutes or more).

Embodiments of the methods can also include any of the other features disclosed herein, in any combination, as appropriate.

In another aspect, the disclosure features mass spectrometers that include an ion source, an ion trap, an ion detector, a pressure regulation system featuring a single mechanical pump configured to control gas pressure in the ion source, ion trap, and ion detector, and a controller connected to the ion source, the ion trap, and the ion detector, where the single mechanical pump operates at a frequency of less than 6000 cycles per minute to control the gas pressure, and where during operation of the mass spectrometers, the controller is configured to activate the ion detector to detect ions generated by the ion source according to a mass-to-charge ratio of the ions.

Embodiments of the mass spectrometers can include any one or more of the following features.

The single mechanical pump can include a scroll pump. The single mechanical pump can operate at a frequency of less than 4000 cycles per minute to control the gas pressure.

During operation of the mass spectrometers, the single mechanical pump can maintain a gas pressure of between 100 mTorr and 100 Torr in at least two of the ion source, the ion trap, and the ion detector. During operation of the mass spectrometers, the single mechanical pump can maintain a gas pressure of between 500 mTorr and 10 Torr in at least two of the ion source, the ion trap, and the ion detector. During operation of the mass spectrometers, the single mechanical pump can maintain a common gas pressure in at least two of the ion source, the ion trap, and the ion detector. During operation of the mass spectrometers, the single mechanical pump can maintain gas pressures in the ion source, the ion trap, and the ion detector that differ by 10 mTorr or less.

The controller can be connected to the pump, and during operation of the mass spectrometers, the controller can be configured to control the frequency of the pump. During operation of the mass spectrometers, the controller is configured to detect ions generated by the ion source using the ion detector, and adjust the frequency of the pump based on the detected ions.

The ion source can include a glow discharge ionization source, a dielectric barrier discharge ionization source, and/or a capacitive discharge ionization source.

The mass spectrometers can include a housing enclosing the ion source and the ion trap, and featuring a first plurality of electrodes connected to the ion source and the ion trap, and a support base featuring a second plurality of electrodes configured to engage the first plurality of electrodes, where the housing is a pluggable module configured to releasably connect to the support base. The housing can enclose the pump. The controller can be mounted on the support base. The support base can include a printed circuit board. The electronic processor can be electrically connected to the ion source and the ion trap through the support base.

A maximum dimension of the mass spectrometers can be less than 35 cm. A total mass of the mass spectrometers is less than 4.5 kg.

Embodiments of the mass spectrometers can also include any of the other features disclosed herein, in any combination, as appropriate.

In a further aspect, the disclosure features methods that include using a single mechanical pump to control gas pressure in an ion source, an ion trap, and an ion detector of a mass spectrometer, and using the ion detector to detect ions generated by the ion source according to a mass-to-charge ratio of the ions, where using the single mechanical pump to control gas pressure includes operating the pump at a frequency of less than 6000 cycles per minute to control the gas pressure.

Embodiments of the methods can include any one or more of the following features.

The methods can include operating the pump at a frequency of less than 4000 cycles per minute to control the gas pressure. The methods can include maintaining a gas pressure of between 100 mTorr and 100 Torr (e.g., between 500 mTorr and 10 Torr) in at least two of the ion source, the ion trap, and the ion detector.

The methods can include maintaining a common gas pressure in at least two of the ion source, the ion trap, and the ion detector. The methods can include maintaining gas pressures in the ion source, the ion trap, and the ion detector that differ by 10 mTorr or less.

The methods can include adjusting the frequency of the pump based on the detected ions (e.g., based on abundances of the detected ions).

Embodiments of the methods can also include any of the other features disclosed herein, in any combination, as appropriate.

In another aspect, the disclosure features mass spectrometers that include an ion source, an ion trap, an ion detector, a user interface, and a controller connected to the ion source, the ion trap, the ion detector, and the user interface, where during operation of the mass spectrometers, the controller is configured to, detect ions generated by the ion source using the ion detector, determine a chemical name associated with the detected ions, and display the chemical name on the user interface, and where the user interface includes a control that, when activated by a user after the display of the chemical name, causes the controller to display a spectrum of the detected ions on the user interface.

Embodiments of the mass spectrometers can include any one or more of the following features.

Displaying the spectrum of the detected ions includes displaying abundances of the detected ions as a function of a mass-to-charge ratio of the ions. The control can include at least one of a button, a switch, and a region of a touchscreen display. During operation of the mass spectrometers, the controller can be further configured to display hazards associated with the detected ions on the user interface.

The ion source can be at least one of a glow discharge ionization source, a capacitive discharge ionization source, and a dielectric barrier discharge ionization source.

During operation of the mass spectrometers, the controller can be configured so that the spectrum of the detected ions is not displayed unless the control is activated.

The ion detector can include a Faraday detector.

The mass spectrometers can include a pressure regulation system, where during operation of the mass spectrometers, the pressure regulation system is configured to maintain a gas pressure of between 100 mTorr and 100 Torr (e.g., between 500 mTorr and 10 Torr) in the ion trap and the ion detector.

The pressure regulation system can include a scroll pump.

The mass spectrometers can include a pluggable module featuring the ion source, the ion trap, and a first plurality of electrodes connected to the ion source and the ion trap, and a support base featuring a voltage source and a second plurality of electrodes configured to engage the first plurality of electrodes, where the pluggable module is configured to releasably connect to the support base.

The pluggable module can include the ion detector. The pluggable module can include a pressure regulation system.

The mass spectrometers can include a housing enclosing the pluggable module and the support base, and featuring an opening positioned adjacent to the pluggable module and configured to allow the pluggable module to be inserted through the opening to releasably connect to the support base.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In a further aspect, the disclosure features mass spectrometers that include an ion source, an ion trap, an ion detector, a user interface, and a controller connected to the ion source, the ion trap, the ion detector, and the user interface, where the user interface includes a control that can be activated to one of at least two states by a user of the mass spectrometer, and where during operation of the mass spectrometer, the controller is configured to detect ions generated by the ion source using the ion detector, determine a chemical name associated with the detected ions, and: if the control is activated to a first state, display the chemical name on the user interface; and if the control is activated to a second state, display a spectrum of the detected ions on the user interface.

Embodiments of the mass spectrometers can include any one or more of the following features.

If the control is activated to the second state, the controller can be further configured to display the chemical name on the user interface. Displaying the spectrum of the detected ions can include displaying abundances of the detected ions as a function of a mass-to-charge ratio of the ions. The control can include at least one of a button, a switch, and a region of a touchscreen display.

The ion source can be at least one of a glow discharge ionization source, a capacitive discharge ionization source, and/or a dielectric barrier discharge ionization source.

The mass spectrometers can include a pressure regulation system connected to the controller, where during operation of the mass spectrometers, the pressure regulation system is configured to maintain a gas pressure of between 100 mTorr and 100 Torr (e.g., between 500 mTorr and 10 Torr) in the ion trap and the ion detector. The pressure regulation system can include a scroll pump.

The mass spectrometers can include: a pluggable module that includes the ion source, the ion trap, and a first plurality of electrodes connected to the ion source and the ion trap; and a support base that includes a voltage source and a second plurality of electrodes configured to engage the first plurality of electrodes, where the pluggable module is configured to releasably connect to the support base. The pluggable module can include the ion detector and/or a pressure regulation system.

The mass spectrometers can include a housing enclosing the pluggable module and the support base, and featuring an opening positioned adjacent to the pluggable module and configured to allow the pluggable module to be inserted through the opening to releasably connect to the support base.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In another aspect, the disclosure features mass spectrometers that include an ion source, an ion trap, an ion detector, a sample inlet, and a pressure regulation system, where the ion source, the ion trap, the ion detector, the sample inlet, and the pressure regulation system are connected to a gas path, and where during operation of the mass spectrometers, gas particles are introduced into the gas path only through the sample inlet, the pressure regulation system is configured to maintain a gas pressure in the gas path of between 100 mTorr and 100 Torr, and the ion detector is configured to detect ions generated by the ion source from the gas particles according to a mass-to-charge ratio of the ions.

Embodiments of the mass spectrometers can include any one or more of the following features.

The pressure regulation system can be configured to maintain the gas pressure between 500 mTorr and 10 Torr. The pressure regulation system can be configured to maintain the gas pressure above 500 mTorr.

The ion source can include at least one of a glow discharge ionization source, a capacitive discharge ionization source, and a dielectric barrier discharge ionization source.

A maximum dimension of the mass spectrometers can be less than 35 cm. A total mass of the mass spectrometers can be less than 4.5 kg.

The pressure regulation system can include a scroll pump.

The sample inlet can be configured so that the gas particles that are introduced into the gas path include gas particles to be analyzed and atmospheric gas particles.

The mass spectrometers can include a valve connected to the sample inlet and a controller connected to the valve, where during operation of the mass spectrometers, the controller can be configured to continuously introduce the gas particles into the gas path through the sample inlet for a period of at least 30 seconds (e.g., for a period of at least 1 minute, for a period of at least 2 minutes).

The mass spectrometers can include a controller connected to the ion source, where during operation of the mass spectrometers, the controller can be configured to adjust an electrical potential applied to the ion source so that ions are continuously produced from the gas particles by the ion source for a period of at least 30 seconds (e.g., for a period of at least 1 minute, for a period of at least 2 minutes).

The mass spectrometers can include a pluggable module featuring the ion source, the ion trap, and a first plurality of electrodes connected to the ion source and the ion trap, and a support base featuring a voltage source and a second plurality of electrodes configured to engage the first plurality of electrodes, where the pluggable module is configured to releasably connect to the support base. The pluggable module can include the pressure regulation system.

The mass spectrometers can include a housing enclosing the pluggable module and the support base, and featuring an opening positioned adjacent to the pluggable module and configured to allow the pluggable module to be inserted through the opening to releasably connect to the support base.

The pressure regulation system can include a single mechanical pump, where during operation of the mass spectrometers, the single mechanical pump is configured to operate at a frequency of 6000 cycles per minute or less to maintain the gas pressure in the gas path.

Embodiments of the mass spectrometers can also include any of the other features disclosed herein, in any combination, as appropriate.

In a further aspect, the disclosure features methods that include introducing a mixture of gas particles into a gas path of a mass spectrometer through a single gas inlet, where the mixture of gas particles includes only gas particles to be analyzed and atmospheric gas particles, maintaining a gas pressure in the gas path of between 100 mTorr and 100 Torr, and detecting ions generated from the gas particles to be analyzed according to a mass-to-charge ratio of the ions.

Embodiments of the methods can include any one or more of the following features.

The methods can include maintaining the gas pressure between 500 mTorr and 10 Torr. The methods can include maintaining the gas pressure above 500 mTorr.

The methods can include continuously introducing the mixture of gas particles into the gas path through the single gas inlet for a period of at least 30 seconds (e.g., for a period of at least 1 minute, for a period of at least 2 minutes).

The methods can include adjusting an electrical potential applied to an ion source of the mass spectrometer so that ions are continuously generated from the gas particles to be analyzed for a period of at least 30 seconds (e.g., for a period of at least 1 minute, for a period of at least 2 minutes).

The methods can include operating a single mechanical pump at a frequency of 6000 cycles per minute or less to maintain the gas pressure in the gas path.

Embodiments of the methods can also include any of the other features disclosed herein, in any combination, as appropriate.

In another aspect, the disclosure features mass spectrometers that include an ion source featuring an exit electrode through which ions leave the ion source, an ion trap featuring an entry electrode positioned adjacent to the exit electrode, an ion detector, and a pressure regulation system, where: the exit electrode includes one or more apertures defining a cross-sectional shape of the exit electrode, and the entry electrode includes one or more apertures defining a cross-sectional shape of the entry electrode: the cross-sectional shape of the exit electrode substantially matches the cross-sectional shape of the entry electrode; and during operation of the mass spectrometers, the pressure regulation system is configured to maintain a gas pressure of at least 100 mTorr in the ion trap, and the ion detector is configured to detect ions generated by the ion source according to a mass-to-charge ratio of the ions.

Embodiments of the mass spectrometers can include any one or more of the following features.

The ion trap can include one or more ion chambers, the one or more ion chambers defining a cross-sectional shape of the ion trap, and the cross-sectional shape of the ion trap can substantially match the cross-sectional shape of the entry electrode.

The one or more apertures of the exit electrode can include multiple apertures arranged in a rectangular or square array. The one or more apertures of the exit electrode can include multiple apertures arranged in a hexagonal array. The one or more apertures of the exit electrode can include an aperture having a rectangular cross-sectional shape. The one or more apertures of the exit electrode can include an aperture having a spiral cross-sectional shape. The one or more apertures of the exit electrode can include an aperture having a serpentine cross-sectional shape. The one or more apertures of the exit electrode can include 4 or more apertures (e.g., 8 or more apertures, 24 or more apertures, 100 or more apertures). The one or more apertures of the exit electrode can include a plurality of apertures arranged in a serpentine pattern.

The mass spectrometers can include a voltage source connected to the exit electrode and to a first electrode of the ion source, and a controller connected to the voltage source, where during operation of the mass spectrometers, the controller can be configured to operate the ion source in one of at least two modes by applying different electrical potentials to the first electrode and the exit electrode, the different electrical potentials being referenced to a common ground potential. In a first one of the at least two modes, the controller can be configured to apply electrical potentials to the first electrode and to the exit electrode so that the first electrode is at a positive electrical potential relative to the common ground potential, and in a second one of the at least two modes, the controller can be configured to apply electrical potentials to the first and second electrodes so that the first electrode is at a negative electrical potential relative to the common ground.

The mass spectrometers can include a user interface featuring a selectable control configured so that when the control is activated during operation of the mass spectrometer, the controller changes the operating mode of the ion source.

The ion source can include a glow discharge ionization source.

The mass spectrometers can include a detector connected to the controller, where during operation of the mass spectrometer, the controller can be configured to detect ions generated by the ion source using the ion detector, and adjust the electrical potentials applied to the first electrode and the exit electrode based on the detected ions to control a duration of time during which the ion source continuously generates ions. During operation of the mass spectrometers, the ion source can generate ions in a plurality of ionization cycles that define an ion source frequency, each ionization cycle can include a first interval during which ions are generated, and a second interval during which ions are not generated, the first and second intervals defining a duty cycle, and the controller can be configured to adjust the duty cycle to a value between 1% and 40% (e.g., to a value between 1% and 20%, to a value between 1% and 10%).

During operation of the mass spectrometers, the controller can be configured to determine when the ion source should be cleaned based on the detected ions, adjust the duty cycle of the ion source to a value between 50% and 90%, and operate the ion source for a period of at least 30 seconds to clean the ion source.

The pressure regulation system can be configured to maintain a gas pressure of between 100 mTorr and 100 Torr (e.g., between 500 mTorr and 10 Torr) in the ion trap.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In a further aspect, the disclosure features mass spectrometers that include an ion source, an ion trap, an ion detector, a pressure regulation system, a voltage source connected to the ion source, the ion trap, the ion detector, and the pressure regulation system, and a controller connected to the ion source, the ion trap, the ion detector, and the voltage source, where during operation of the mass spectrometers, the controller is configured to activate the ion source to generate ions from gas particles, activate the ion detector to detect ions generated by the ion source, and adjust a resolution of the mass spectrometers based on the detected ions.

Embodiments of the mass spectrometers can include any one or more of the following features.

The controller can be connected to the pressure regulation system and configured to adjust the resolution by activating the pressure regulation system to change a gas pressure in at least one of the ion source and the ion trap. The controller can be configured to increase the resolution by activating the pressure regulation system to reduce the gas pressure in the at least one of the ion source and the ion trap.

The controller can be configured to repeatedly apply an electrical potential using the voltage source to a central electrode of the ion trap to eject ions from the trap, the repeated applications of the electrical potential defining a repetition frequency of the electrical potential, and adjust the resolution by changing the repetition frequency of the electrical potential. The controller can be configured to increase the resolution by increasing the repetition frequency of the electrical potential.

The controller can be configured to adjust the resolution by changing a maximum amplitude of an electrical potential applied to a central electrode of the ion trap by the voltage source.

The controller can be configured to apply an axial electrical potential difference between electrodes at opposite ends of the ion trap using the voltage source, and adjust the resolution by changing a magnitude of the axial electrical potential difference. The controller can be configured to increase the resolution by increasing a magnitude of the axial electrical potential difference.

The controller can be configured to repeatedly apply an electrical potential difference between electrodes of the ion source using the voltage source to generate the ions, the repeated applications of the electrical potential defining a repetition frequency of the ion source, and adjust the resolution by changing the repetition frequency of the ion source. The controller can be configured to synchronize the repetition frequency of the ion source and the repetition frequency of the electrical potential applied to the central electrode of the ion trap.

The controller can be configured to: repeatedly apply an electrical potential difference between electrodes of the ion source using the voltage source, where the repeated applications of the electrical potential define a repetition period of the ion source and the repetition period includes a first time interval during which the electrical potential difference is applied between the electrodes of the ion source, and a second time interval during which the electrical potential difference is not applied between the electrodes of the ion source; and adjust the resolution by adjusting a duty cycle of the ion source, where the duty cycle corresponds to a ratio of the first time interval to the repetition period. The controller can be configured to increase the resolution by decreasing the duty cycle of the ion source.

The mass spectrometers can include a gas path, where the ion source, the ion trap, the ion detector, and the pressure regulation system are connected to the gas path, and a buffer gas inlet connected to the gas path, and featuring a valve connected to the controller, where the controller is configured to control the valve to adjust a rate at which buffer gas particles are introduced into the gas path through the buffer gas inlet to adjust the resolution. The controller can be configured to increase the rate at which buffer gas particles are introduced into the gas path to increase the resolution.

During operation of the mass spectrometers, the controller can be configured to: repeatedly activate the ion source to generate ions from gas particles, activate the ion detector to detect ions generated by the ion source, and adjust the resolution of the mass spectrometer based on the detected ions, until the resolution of the mass spectrometer reaches a threshold value; activate the ion detector to detect ions generated from the gas particles when the resolution of the mass spectrometer is at least as large as the threshold value: determine information about an identity of the gas particles based on ions detected when the resolution of the mass spectrometer is at least as large as the threshold value; and display the information on a user interface. The information can include a chemical name of the gas particles and/or information about hazards associated with the gas particles and/or information about a class of substances to which the gas particles correspond.

During operation of the mass spectrometers, the controller can be configured to adjust the voltage source so that an electrical potential is applied to a central electrode of the ion trap only when the resolution reaches the threshold value.

During operation of the mass spectrometers, the pressure regulation system can be configured to maintain a gas pressure in at least two of the ion source, the ion trap, and the ion detector of between 100 mTorr and 100 Torr (e.g., between 500 mTorr and 10 Torr).

The mass spectrometers can include a pluggable module featuring the ion source, the ion trap, the detector, and a first plurality of electrodes connected to the ion source, the ion trap, and the detector, and a support base featuring a second plurality of electrodes configured to engage the first plurality of electrodes, where the voltage source and the controller are mounted on the support base, and where the pluggable module is configured to releasably connect to the support base.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In another aspect, the disclosure features methods that include introducing gas particles into an ion source of a mass spectrometer, generating ions from the gas particles, detecting the ions using a detector of the mass spectrometer, and adjusting a resolution of the mass spectrometer based on the detected ions.

Embodiments of the methods can include any one or more of the following features.

Adjusting the resolution can include changing a gas pressure in at least one of the ion source and the ion trap. The methods can include increasing the resolution by reducing the gas pressure in the at least one of the ion source and the ion trap.

The methods can include repeatedly applying an electrical potential to a central electrode of the ion trap to eject ions from the trap, the repeated applications of the electrical potential defining a repetition frequency of the electrical potential, and adjusting the resolution by changing the repetition frequency of the electrical potential. The methods can include increasing the resolution by increasing the repetition frequency of the electrical potential. The methods can include adjusting the resolution by changing a maximum amplitude of an electrical potential applied to a central electrode of the ion trap.

The methods can include applying an axial electrical potential difference between electrodes at opposite ends of the ion trap, and adjusting the resolution by changing a magnitude of the axial electrical potential difference. The methods can include increasing the resolution by increasing a magnitude of the axial electrical potential difference.

The methods can include repeatedly applying an electrical potential difference between electrodes of the ion source to generate the ions, the repeated applications of the electrical potential defining a repetition frequency of the ion source, and adjusting the resolution by changing the repetition frequency of the ion source. The methods can include synchronizing the repetition frequency of the ion source and the repetition frequency of the electrical potential applied to the central electrode of the ion trap.

The methods can include: repeatedly applying an electrical potential difference between electrodes of the ion source, where the repeated applications of the electrical potential define a repetition period of the ion source, and the repetition period includes a first time interval during which the electrical potential difference is applied between the electrodes of the ion source, and a second time interval during which the electrical potential difference is not applied between the electrodes of the ion source; and adjusting the resolution by adjusting a duty cycle of the ion source, where the duty cycle corresponds to a ratio of the first time interval to the repetition period. The methods can include increasing the resolution by decreasing the duty cycle of the ion source.

The methods can include adjusting a rate at which buffer gas particles are introduced into a gas path of the mass spectrometer to adjust the resolution. The methods can include increasing the rate at which buffer gas particles are introduced into the gas path to increase the resolution.

The methods can include: repeatedly activating the ion source to generate ions from gas particles, activating the ion detector to detect ions generated by the ion source, and adjusting the resolution of the mass spectrometer based on the detected ions, until the resolution of the mass spectrometer reaches a threshold value; activating the ion detector to detect ions generated from the gas particles when the resolution of the mass spectrometer is at least as large as the threshold value; determining information about an identity of the gas particles based on ions detected when the resolution of the mass spectrometer is at least as large as the threshold value; and displaying the information on a user interface. The information can include a chemical name of the gas particles and/or information about hazards associated with the gas particles and/or information about a class of substances to which the gas particles correspond.

The methods can include applying an electrical potential to a central electrode of the ion trap only when the resolution reaches the threshold value.

The methods can include maintaining a gas pressure in at least two of the ion source, the ion trap, and the ion detector of between 100 mTorr and 100 Torr (e.g., between 500 mTorr and 10 Torr).

Embodiments of the methods can also include any of the other features disclosed herein, in any combination, as appropriate.

In a further aspect, the disclosure features mass spectrometers that include an ion source, an ion trap, an ion detector, a gas pressure regulation system featuring a single mechanical pump, and a controller connected to the ion source, the ion trap, and the ion detector, where during operation of the mass spectrometers, the gas pressure regulation system is configured to maintain a gas pressure of between 100 mTorr and 100 Torr in at least two of the ion source, the ion trap, and the ion detector, and the controller is configured to activate the ion detector to detect ions generated by the ion source according to a mass-to-charge ratio of the ions, and where the single mechanical pump operates at a frequency of less than 6000 cycles per minute to maintain the gas pressure.

Embodiments of the mass spectrometers can include one or more of the following features. During operation, the gas pressure regulation system can be configured to maintain a gas pressure of between 100 mTorr and 100 Torr in the ion trap and the ion detector. During operation, the gas pressure regulation system can be configured to maintain a gas pressure of between 100 mTorr and 100 Torr in the ion source and the ion trap. During operation, the gas pressure regulation system can be configured to maintain a gas pressure of between 100 mTorr and 100 Torr in the ion source, the ion trap, and the ion detector.

The mechanical pump can be a scroll pump.

During operation, the gas pressure regulation system can be configured to maintain gas pressures in at least two of the ion source, the ion trap, and the ion detector that differ by an amount less than 10 Torr. During operation, the gas pressure regulation system can be configured to maintain gas pressures in the ion source, the ion trap, and the ion detector that differ by an amount less than 10 Torr. During operation, the gas pressure regulation system can be configured to maintain the same gas pressure in at least two of the ion source, the ion trap, and the ion detector.

The mass spectrometers can include a gas path, where the ion source, the ion trap, the ion detector, and the gas pressure regulation system are connected to the gas path, and a gas inlet connected to the gas path and configured so that, during operation of the mass spectrometers, gas particles to be analyzed are introduced into the gas path through the gas inlet, and a total gas pressure in the gas path is between 100 mTorr and 100 Torr. The gas inlet can be configured so that during operation of the mass spectrometers, a mixture of gas particles including the gas particles to be analyzed and atmospheric gas particles are drawn into the gas inlet, where the mixture of gas particles is not filtered to remove atmospheric gas particles before being introduced into the gas path.

The mass spectrometers can include a gas path, where the ion source, the ion trap, the ion detector, and the gas pressure regulation system are connected to the gas path, a sample gas inlet connected to the gas path, and a buffer gas inlet connected to the gas path, where the sample gas inlet and the buffer gas inlet are configured so that during operation of the mass spectrometer, gas particles to be analyzed are introduced into the gas path through the sample gas inlet, buffer gas particles are introduced into the gas path through the buffer gas inlet, and a combined pressure of the gas particles to be analyzed and the buffer gas particles in the gas path is between 100 mTorr and 100 Torr. The buffer gas particles can include at least one of nitrogen molecules and noble gas molecules.

The mass spectrometers can include a pluggable module featuring the ion source, the ion trap, and a first plurality of electrodes connected to the ion source and the ion trap, and a support base featuring a second plurality of electrodes configured to releasably engage the first plurality of electrodes, so that the pluggable module can be connected to and disconnected from the support base. The mass spectrometers can include an attachment mechanism configured to secure the pluggable module to the support base when the first plurality of electrodes is engaged with the second plurality of electrodes. The first plurality of electrodes can include pins, and the second plurality of electrodes can include sockets configured to receive the pins.

The pluggable module can include the ion detector, and the first plurality of electrodes can be connected to the ion detector. The pluggable module can include the mechanical pump.

The mass spectrometers can include a voltage source, where the voltage source and the controller are attached to the support base and connected to the second plurality of electrodes.

The support base can include a printed circuit board. The controller can be connected to the ion source and the ion trap when the pluggable module is connected to the support base.

The single mechanical pump can operate at a frequency of less than 4000 cycles per minute to maintain the gas pressure.

A maximum dimension of the mass spectrometers can be less than 35 cm. A total mass of the mass spectrometers can be less than 4.5 kg.

Embodiments of the mass spectrometers can also include any of the other features disclosed herein, in any combination, as appropriate.

In another aspect, the disclosure features methods that include using a single mechanical pump operating at a frequency of less than 6000 cycles per minute to maintain a gas pressure in at least two of an ion source, an ion trap, and an ion detector of a mass spectrometer, and detecting ions generated by the ion source according to a mass-to-charge ratio of the ions, where the gas pressure in the at least two of the ion source, the ion trap, and the ion detector is maintained between 100 mTorr and 100 Torr.

Embodiments of the methods can include any one or more of the following features.

The gas pressure in the ion source and the ion trap can be maintained between 100 mTorr and 100 Torr. The gas pressure in the ion trap and the detector can be maintained between 100 mTorr and 100 Torr. The methods can include maintaining gas pressures in at least two of the ion source, the ion trap, and the ion detector that differ by an amount less than 10 Torr. The methods can include maintaining the same gas pressure in the ion source, the ion trap, and the ion detector.

The methods can include introducing a mixture of gas particles into a gas path connecting the ion source, the ion trap, and the ion detector, where the mixture of gas particles includes gas particles to be analyzed and atmospheric gas particles, and the mixture of gas particles is not filtered to remove atmospheric gas particles before being introduced into the gas path.

The methods can include operating the mechanical pump at a frequency of less than 4000 cycles per minute to control the gas pressure.

Embodiments of the methods can also include any of the other features disclosed herein, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

I. General Overview

Figure 1A:
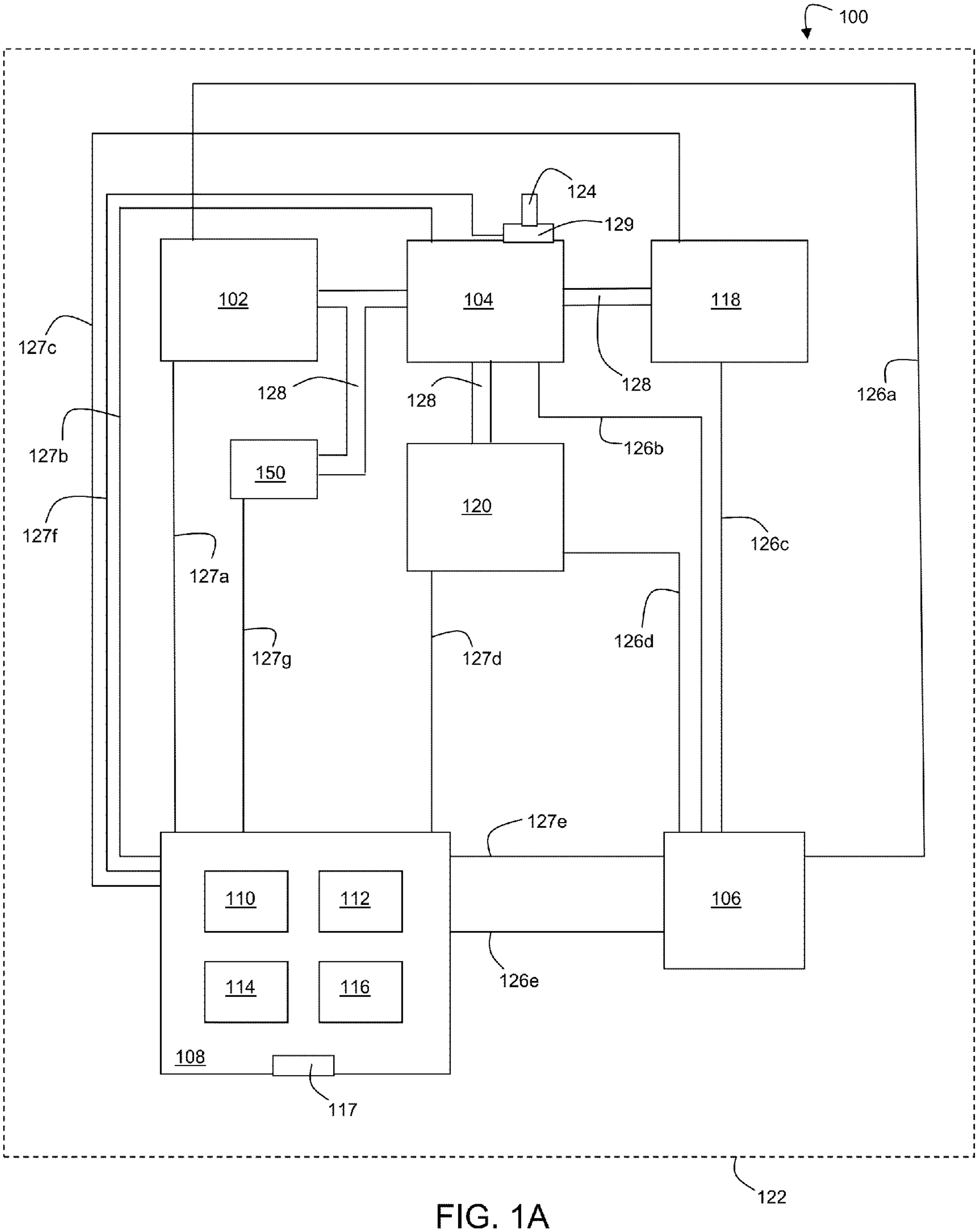
FIG. 1A is a schematic diagram of a compact mass spectrometer.

Mass spectrometers that are used for identification of chemical substances are typically large, complex instruments that consume considerable power. Such instruments are frequently too heavy and bulky to be portable, and thus are limited to applications in environments where they can remain essentially stationary. Further, conventional mass spectrometers are typically expensive and require highly trained operators to interpret the spectra of ion formation patterns that the instruments produce to infer the identities of chemical substances that are analyzed.

To achieve high sensitivity and resolution, conventional mass spectrometers typically use a variety of different components that are designed for operation at low gas pressures. For example, conventional ion detectors such as electron multipliers do not operate effectively at pressures above approximately 10 mTorr. As another example, thermionic emitters that are used in conventional ion sources are also best suited for operation at pressures less than 10 mTorr, and generally cannot be used when even moderate concentrations of oxygen are present. Further, conventional mass spectrometers typically include mass analyzers with geometries specifically designed only for operation at pressures of less than 10 mTorr, and in particular, at pressures in the microTorr range. As a result, not only are conventional mass spectrometers configured for operation at low pressures, but conventional mass spectrometers—due to the components they use—generally cannot be operated at higher gas pressures. Higher gas pressures can, for example, destroy certain components of conventional spectrometers. Less dramatically, certain components may simply fail to operate at higher gas pressures, or may operate so poorly that the spectrometers can no longer acquire useful mass spectral information. As a result, mass spectrometers with significantly different configurations and components are needed for operation at high pressures (e.g., pressures larger than 100 mTorr).

To achieve low pressures, conventional mass spectrometers typically include a series of pumps for evacuating the interior volume of a spectrometer. For example, a conventional mass spectrometer can include a rough pump that rapidly reduces the internal pressure of the system, and a turbomolecular pump that further reduces the internal pressure to microTorr values. Turbomolecular pumps are large and consume considerable electrical power. Such considerations are only of secondary importance in conventional mass spectrometers, however; the consideration of primary importance is achieving high resolution in measured mass spectra. By using the foregoing components operating at low pressure, conventional mass spectrometers commonly can achieve resolutions of 0.1 atomic mass units (amu) or better.

In contrast to heavy, bulky conventional mass spectrometers, the compact mass spectrometers disclosed herein are designed for low power, high efficiency operation. To achieve low power operation, the compact mass spectrometers disclosed herein do not include turbomechanical or other power hungry vacuum pumps. Instead, the compact mass spectrometers typically include only a single mechanical pump operating at low frequency, which reduces power consumption significantly.

By using smaller pumps, the compact mass spectrometers disclosed herein typically operate within a pressure range of 100 mTorr to 100 Torr, which is significantly higher than the operating pressure range for conventional mass spectrometers. Conventional mass spectrometers are not modifiable to operate at these higher pressures, because the components used in conventional instruments (e.g., electron multipliers, thermionic emitters, and ion trap) do not function within the pressure range in which the compact mass spectrometers disclosed herein operate. Further, conventional mass spectrometers are generally not modified to operate at higher internal pressures, because doing so typically would result in poorer resolution in the mass spectra measured with such devices. Because obtaining mass spectra with the highest possible resolution is generally the goal when using such devices, there is little reason to modify the devices to provide poorer resolution.

However, the compact mass spectrometers disclosed herein provide different types of information to a user than conventional mass spectrometers. Specifically, the compact mass spectrometers disclosed herein typically report information such as a name of a chemical substance being analyzed, hazard information associated with the substance, and/or a class to which the substance belongs. The compact mass spectrometers disclosed herein can also report, for example, whether the substance either is or is not a particular target substance. Typically, the mass spectra recorded are not displayed to the user unless the user activates a control that causes the display of the spectra. As a result, unlike conventional mass spectrometers, the compact mass spectrometers disclosed herein do not need to obtain mass spectra with the highest possible resolution. Instead, as long as the spectra obtained are of high enough quality to determine the information that is reported to the user, further increases in resolution are not a critical performance criterion.

By operating at lower resolution (typically, mass spectra are obtained at resolutions of between 1 amu and 10 amu), the compact mass spectrometers disclosed herein consume significantly less power than conventional mass spectrometers. For example, the compact mass spectrometers disclosed herein feature miniature ion traps that operate efficiently at pressures from 100 mTorr to 100 Torr to separate ions of different mass-to-charge ratio, while at the same time consuming far less power than conventional mass analyzers such as ion traps due to their reduced size. For example, as the size of a cylindrical ion trap decreases, the maximum voltage applied to the trap to separate ions decreases, and the frequency with which the voltage is applied increases. As a result, the size of inductors and/or resonators used in power supply circuitry is reduced, and the sizes and power consumption requirements of other components used to generate the maximum voltage are also reduced.

Further, the compact mass spectrometers disclosed herein feature efficient ion sources such as glow discharge ionization sources and/or capacitive discharge ionization sources that further reduce power consumption relative to ion sources such as thermionic emitters that are commonly found in conventional mass spectrometers. Efficient, low power detectors such as Faraday detectors are used in the compact mass spectrometers disclosed herein, rather than the more power hungry electron multipliers that are present in conventional mass spectrometers. As a result of these low power components, the compact mass spectrometers disclosed herein operate efficiently and consume relatively small amounts of electrical power. They can be powered by standard battery-based power sources (e.g., Li ion batteries), and are portable with a handheld form factor.

Because they provide high resolution mass spectra directly to the user, conventional mass spectrometers are generally ill-suited for applications that involve mobile scanning of substances by personnel without special training. In particular, for applications such as on-the-spot security scanning in transportation hubs such as airports and train stations, conventional mass spectrometers are impractical solutions. In contrast, such applications instead benefit from mass spectrometers that are compact, require relatively low power to operate, and provide information that can readily be interpreted by personnel without advanced training, as described above. Compact, low cost mass spectrometers are also useful for a variety of other applications. For example, such devices can be used in laboratories to provide rapid characterization of unknown chemical compounds. Due to their low cost and tiny footprint, laboratories can provide workers with personal spectrometers, reducing or eliminating the need to schedule analysis time at a centralized mass spectrometry facility. Compact mass spectrometers can also be used for applications such as medical diagnostics testing, both in clinical settings and in residences of individual patients. Technicians performing such testing can readily interpret the information provided by such spectrometers to provide real-time feedback to patients, and also to provide rapidly updated information to medical facilities, physicians, and other health care providers.

This disclosure features compact, low power mass spectrometers that provide a variety of information to users including identification of chemical substances scanned by the spectrometers and/or associated contextual information, including information about a class to which substances belong (e.g., acids, bases, strong oxidizers, explosives, nitrated compounds), information about hazards associated with the substances, and safety instructions and/or information. The spectrometers operate at internal gas pressures that are higher than conventional mass spectrometers. By operating at higher pressures, the size and power consumption of the compact mass spectrometers is significantly reduced relative to conventional mass spectrometers. Moreover, even though the spectrometers operate at higher pressures, the resolution of the spectrometers is sufficient to permit accurate identification and quantification of a wide variety of chemical substances.

FIG. 1A is a schematic diagram of an embodiment of a compact mass spectrometer 100. Spectrometer 100 includes an ion source 102, an ion trap 104, a voltage source 106, a controller 108, a detector 118, a pressure regulation subsystem 120, and a sample inlet 124. Sample inlet 124 includes a valve 129. Optionally included in spectrometer 100 is a buffer gas source 150. The components of spectrometer 100 are enclosed within a housing 122. Controller 108 includes an electronic processor 110, a user interface 112, a storage unit 114, a display 116, and a communication interface 117.

Controller 108 is connected to ion source 102, ion trap 104, detector 118, pressure regulation subsystem 120, voltage source 106, valve 129, and optional buffer gas source 150 via control lines 127*a*-127*g*, respectively. Control lines 127*a*-127*g* permit controller 108 (e.g., electronic processor 110 in controller 108) to issue operating commands to each of the components to which it is connected. Such commands can include, for example, signals that activate ion source 102, ion trap 104, detector 118, pressure regulation subsystem 120, valve 129, and buffer gas source 150. Commands that activate the various components of spectrometer 100 can include instructions to voltage source 106 to apply electrical potentials to elements of the components. For example, to activate ion source 102, controller 108 can transmit instructions to voltage source 106 to apply electrical potentials to electrodes in ion source 102. As another example, to activate ion trap 104, controller 108 can transmit instructions to voltage source 106 to apply electrical potentials to electrodes in ion trap 104. As a further example, to activate detector 118, controller 108 can transmit instructions to voltage source 106 to apply electrical potentials to detection elements in detector 118. Controller 108 can also transmit signals to activate pressure regulation subsystem 120 (e.g., through voltage source 106) to control the gas pressure in the various components of spectrometer 100, and to valve 129 (e.g., through voltage source 106) to allow gas particles to enter spectrometer 100 through sample inlet 124.

Further, controller 108 can receive signals from each of the components of spectrometer 100 through control lines 127*a*-127*g*. For example, such signals can include information about the operational characteristics of ion source 102 and/or ion trap 104 and/or detector 118 and/or pressure regulation subsystem 120. Controller 108 can also receive information about ions detected by detector 118. The information can include ion currents measured by detector 118, which are related to abundances of ions with specific mass-to-charge ratios. The information can also include information about specific voltages applied to electrodes of ion trap 104 as particular ion abundances are measured by detector 118. The specific applied voltages are related to specific values of mass-to-charge ratio for the ions. By correlating the voltage information with the measured abundance information, controller 108 can determine abundances of ions as a function of mass-to-charge ratio, and can present this information using display 116 in the form of mass spectra.

Voltage source 106 is connected to ion source 102, ion trap 104, detector 118, pressure regulation subsystem 120, and controller 108 via control lines 126*a-e*, respectively. Voltage source 106 provides electrical potentials and electrical power to each of these components through control lines 126*a-e*. Voltage source 106 establishes a reference potential that corresponds to an electrical ground at a relative voltage of 0 Volts. Potentials applied by voltage source 106 to the various components of spectrometer 100 are referenced to this ground potential. In general, voltage source 106 is configured to apply potentials that are positive and potentials that are negative, relative to the reference ground potential, to the components of spectrometer 100. By applying potentials of different signs to these components (e.g., to the electrodes of the components), electric fields of different signs can be generated within the components, which cause ions to move in different directions. Thus, by applying suitable potentials to the components of spectrometer 100, controller 108 (through voltage source 106) can control the movement of ions within spectrometer 100.

Ion source 102, ion trap 104, and detector 118 are connected such that an internal pathway for gas particles and ions, gas path 128, extends between these components. Sample inlet 124 and pressure regulation subsystem 120 are also connected to gas path 128. Optional buffer gas source 150, if present, is connected to gas path 128 as well. Portions of gas path 128 are shown schematically in FIG. 1A. In general, gas particles and ions can move in any direction in gas path 128, and the direction of movement can be controlled by the configuration of spectrometer 100. For example, by applying suitable electrical potentials to electrodes in ion source 102 and ion trap 104, ions generated in ion source 102 can be directed to flow from ion source 102 into ion trap 104.

Figure 1B:
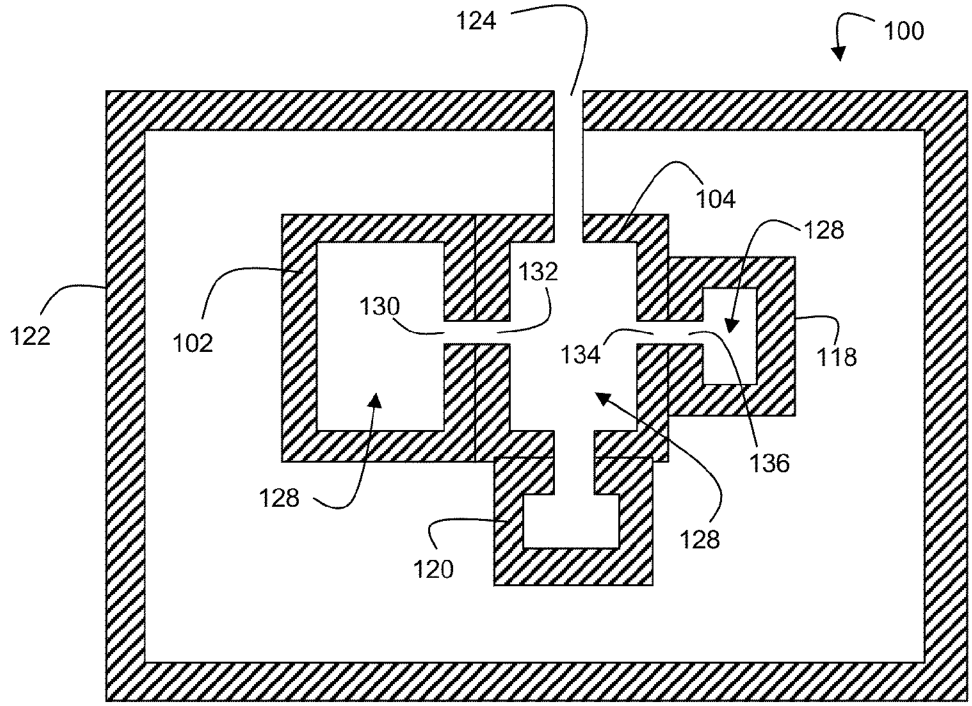
FIG. 1B is a cross-sectional diagram of an embodiment of a mass spectrometer.

FIG. 1B shows a partial cross-sectional diagram of mass spectrometer 100. As shown in FIG. 1B, an output aperture 130 of ion source 102 is coupled to an input aperture 132 of ion trap 104. Further, an output aperture 134 of ion trap 104 is coupled to an input aperture 136 of detector 118. As a result, ions and gas particles can flow in any direction between ion source 102, ion trap 104, and detector 118. During operation of spectrometer 100, pressure regulation subsystem 120 operates to reduce the gas pressure in gas path 128 to a value that is less than atmospheric pressure. As a result, gas particles to be analyzed enter sample inlet 124 from the environment surrounding spectrometer 100 (e.g., the environment outside housing 122) and move into gas path 128. Gas particles that enter ion source 102 through gas path 128 are ionized by ion source 102. The ions propagate from ion source 102 into ion trap 104, where they are trapped by electrical fields created when voltage source 106 applies suitable electrical potentials to the electrodes of ion trap 104.

The trapped ions circulate within ion trap 104. To analyze the circulating ions, voltage source 106, under the control of controller 108, varies the amplitude of a radiofrequency trapping field applied to one or more electrodes of ion trap 104. The variation of the amplitude occurs repetitively, defining a sweep frequency for ion trap 104. As the amplitude of the field is varied, ions with specific mass-to-charge ratios fall out of orbit and some are ejected from ion trap 104. The ejected ions are detected by detector 118, and information about the detected ions (e.g., measured ion currents from detector 118, and specific voltages that are applied to ion trap 104 when particular ion currents are measured) is transmitted to controller 108.

Figure 1C:
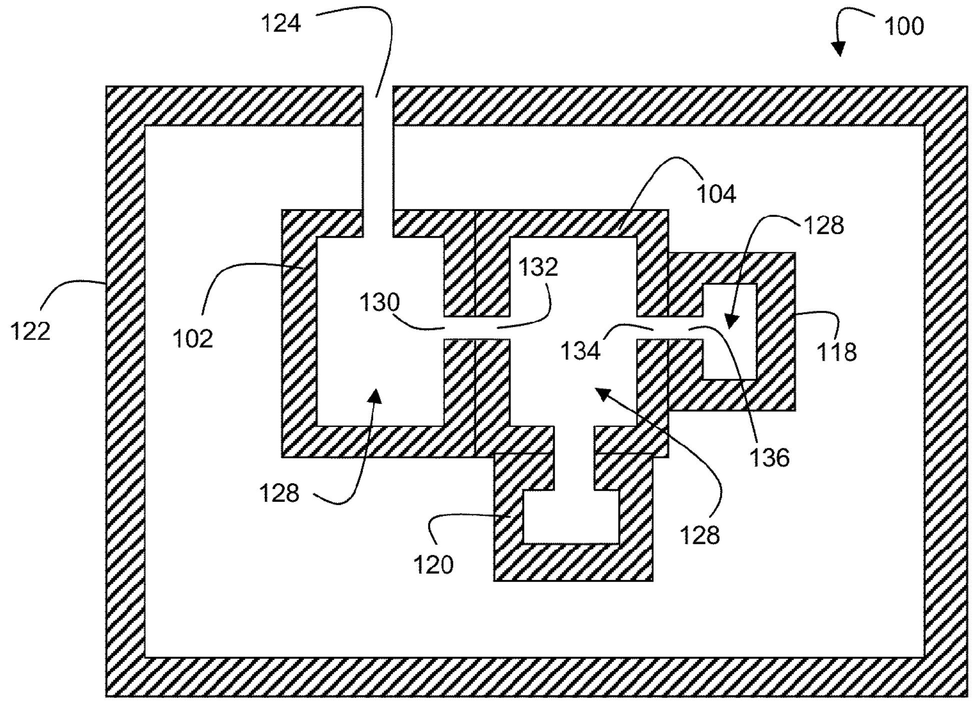
FIG. 1C is a cross-sectional diagram of another embodiment of a mass spectrometer.

Although sample inlet 124 is positioned in FIGS. 1A and 1B so that gas particles enter ion trap 104 from the environment outside housing 122, more generally sample inlet 124 can also be positioned at other locations. For example, FIG. 1C shows a partial cross-sectional diagram of spectrometer 100 in which sample inlet 124 is positioned so that gas particles enter ion source 102 from the environment outside housing 122. In addition to the configuration shown in FIG. 1C, sample inlet 124 can generally be positioned at any location along gas path 128, provided that the position of sample inlet 124 allows gas particles to enter gas path 128 from the environment outside housing 122.

Communication interface 117 can, in general, be a wired or wireless communication interface (or both). Through communication interface 117, controller 108 can be configured to communicate with a wide variety of devices, including remote computers, mobile phones, and monitoring and security scanners. Communication interface 117 can be configured to transmit and receive data over a variety of networks, including but not limited to Ethernet networks, wireless WiFi networks, cellular networks, and Bluetooth wireless networks. Controller 108 can communicate with remote devices using communication interface 117 to obtain a variety of information, including operating and configuration settings for spectrometer 100, and information relating to substances of interest, including records of mass spectra of known substances, hazards associated with particular substances, classes of compounds to which substances of interest belong, and/or spectral features of known substances. This information can be used by controller 108 to analyze sample measurements. Controller 108 can also transmit information to remote devices, including alerting messages when certain substances (e.g., hazardous and/or explosive substances) are detected by spectrometer 100.

The mass spectrometers disclosed herein are both compact and capable of low power operation. To achieve both compact size and low power operation, the various spectrometer components, including ion source 102, ion trap 104, detector 118, pressure regulation subsystem 120, and voltage source 106, are carefully designed and configured to minimize space requirements and power consumption. In conventional mass spectrometers, the vacuum pumps used to achieve low internal operating pressures (e.g., $1\times10^{-3}$ Torr or considerably less) are both large and consume significant amounts of electrical power. For example, to reach such pressures, conventional mass spectrometers typically employ a series of two or more pumps, including a rough pump that rapidly reduces the internal system pressure from atmospheric pressure to about 0.1-10 Torr, and one or more turbomolecular pumps that reduce the internal system pressure from 10 Torr to the desired internal operating pressure. Both rough pumps and turbomolecular pumps are mechanical pumps that require significant quantities of electrical power to run. Rough pumps (which can include, for example, piston-based pumps) typically generate significant mechanical vibrations. Turbomolecular pumps are typically sensitive to both vibrations and mechanical shocks, and produce effects that are similar to a gyroscope due to their high rotational speeds. As a result, conventional mass spectrometers include power sources sufficient to meet the consumption requirements of their vacuum pumps, and isolation mechanisms (e.g., vibrational and/or rotational isolation mechanisms) to ensure that these pumps remain operating. Conventional mass spectrometers may even require that while operating, the turbomolecular pumps therein cannot be moved, as doing so may result in mechanical vibrations that would destroy these pumps. As a result, the combination of vacuum pumps and electrical power sources used in conventional mass spectrometers makes them large, heavy, and immobile.

In contrast, the mass spectrometer systems and methods disclosed herein are compact, mobile, and achieve low power operation. These characteristics are realized in part by eliminating the turbomolecular, rough, and other large mechanical pumps that are common to conventional spectrometers. In place of these large pumps, small, low power single mechanical pumps are used to control gas pressure within the mass spectrometer systems. The single mechanical pumps used in the mass spectrometer systems disclosed herein cannot reach pressures as low as conventional turbomolecular pumps. As a result, the systems disclosed herein operate at higher internal gas pressures than conventional mass spectrometers.

As will be explained in greater detail below, operating at higher pressure generally degrades the resolution of a mass spectrometer, due to a variety of mechanisms such as collision-induced line broadening and charge exchange among molecular fragments. As used herein, "resolution" is defined as the full width at half-maximum (FWHM) of a measured mass peak. The resolution of a particular mass spectrometer is determined by measuring the FWHM for all peaks that appear within the range of mass-to-charge ratios from 100 to 125 amu, and selecting the largest FWHM that corresponds to a single peak (e.g., peak widths that correspond to closely spaced sets of two or more peaks are excluded) as the resolution. To determine the resolution, a chemical substance with a well known mass spectrum, such as toluene, can be used.

While the resolution of a mass spectrometer may be degraded when operating at higher pressures, the mass spectrometers disclosed herein are configured so that reduced resolution does not compromise the usefulness of the spectrometers. Specifically, the mass spectrometers disclosed herein are configured so that when a chemical substance of interest is scanned using a spectrometer, the spectrometer reports to the user information relating to an identity of the substance, rather than a mass-resolved spectrum of molecular ions, as is common in conventional mass spectrometers. In some embodiments, the algorithms used in the mass spectrometers disclosed herein can compare measured ion fragmentation patterns to information about known fragmentation patterns to determine information such as an identity of the substance of interest, hazard information relating to the substance of interest, and/or one or more classes of compounds to which the substance of interest belongs. In certain embodiments, the algorithms can include expert systems to determine information about the identity of the substance of interest. For example, digital filters can be used to search for particular features in measured spectra for a substance of interest, and the substance can be identified as corresponding to a particular target substance or not corresponding to the target substance based on the presence or absence of the features in the spectra.

When controller 108 performs the foregoing analyses, reduced resolution due to operation at high pressure can be compensated for by the systems disclosed herein. That is, provided a reliable correspondence between a measured fragmentation pattern and reference information can be achieved, the lower resolution due to high pressure operation is of little consequence to users of the mass spectrometers disclosed herein. Thus, even though the mass spectrometers disclosed herein operate at higher pressures than conventional mass spectrometers, they remain useful for a wide variety of applications such as security scanning, medical diagnostics, and laboratory analysis, in which the user is primarily concerned with identifying a substance of interest rather than examining the substance's ion fragmentation pattern in detail, and where the user may not have advanced training in the interpretation of mass spectra.

By using a single, small mechanical pump, the weight, size, and power consumption of the mass spectrometers disclosed herein is substantially reduced relative to conventional mass spectrometers. Thus, the mass spectrometers disclosed herein generally include pressure regulation subsystem 120, which features a small mechanical pump, and which is configured to maintain an internal gas pressure (e.g., a gas pressure in gas path 128, and in ion source 102, ion trap 104, and detector 118, all of which are connected to gas path 128) of between 100 mTorr and 100 Torr (e.g., between 100 mTorr and 500 mTorr, between 500 mTorr and 100 Torr, between 500 mTorr and 10 Torr, between 500 mTorr and 5 Torr, between 100 mTorr and 1 Torr). In some embodiments, the pressure regulation subsystem is configured to maintain an internal gas pressure in the mass spectrometers disclosed herein of more than 100 mTorr (e.g., more than 500 mTorr, more than 1 Torr, more than 10 Torr, more than 20 Torr).

At the foregoing pressures, the mass spectrometers disclosed herein detect ions at a resolution of 10 amu or better. For example, in some embodiments, the resolution of the mass spectrometers disclosed herein, measured as described above, is 10 amu or better (e.g., 8 amu or better, 6 amu or better, 5 amu or better, 4 amu or better, 3 amu or better, 2 amu or better, 1 amu or better). In general, any of these resolutions can be achieved at any of the foregoing pressures using the mass spectrometers disclosed herein.

In addition to a pump, pressure regulation subsystem 120 can include a variety of other components. In some embodiments, pressure regulation subsystem 120 includes one or more pressure sensors. The one or more pressure sensors can be configured to measure gas pressure in a fluid conduit to which pressure regulation subsystem 120 is connected, e.g., gas path 128. Measurements of gas pressure can be transmitted to a pump within pressure regulation subsystem 120, and/or to controller 108, and can be displayed on display 116. In certain embodiments, pressure regulation subsystem 120 can include other elements for fluid handling such as one or more valves, apertures, sealing members, and/or fluid conduits.

To ensure that the pressure regulation subsystem functions efficiently to control the internal pressure in the mass spectrometers disclosed herein, the internal volume of the spectrometers (e.g., the volume that is pumped by the pressure regulation subsystem) is significantly reduced relative to the internal volume of conventional mass spectrometers. Reducing the internal volume has the added benefit of reducing the overall size of the mass spectrometers disclosed herein, making them compact, portable, and capable of one-handed operation by a user.

As shown in FIGS. 1B and 1C, the internal volume of the mass spectrometers disclosed herein includes the internal volumes of ion source 102, ion trap 104, and detector 118, and regions between these components. More generally, the internal volume of the mass spectrometers disclosed herein corresponds to the volume of gas path 128—that is, the volumes of all of the connected spaces within mass spectrometer 100 where gas particles and ions can circulate. In some embodiments, the internal volume of mass spectrometer 100 is 10 $cm^3$ or less (e.g., 7.0 $cm^3$ or less, 5.0 $cm^3$ or less, 4.0 $cm^3$ or less, 3.0 $cm^3$ or less, 2.5 $cm^3$ or less, 2.0 $cm^3$ or less, 1.5 $cm^3$ or less, 1.0 $cm^3$ or less).

Figure 1D:
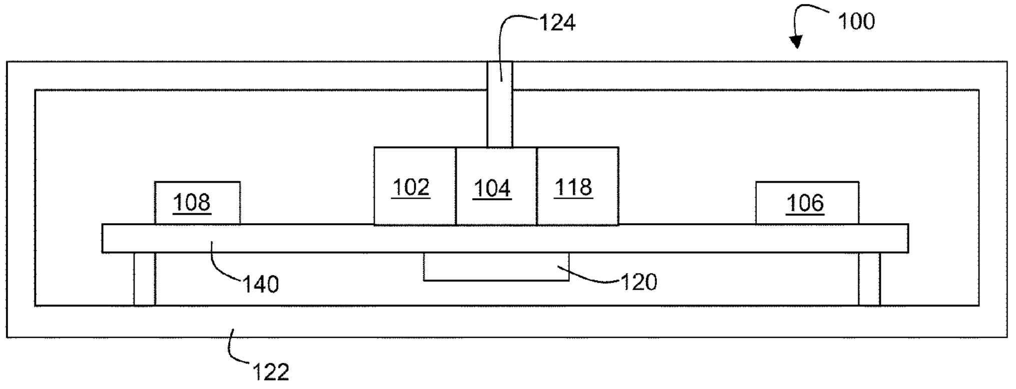
FIG. 1D is a schematic diagram of a mass spectrometer with components mounted to a support base.

In some embodiments, the mass spectrometers disclosed herein are fully integrated on a single support base. FIG. 1D is a schematic diagram of an embodiment of mass spectrometer 100 in which all of the components of spectrometer 100 are integrated onto a single support base 140. As shown in FIG. 1D, ion source 102, ion trap 104, detector 118, controller 108, and voltage source 106 are each mounted to, and electrically connected to, support base 140. Support base 140 is a printed circuit board, and includes control lines that extend between the components of spectrometer 100. Thus, for example, voltage source 106 provides electrical power to ion source 102, ion trap 104, detector 118, controller 108, and pressure regulation subsystem 120 through control lines (e.g., control lines 126*a-e*) integrated into support base 140. Further, ion source 102, ion trap 104, detector 118, pressure regulation subsystem 120, and voltage source 106 are each connected to controller 108 through control lines (e.g., control lines 127*a-e*) integrated into support base 140, so that controller 108 can send and receive electrical signals to each of these components through support base 140.

Integration on a single support base such as a printed circuit board provides a number of important advantages. Support base 140 provides a stable platform for the components of spectrometer 100, ensuring that each of the components is mounted stably and securely, and reducing the likelihood that components will be damaged during rough handling of spectrometer 100. In addition, mounting all components on a single support base simplifies manufacturing of spectrometer 100, as support base 140 provides a reproducible template for the positioning and connection of the various components to one another. Further, by integrating all of the control lines onto the support base, such that both electrical power and control signals are transmitted between components through support base 140, the integrity of the electrical connections between components can be maintained—such connections are less susceptible to wear and/or breakage than connections formed by individual wires extending between components.

Further, by integrating the components of spectrometer 100 onto a single support base, spectrometer 100 has a compact form factor. In particular, a maximum dimension of support base 140 (e.g., a largest linear distance between any two points on support base 140) can be 25 cm or less (e.g., 20 cm or less, 15 cm or less, 10 cm or less, 8 cm or less, 7 cm or less, 6 cm or less).

As shown in FIG. 1D, support base 140 is mounted to housing 122 using mounting pins 145. In some embodiments, mounting pins 145 are designed to insulate support base 140 (and the components mounted to support base 140) from mechanical shocks. For example, mounting pins 145 can include shock absorbing materials (e.g., compliant materials such as soft rubber) to insulate support base 140 against mechanical shocks. As another example, grommets or spacers formed from shock absorbing materials can be positioned between support base 140 and housing 122 to insulate support base 140 against mechanical shocks.

Figure 1E:
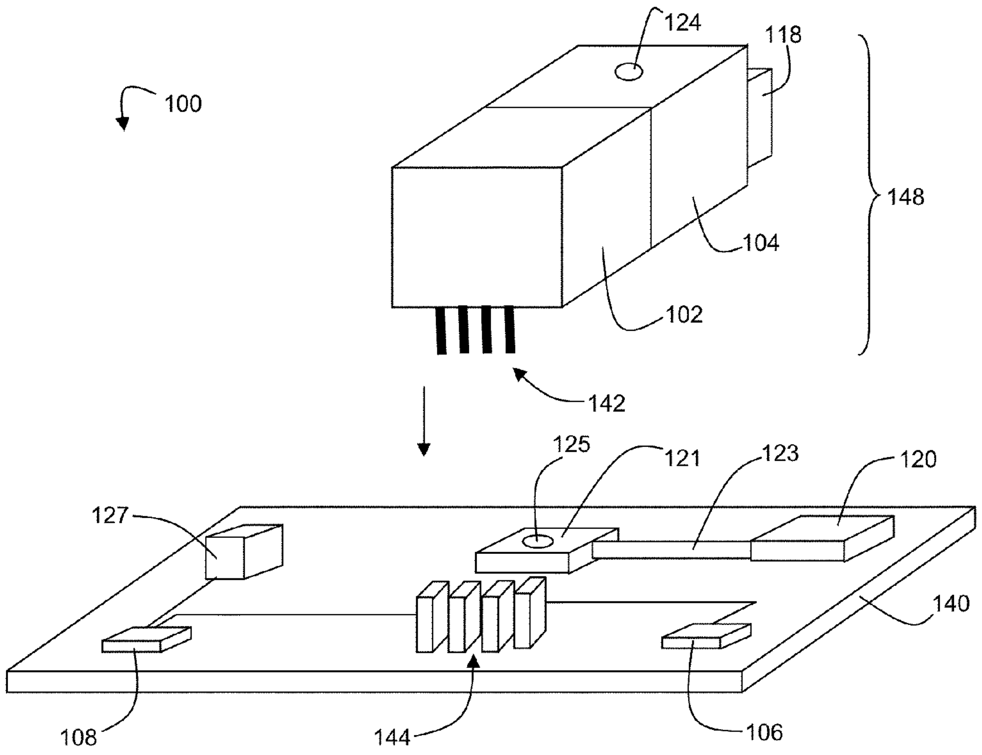
FIG. 1E is a schematic diagram of a mass spectrometer with a pluggable module.

In some embodiments, the mass spectrometers disclosed herein include a pluggable, replaceable module in which multiple system components are integrated. FIG. 1E is a schematic diagram of an embodiment of mass spectrometer 100 that includes a pluggable, replaceable module 148 and a support base 140 configured to receive module 148. Ion source 102, ion trap 104, detector 118, and sample inlet 124 are each integrated into module 148.

Module 148 also includes a plurality of electrodes 142 that extend outward from the module. Within module 148, electrodes 142 are connected to each of the components within the module, e.g., to ion source 102, ion trap 104, and detector 118.

Also shown in FIG. 1E is a support base 140 (e.g., a printed circuit board) on which controller 108, voltage source 106, and pressure regulation subsystem 120 are mounted. Support base 140 includes a plurality of electrodes 144 that are configured to releasably engage and disengage electrodes 142 of module 148. In some embodiments, for example, electrodes 142 are pins, and electrodes 144 are sockets configured to receive electrodes 142. Alternatively, electrodes 144 can be pins, and electrodes 142 can be sockets configured to receive the pins. Module 148 can be connected to support base 140 by applying a force in the direction shown by the arrow in FIG. 1E with electrodes 142 of module 148 aligned with corresponding electrodes 144 of support base, so that module 148 can be releasably connected to, or disconnected from, support base 140. Module 148 can be disengaged from support base 140 by applying a force in a direction opposite to the arrow.

Electrodes 144 of support base 140 are connected to controller 108 and voltage source 106, as shown in FIG. 1E. When a connection is established between electrodes 142 and electrodes 144, controller 108 can send and receive signals to/from each of the components integrated within module 148, as discussed above in connection with control lines 127. Further, voltage source 106 can provide electrical power to each of the components integrated within module 148, as discussed above in connection with control lines 126

Pressure regulation subsystem 120, which is mounted to support base 140, is connected to a manifold 121 via conduit 123 Manifold 121, which includes one or more apertures 125, is positioned on support base 140 so that when module 148 is connected to support base 140, a sealed fluid connection is established between manifold 121 and module 148. In particular, a fluid connection is established between apertures 125 in manifold 121 and corresponding apertures in module 148 (not shown in FIG. 1E). The apertures in module 148 can be formed in the walls of ion source 102, ion trap 104, and/or detector 118. When the sealed fluid connection is established, pressure regulation subsystem 120 can control gas pressure within the components of module 148 by pumping gas particles out of the module through manifold 121.

Other configurations of module 148 are also possible. In some embodiments, for example, detector 118 is not part of module 148, and is instead mounted to support base 140. In such a configuration, detector 118 is positioned on support base 140 so that when module 148 is connected to support base 140, a sealed fluid connection is established between ion trap 104 and detector 118. Establishing a sealed fluid connection allows circulating ions within ion trap 104 to be ejected from the trap and detected using detector 118, and also allows pressure regulation subsystem 120 to maintain reduced gas pressure (e.g., between 100 mTorr and 100 Torr) in detector 118.

In certain embodiments, pressure regulation subsystem 120 can be integrated into module 148. For example, pressure regulation subsystem 120 can be attached to the underside of ion trap 104 and connected directly to gas path 128 within module 148. Pressure regulation subsystem 120 is also electrically connected to electrodes 142 of module 148. When module 148 is connected to support base 140, pressure regulation subsystem 120 can transmit and receive electrical signals to/from controller 108 and voltage source 106 through electrodes 142.

The modular configuration of mass spectrometer 100 shown in FIG. 1E provides a number of advantages. For example, during operation of mass spectrometer 100, certain components can become contaminated with analyte residues. For example, analyte residues can adhere to the walls of the ion trap 104, reducing the efficiency with which ion trap 104 can separate ions, and contaminating analyses of other substances. By integrating ion trap 104 within module 148, the entire module 148 can be replaced easily and rapidly if ion trap 104 is contaminated, ensuring that mass spectrometer 100 can quickly be returned to operational status in the field even by an untrained user. Similarly, if either ion source 102 or detector 118 becomes contaminated or undergoes failure, module 148 can easily be replaced by a user of spectrometer 100 to return spectrometer 100 to operation.

The modular configuration shown in FIG. 1E also ensures that spectrometer 100 remains compact and portable. In some embodiments, for example, a maximum dimension of module 148 (e.g., a maximum linear distance between any two points on module 148) is 10 cm or less (e.g., 9 cm or less, 8 cm or less, 7 cm or less, 6 cm or less, 5 cm or less, 4 cm or less, 3 cm or less, 2 cm or less, 1 cm or less).

A module 148 with reduced functionality (e.g., a module that has become contaminated with analyte particles that adhere to interior walls of ion source 102, ion trap 104, and/or detector 118) can be regenerated and returned to use. In some embodiments, to return a module 148 to normal operation, the module can be heated while it is installed within spectrometer 100. Heating can be accomplished using a heating element 127 mounted on support base 140. As shown in FIG. 1E, heating element 127 is positioned on support base 140 so that when module 148 is connected to support base 140, heating element 127 contacts one or more of the components of module 148 (e.g., ion source 102, ion trap 104, and detector 118).

Controller 108 can be configured to activate heating element 127 by directing voltage source 106 to apply suitable electrical potentials to heating element 127. Commencement of heating, and the temperature and duration of heating, can be controlled by a user of spectrometer 100, e.g., by activating a control on display 116 and/or by entering user configuration settings into storage unit 114. In certain embodiments, controller 108 can be configured to determine automatically when regeneration of module 148 is appropriate. For example, controller 108 can monitor detected ion currents over a period of time, and if the ion current falls by more than a threshold amount (e.g., 25% or more, 50% or more, 60% or more, 70% or more) within a particular time period (e.g., 1 hour or more, 5 hours or more, 10 hours or more, 24 hours or more, 2 days or more, 5 days or more, 10 days or more), then controller 108 determines that regeneration of module 148 is needed.

Although heating element 127 is mounted on support base 140 in FIG. 1E, other configurations are also possible. In some embodiments, for example, heating element 147 is part of module 148, and can be attached so that it directly contacts some or all of the components of module 148 (e.g., ion source 102, ion trap 104, and detector 118).

In certain embodiments, module 148 can be removed from spectrometer 100 for regeneration. For example, when module 148 exhibits reduced functionality (e.g., as determined by a user of spectrometer 100, or as determined automatically by controller 108 using the above criteria), module 148 can be removed from spectrometer 100 and heated to restore it to normal operating condition. Heating can be accomplished in a variety of ways, including heating in general purpose ovens. In some embodiments, spectrometer 100 can include a dedicated plug-in heater that includes a slot configured to receive module 148. When a module is inserted into the slot and the heater is activated, the module is heated to restore its functionality.

While ion source 102, ion trap 104, and detector 118 are generally configured to detect and identify a wide variety of chemical substances, in certain embodiments these components can be specifically tailored for detection of certain classes of substances. In some embodiments, ion source 102 can be specifically configured for use with certain substances. For example, different electrical potentials can be applied to the electrodes of ion source 102 to generate either positive or negative ions from gas particles. Further, the magnitudes of the electrical potentials applied to the electrodes of ion source 102 can be varied to control the efficiency with which certain substances ionize. In general, different substances have different affinities for ionization depending upon their chemical structure. By adjusting the polarity and the electrical potential difference between electrodes of ion source 102, ionization of a variety of substances can be carefully controlled.

In certain embodiments, ion trap 104 can be specifically configured for use with certain substances. For example, the internal dimensions (e.g., the internal diameter) of ion trap 104 can be selected to favor trapping and detection of ions with higher mass-to-charge ratio.

In some embodiments, internal gas pressures within one or more of ion source 102, ion trap 104, and detector 118 can be selected to favor softer or harder ionization mechanisms, or positive or negative ion generation. Further, the magnitudes and polarities of the electrical potentials applied to the electrodes of ion source 102 and ion trap 104 can be selected to favor certain ionization mechanisms. As discussed above, different substances have different affinities for ionization, and may ionize more efficiently in one manner (e.g., according to one mechanism) than another. By adjusting the gas pressures and electrical potentials applied to various electrodes within spectrometer 100, the spectrometer can be adapted to specifically detect a wide variety of substances and classes of substances. In addition, by adjusting the geometry of ion trap 104 and/or the electrical potentials applied to its electrodes, the mass window of ion trap 104 (e.g., the range of ion mass-to-charge ratios that can be maintained in circulating orbit within ion trap 104) can be selected.

In certain embodiments, ion source 102 can include a particular type of ionizer tailored for certain types of substances. For examples, ionization sources based on glow discharge ionization, electrospray mass ionization, capacitive discharge ionization, dielectric barrier discharge ionization, and any of the other ionizer types disclosed herein can be used in ion source 102.

In some embodiments, detector 118 can be specifically tailored for certain types of detection tasks. For example, detector 118 can any one or more of the detectors disclosed herein. The detectors can be arranged in specific configurations, e.g., in array form, with a plurality of detection elements such as a plurality of Faraday cup detectors, as will be discussed subsequently, and/or in any arrangement within detector 118. In addition to being tailored for detection of certain substances, detector 118 can also be tailored for use with certain types of ion sources and ion traps. For example, the arrangement and types of detection elements within detector 118 can be selected to correspond to the arrangement of ion chambers within ion trap 104, particularly where ion trap 104 includes multiple ion chambers.

In certain embodiments, one or more internal surfaces of module 148 (e.g., of ion source 102 and/or ion trap 104 and/or detector 118) can include one or more coatings and/or surface treatments. The coatings and/or surface treatments can be adapted for specific applications, including detection of specific types of substances, operation within specific gas pressure ranges, and/or operation at certain applied electrical potentials. Examples of coatings and surface treatments that can be used to tailor module 148 for specific substances and/or applications incude Teflon® (more generally, fluorinated polymer coatings), anodized surfaces, nickel, and chrome.

Other components of module 148 can also be adapted to detect specific substances or classes of substances. For example, sample inlet 124 can be equipped with a filter (e.g., filter 706 in FIG. 7B, which will be discussed in a later section) that is configured to selectively allow only certain classes of substances to pass into spectrometer 100, or similarly, delay the passage of certain materials into the spectrometer compared to the passage of others. In some embodiments, for example, the filter can include a HEPA filter (or a similar type of filter) that removes solid, micron-sized particles such as dust particles from the flow of gas particles that enters sample inlet 124. In certain embodiments, the filter can include a molecular sieve-based filter that removes water vapor from the flow of gas particles that enters sample inlet 124. Both of these types of filters do not filter atmospheric gas particles (e.g., nitrogen molecules and oxygen molecules), and instead allow atmospheric gas particles to pass through and enter gas path 128 of spectrometer 100. Where this disclosure refers to a filter—such as filter 706—that does not remove or filter atmospheric gas particles, it is to be understood that the filter allows at least 95% or more of the atmospheric gas particles that encounter the filter to pass through.

Accordingly, in some embodiments, mass spectrometer 100 can include multiple replaceable modules 148. Some of the modules can be the same, and can function as direct replacements for one another (e.g., in the event of contamination). Other modules can be configured for different modes of operation. For example, the multiple replaceable modules 148 can be configured to detect different classes of substances. A user operating spectrometer 100 can select a suitable module for a particular class of substances, and can plug in the selected module to support base 140 prior to initiating an analysis. To analyze a different class of substances, the user can disengage the first module from support base 140, select a new module, and plug in the new module to support base 140. As a result, re-configuring the components of mass spectrometer 100 for a variety of different applications is rapid and straightforward.

Modules can also be specifically configured to different types of measurements (e.g, using different ionization methods, different trapping and/or ejection potentials applied to the electrodes of ion trap 104, and/or different detection methods). In general, each of the multiple replaceable modules 148 can include any of the features disclosed herein. Thus, some of the modules can differ based on their ion sources, some of the modules can differ based on their ion traps, and some of the modules can differ based on their detectors. Certain modules may differ from one another based on more than one of these components.

Figure 1F:
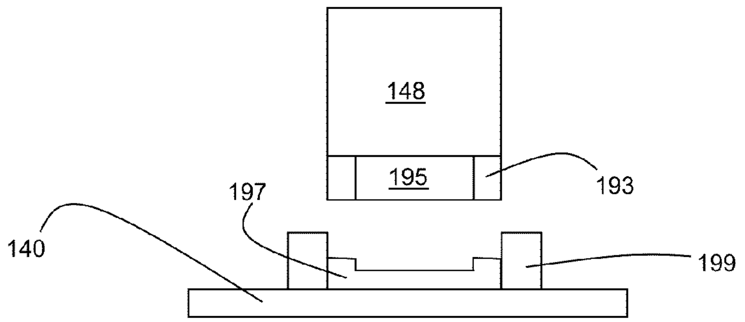
FIG. 1F is a schematic diagram of an attachment mechanism for connecting a module of a mass spectrometer to a support base.

In some embodiments, one or more attachment mechanisms can be used to secure module 148 to support base 140. Referring to FIG. 1F, module 148 includes a first attachment mechanism 195 in the form of a extended member that engages with a second attachment mechanism 197 on support base 140. In some embodiments, extended member 195 can be positioned on support base 140 and a complementary attachment mechanism is included on module 148. In some embodiments, attachment mechanism 195 can be a cam that rotatably engages with attachment mechanism 197, which includes a recess configured to receive the cam, for example. In certain embodiments, one or more sealing members 193 (e.g., o-rings, gaskets, and/or other sealing members) formed of flexible materials such as rubber and/or silicone can be positioned to seal the connection between module 148 and support base 140.

In certain embodiments, attachment mechanisms 195 and 197 can be keyed so that module 148 will only connect to support base 140 in a single orientation. Keying the attachment mechanisms has the advantage that it prevents a user from installing module 148 in an incorrect orientation.

In some embodiments, other attachment mechanisms can be used. For example, support base 140 and/or module 148 can include a clamp 199 that fixes module 148 to support base 140. One or more clamps can be used. In addition, clamps can be used in addition to other attachment mechanisms.

In the following sections, the various components of mass spectrometer 100 will be discussed in greater detail, and various operating modes of spectrometer 100 will also be discussed.

II. Ion Source

In general, ion source 102 is configured to generate electrons and/or ions. Where ion source 102 generates ions directly from gas particles that are to be analyzed, the ions are then transported from ion source 102 to ion trap 104 by suitable electrical potentials applied to the electrodes of ion source 102 and ion trap 104. Depending upon the magnitude and polarity of the potentials applied to the electrodes of ion source 102 and the chemical structure of the gas particles to be analyzed, the ions generated by ion source 102 can be positive or negative ions. In some embodiments, electrons and/or ions generated by ion source 102 can collide with neutral gas particles to be analyzed to generate ions from the gas particles. During operation of ion source 102, a variety of ionization mechanisms can occur at the same time within ion source 102, depending upon the chemical structure of the gas particles to be analyzed and the operating parameters of ion source 102.

By operating at higher internal gas pressures than conventional mass spectrometers, the compact mass spectrometers disclosed herein can use a variety of ion sources. In particular, ion sources that are small and that require relatively modest amounts of electrical power to operate can be used in spectrometer 100. In some embodiments, for example, ion source 102 can be a glow discharge ionization (GDI) source. In certain embodiments, ion source 102 can be a capacitive discharge ion source.

A variety of other types of ion sources can also be used in spectrometer 100, depending upon the amount of power required for operation and their size. For example, other ion sources suitable for use in spectrometer 100 include dielectric barrier discharge ion sources and thermionic emission sources. As a further example, ion sources based on electrospray ionization (ESI) can be used in spectrometer 100. Such sources can include, but are not limited to, sources that employ desorption electrospray ionization (DESI), secondary ion electrospray ionization (SESI), extractive electrospray ionization (EESI), and paper spray ionization (PSI). As yet another example, ion sources based on laser desorption ionization (LDI) can be used in spectrometer 100. Such sources can include, but are not limited to, sources that employ electrospray-assisted laser desorption ionization (ELDI), and matrix-assisted laser desorption ionization (MALDI). Still further, ion sources based on techniques such as atmospheric solid analysis probe (ASAP), desorption atmospheric pressure chemical ionization (DAPCI), desorption atmospheric pressure photoionization (DAPPI), and sonic spray ionization (SSI) can be used in spectrometer 100. Ion sources based on arrays of nanofibers (e.g., arrays of carbon nanofibers) are also suitable for use. Other aspects and features of the foregoing ion sources, and other examples of ion sources suitable for use in spectrometer 100, are disclosed, for example, in the following publications, the entire contents of each of which is incorporated by reference herein: Alberici et al., "Ambient mass spectrometry: bringing MS into the 'real world,'" *Anal. Bioanal. Chem.* 398: 265-294 (2010). Harris et al. "Ambient Sampling/Ion Mass Spectrometry: Applications and Current Trends," *Anal. Chem.* 83: 4508-4538 (2011); and Chen et al., "A Micro Ionizer for Portable Mass Spectrometers using Double-gated Isolated Vertically Aligned Carbon Nanofiber Arrays," *IEEE Trans. Electron Devices* 58(7): 2149-2158 (2011).

GDI sources are particularly advantageous for use in spectrometer 100 because they are compact and well suited for low power operation. The glow discharge that occurs when these sources are active occurs only when gas pressures are sufficient, however. Typically, for example, GDI sources are limited in operation to gas pressures of approximately 200 mTorr and above. At pressures lower than 200 mTorr, sustaining a stable glow discharge can be difficult. As a result, GDI sources are not used in conventional mass spectrometers, which operate at pressures of 1 mTorr or less. However, because the mass spectrometers disclosed herein typically operate at gas pressures of between 100 mTorr and 100 Torr, GDI sources can be used.

Figure 2A:
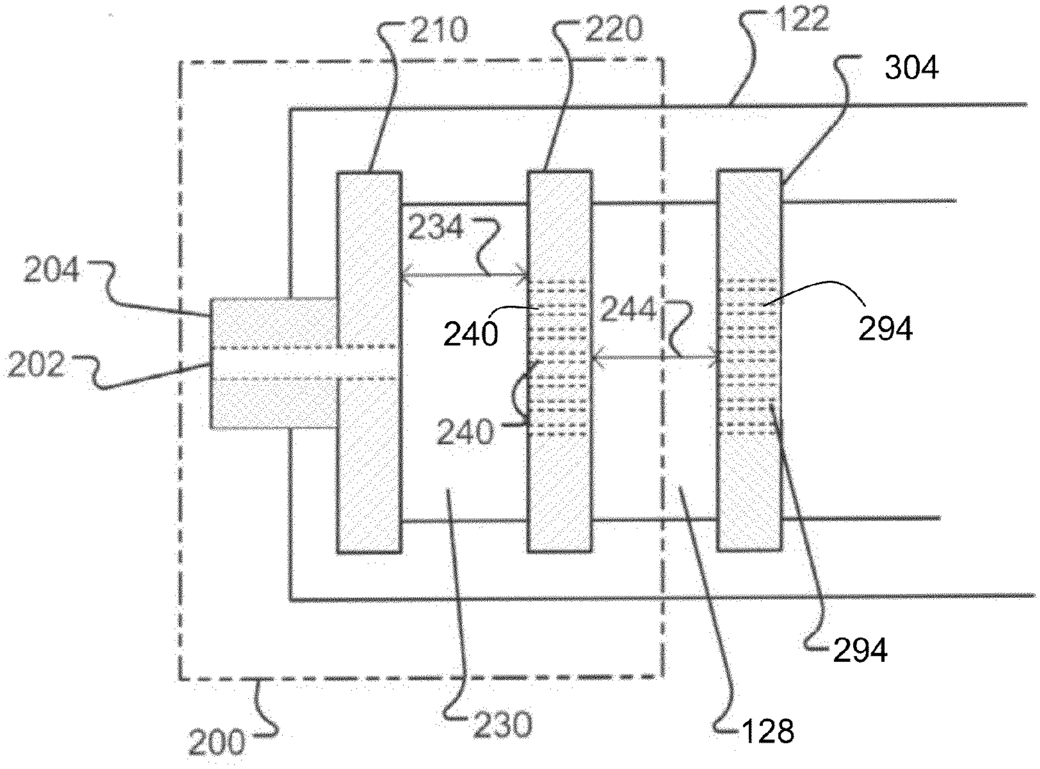
FIGS. 2A and 2B are schematic diagrams of a glow discharge ion source.

FIG. 2A shows an example of a GDI source 200 that includes a front electrode 210 and a back electrode 220. The two electrodes 210 and 220, along with the housing 122, form the GDI chamber 230. In some embodiments, GDI source 200 can also include a housing that encloses the electrodes of the source. For example, in the embodiment shown in FIG. 2B, GDI chamber 230 has a separate housing 232 which encloses electrodes 210 and 220. Housing 232 is. secured or fitted to housing 122 via fixing elements 250 (e.g., clamps, screws, threaded fasteners, or other types of fasteners).

Figure 2B:
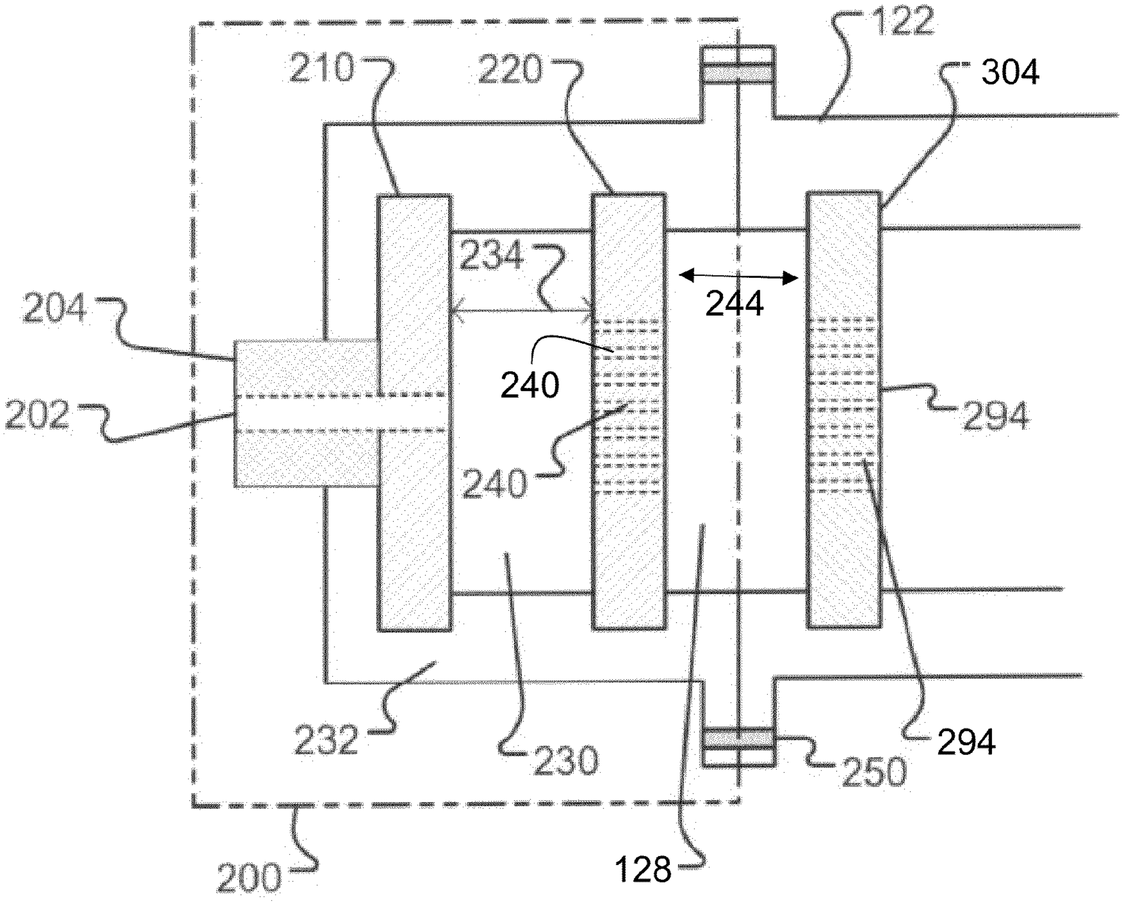

As shown in FIGS. 2A and 2B, front electrode 210 has an aperture 202 in which gas particles to be analyzed enter GDI chamber 230. As used herein, the term "gas particles" refers to atoms, molecules, or aggregated molecules of a gas that exist as separate entities in the gaseous state. For example, if the substance to be analyzed is an organic compound, then the gas particles of the substance are individual molecules of the substance in the gas phase.

Aperture 202 is surrounded by an insulating tube 204. In FIGS. 2A and 2B, aperture 202 is connected to sample inlet 124 (not shown), so that gas particles to be analyzed are drawn into GDI chamber 230 due to the pressure difference between the atmosphere external to spectrometer 100 and GDI chamber 230. In addition to gas particles to be analyzed, atmospheric gas particles are also drawn into GDI chamber 230 due to the pressure difference. As used herein, the term "atmospheric gas particles" refers to atoms or molecules of gases in air, such as molecules of oxygen gas and nitrogen gas.

In some embodiments, additional gas particles can be introduced into GDI source 200 to assist in the generation of electrons and/or ions in the source. For example, as explained above in connection with FIG. 1A, spectrometer 100 can include a buffer gas source 150 connected to gas path 128. Buffer gas particles from buffer gas source 150 can be introduced directly into GDI source 200, or can be introduced into another portion of gas path 128 and diffuse into GDI source 200. The buffer gas particles can include nitrogen molecules, and/or noble gas atoms (e.g., He, Ne, Ar, Kr, Xe). Some of the buffer gas particles can be ionized by electrodes 210 and 220.

Alternatively, in some embodiments, a mixture of gas particles that includes the gas particles to be analyzed and atmospheric gas particles are the only gas particles that are introduced into GDI chamber 230. In such embodiments, only the gas particles to be analyzed may be ionized in GDI chamber 230. In certain embodiments, both the gas particles to be analyzed and admitted atmospheric gas particles may be ionized in GDI chamber 230.

Although aperture 202 is positioned in the center of the front electrode 210 in FIGS. 2A and 2B, more generally aperture 202 can be positioned at a variety of locations in GDI source 200. For example, aperture 202 can be positioned in a sidewall of GDI chamber 230, where it is connected to sample inlet 124. Further, as has been described previously, in some embodiments sample inlet 124 can be positioned so that gas particles to be analyzed are drawn directly into another one of the components of spectrometer 100, such as ion trap 104 or detector 118. When the gas particles are drawn into a component other than ion source 102, the gas particles diffuse through gas path 128 and into ion source 102. Alternatively, or in addition, when the gas particles to be analyzed are drawn directly into a component such as ion trap 104, ion source 102 can generate ions and/or electrons which then collide with the gas particles to be analyzed within ion trap 104, generating ions from the gas particles directly inside the ion trap.

Thus, depending upon where the gas particles to be analyzed are introduced intro spectrometer 100 (e.g., the position of sample inlet 124), ions can be generated from the gas particles at a variety of different locations. Ion generation can occur directly in ion source 102, and the generated ions can be transported into ion trap 104 by applying suitable electrical potentials to the electrodes of ion source 102 and ion trap 104. Ion generation can also occur within ion trap 104, when charged particles such as ions (e.g., buffer gas ions) and electrons generated by ion source 102 enter ion trap 104 and collide with gas particles to be analyzed. Ion generation can occur in multiple places at once (e.g., in both ion source 102 and ion trap 104), with all of the generated ions eventually becoming trapped within ion trap 104. Although the discussion in this section focuses largely on direct generation of ions from gas particles of interest within ion source 102, the aspects and features disclosed herein are also applicable generally to the secondary generation of ions from gas particles of interest in other components of spectrometer 100.

A variety of different spacings between electrodes 210 and 220 can be used. In general, the efficiency with which ions are generated is determined by a number of factors, including the potential difference between electrodes 210 and 220, the gas pressure within GDI source 200, the distance 234 between electrodes 210 and 220, and the chemical structure of the gas particles that are ionized. Typically, distance 234 is relatively small to ensure that GDI source 200 remains compact. In some embodiments, for example, distance 234 between electrodes 210 and 220 is be 1.5 cm or less (e.g., 1 cm or less, 0.75 cm or less, 0.5 cm or less, 0.25 cm or less, 0.1 cm or less).

The gas pressure in GDI chamber 230 is generally regulated by pressure regulation subsystem 120. In some embodiments, the gas pressure in GDI chamber 230 is approximately the same as the gas pressure in ion trap 104 and/or detector 118. In certain embodiments, the gas pressure in GDI chamber 230 differs from the gas pressure in ion trap 104 and/or detector 118. Typically, the gas pressure in GDI chamber 230 is 100 Torr or less (e.g., 50 Torr or less, 20 Torr or less, 10 Torr or less, 5 Torr or less, 1 Torr or less, 0.5 Torr or less) and/or 100 mTorr or more (e.g., 200 mTorr or more, 300 mTorr or more, 500 mTorr or more, 1 Torr or more, 10 Torr or more, 20 Torr or more).

During operation, GDI source 200 generates a self-sustaining glow discharge (or plasma) when a voltage difference is applied between front electrode 210 and back electrode 220 by voltage source 106 under the control of controller 108. In some embodiments, the voltage difference can be 200V or higher (e.g., 300V or higher, 400V or higher, 500V or higher, 600V or higher, 700V or higher, 800V or higher) to sustain the glow discharge. As discussed above, detector 118 detects the ions generated by GDI source 200, and the potential difference between electrodes 210 and 220 can be adjusted by controller 108 to control the rate at which ions are generated by GDI source 200.

In some embodiments, GDI source 200 is directly mounted to support base 140, and electrodes 210 and 220 are directly connected to voltage source 106 through support base 140, as shown in FIG. 1D. In certain embodiments, GDI source 200 forms a part of module 148, and electrodes 210 and 220 are connected to electrodes 142 of module 148, as shown in FIG. 1E. When module 148 is plugged into support base 140, electrodes 210 and 220 are connected to voltage source 106 through electrodes 144 that engage electrodes 142.

By applying electrical potentials of differing polarity relative to the ground potential established by voltage source 106.

GDI source 200 can be configured to operate in different ionization modes. For example, during typical operation of GDI source 200, a small fraction of gas particles is initially ionized in GDI chamber 230 due to random processes (e.g., thermal collisions). In some embodiments, electrical potentials are applied to front electrode 210 and back electrode 220 such that front electrode 210 serves as the cathode and back electrode 220 serves as the anode. In this configuration, positive ions generated in GDI chamber 230 are driven towards the front electrode 210 due to the electric field within the chamber. Negative ions and electrons are driven towards the back electrode 220. The electrons and ions can collide with other gas particles, generating a larger population of ions. Negative ions and/or electrons exit GDI chamber 230 through the back electrode 220.

In certain embodiments, suitable electrical potentials are applied to front electrode 210 and back electrode 220 so that front electrode 210 serves as the anode and back electrode 220 serves as the cathode. In this configuration, positively charged ions generated in GDI chamber 230 leave the chamber through back electrode 220. The positively charged ions can collide with other gas particles, generating a larger population of ions.

In some embodiments, user interface 112 can include a control that allows a user to select one of the above ionization modes. The selection of an appropriate ionization mode can depend upon the nature of the substance to be analyzed by spectrometer 100. Certain substances are more efficiently ionized as positive ions, and the operating mode can be chosen such that back electrode 220 functions as the cathode. Positive ions generated while operating in this mode exit GDI source 200 through back electrode 220. Alternatively, certain substances are more efficiently ionized as negative ions, and the operating mode can be chosen such that back electrode 220 functions as the anode. Negative ions generated while operating in this mode exit GDI source 200 through back electrode 220. In general, controller 108 is configured to monitor ion currents measured by detector 118, and to select a suitable operating mode for GDI source based on the ion currents. Alternatively, or in addition, a user of spectrometer 100 can select a suitable operating mode using a control displayed on user interface 114, or by entering appropriate configuration settings into storage unit 114 of spectrometer 100.

After ions are generated and leave GDI chamber 230 through back electrode 220 in either operating mode, the ions enter ion trap 104 through end cap electrode 304. In general, back electrode 220 can include one or more apertures 240. The number of apertures 240 and their cross-sectional shapes are generally chosen to create a relatively uniform spatial distribution of ions incident on end cap electrode 304. As the ions generated in GDI chamber 230 leave the chamber through the one or more apertures 240 in back electrode 220, the ions spread out spatially from one another due to collisions and space-charge interactions. As a result, the overall spatial distribution of ions leaving GDI source 200 diverges. By selecting a suitable number of apertures 240 having particular cross-sectional shapes, the spatial distribution of ions leaving GDI source 200 can be controlled so that the distribution overlaps or fills all of the apertures 292 formed in end cap electrode 304. In some embodiments, an additional ion optical element (e.g., an ion lens) can be positioned between back electrode 220 and end cap electrode 304 to further manipulate the spatial distribution of ions emerging from GDI source 200.

However, a particular advantage of the compact ion sources disclosed herein is that suitable ion distributions can be obtained without any additional elements between back electrode 220 and end cap electrode 304.

In some embodiments, back electrode 220 includes a single aperture 240. The cross-sectional shape of aperture 240 can be circular, square, rectangular, or can correspond more generally to any regularly or irregularly shaped n-sided polygon. In certain embodiments, the cross-sectional shape of aperture 240 can be irregular.

In some embodiments, back electrode 220 includes more than one aperture 240. In general, back electrode 220 can include any number of apertures (e.g., 2 or more, 4 or more, 8 or more, 16 or more, 24 or more, 48 or more, 64 or more, 100 or more, 200 or more, 300 or more, 500 or more), spaced by any amount, provided that back electrode 220 remains mechanically stable enough to use in GDI source 200. FIGS. 2C-2H show various embodiments of back electrode 220, each with a variety of different apertures 240. As shown in FIGS. 2C-2H, back electrode 220 can generally be be circular, rectangular, or any other shape.

Figure 2C:
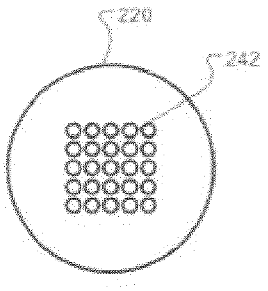
FIGS. 2C-2H are schematic diagrams showing an electrode of an ion source with apertures.
Figure 2D:
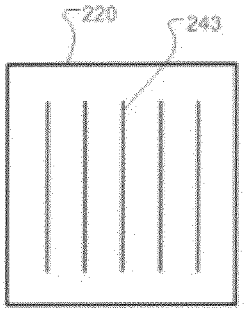
Figure 2E:
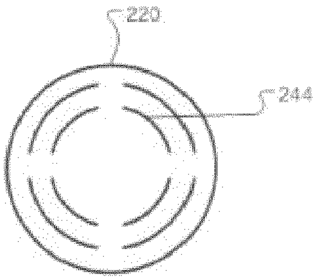
Figure 2F:
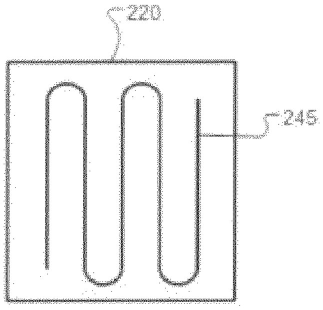
Figure 2G:
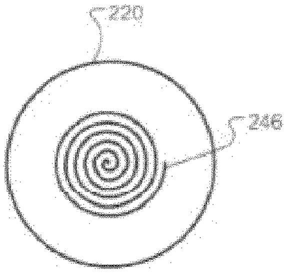

FIG. 2C shows a back electrode 220 with a regular array of apertures 242. Although 25 apertures 242 are shown in FIG. 2C, more generally any number of apertures 242 can be present. Further, although apertures 242 have circular cross-sectional shapes, more generally apertures 242 with any regular or irregular cross-sectional shape can be used. Apertures with different cross-sectional shapes can also be used in a single electrode 220. In general, the sizes of the openings formed by apertures 242 can be selected as desired, and differently sized apertures 242 can be present in a single back electrode 220. Typically, the number of apertures formed in back electrode 220 and the sizes of the apertures controls the gas pressure drop across the electrode. Accordingly, aperture sizes and numbers can also be selected to achieve a particular target pressure drop across back electrode 220 during operation of mass spectrometer 100.

FIGS. 2D-2G show further exemplary embodiments of back electrode 220 with openings 243, 244, 245, and 246, respectively. In FIGS. 2D-2G, openings 243, 244, 245, and 246 can either be formed by slits (e.g., a continuous opening), or a series of apertures formed in back electrode 220 and spaced from one another. As shown in FIGS. 2D-2G, openings 243, 244, 245, and 246 can be arranged to form an array of linear openings, an array of concentric arcs, a serpentine pathway, and a spiral pathway. The embodiments shown in FIGS. 2D-2G are only exemplary, however. More generally, a wide variety of different arrangements of apertures having different cross-sectional shapes and sizes can be used in back electrode 220.

Figure 2H:
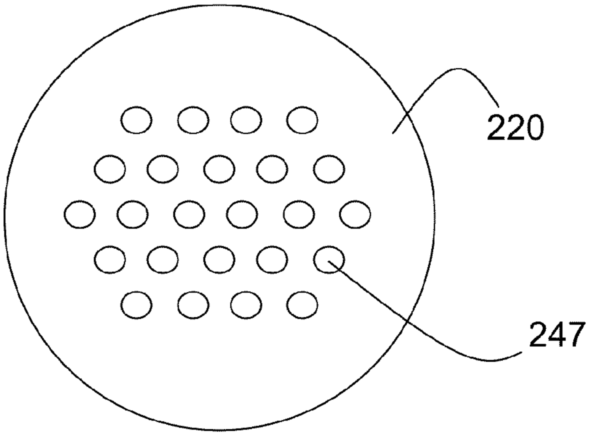

FIG. 2H shows an embodiment of back electrode 220 that includes a hexagonal array of apertures 247. The hexagonal array shown in FIG. 2H and the square or rectangular array shown in FIG. 2C are examples of regular arrays of apertures that can be formed in back electrode 220. More generally, however, a variety of different regular arrays of apertures can be used in back electrode 220, such as (but not limited to) circular arrays and radial arrays.

As shown in FIGS. 2A and 2B, end cap electrode 304 of ion trap 104 can also include one or more apertures 294. In some embodiments, end cap electrode 304 includes a single aperture 294 with a cross-sectional shape that is circular, square, rectangular, or in the shape of another n-sided polygon. In certain embodiments, the aperture has an irregular cross-sectional shape.

More generally, end cap electrode 304 can include multiple apertures 294. The types of apertures, their arrangements, and the criteria for selecting particular types of apertures for end cap electrode 304 are, in general, similar to the types, arrangements, and criteria discussed above in connection with back electrode 220. Accordingly, the foregoing discussion applies equally to apertures 294 formed in end cap electrode 304.

As shown in FIGS. 2A and 2B, back electrode 220 is spaced from end cap electrode 304 by an amount 244. The spacing between these electrodes allows ions emerging from back electrode 220 to diverge spatially to fill the apertures 294 formed in end cap electrode 304 as uniformly as possible. To further promote uniform filling of apertures 294, in some embodiments, the pattern of apertures 240 formed in back electrode 220 can be matched to the pattern of apertures 294 formed in end cap electrode 304.

More particularly, as shown for example in FIG. 2H, the pattern of apertures 247 formed in back electrode 220 defines a cross-sectional shape for back electrode 220. Similarly, the pattern of apertures formed in end cap electrode 304 defines a cross-sectional shape for end cap electrode 304. In some embodiments, the cross-sectional shapes of back electrode 220 and end cap electrode 304 are substantially matched. As used herein, "substantially matched" means that the relative positions of at least 70% or more of the apertures formed in back electrode 220 are the same as the relative positions of apertures formed in end cap electrode 304. For each aperture, its position corresponds to the position of its center of mass.

In some embodiments, the pattern of apertures 240 formed in back electrode 220 exactly matches the pattern of apertures 294 formed in end cap electrode 304, i.e., there is a one-to-one correspondence between the apertures. In general, as the extent to which the apertures are matched in back electrode 220 and end cap electrode 304 increases, distance 244 between back electrode 220 and end cap electrode 304 can be reduced, because ions emerging from back electrode 220 more uniformly fill apertures 294 in end cap electrode 304. When the matching of apertures between the electrodes is exact or nearly exact, distance 244 can even be reduced to zero (i.e., back electrode 220 can be positioned directly adjacent to end cap electrode 304), making GDI source 200 highly compact. Further, as the extent of matching between apertures increases, the number of ions entering apertures 294 can be maximized by reducing the number of ions that strike portions of end cap electrode 304 between the apertures. As a result, the ion collection efficiency of ion trap 104 is increased. Further, by increasing the efficiency with which ions generated by ion source 102 are collected within ion trap 104, the overall sizes of back electrode 220 and end cap electrode 304 can be reduced relative to single aperture electrodes and/or electrodes with unmatched apertures.

In some embodiments, back electrode 220 and end cap electrode 304 can be formed as a single element, and ions formed in GDI chamber 230 can directly enter the ion trap 104 by passing through the element. In such embodiments, the combined back and end cap electrode can include a single aperture or multiple apertures, as described above.

Further, in certain embodiments, the end cap electrodes of ion trap 104 can function as the front electrode 210 and the back electrode 220 of GDI source 200. As will be discussed in more detail subsequently, ion trap 104 includes two end cap electrodes 304 and 306 positioned on opposite sides of the trap. By applying suitable potentials (e.g., as described above with reference to front electrode 210 and back electrode 220) to these electrodes, end cap electrode 304 can function as front electrode 210, and end cap electrode 306 can function as back electrode 220. Accordingly, in these embodiments, ion trap 104 also functions as a glow discharge ion source 102.

Figure 2I:
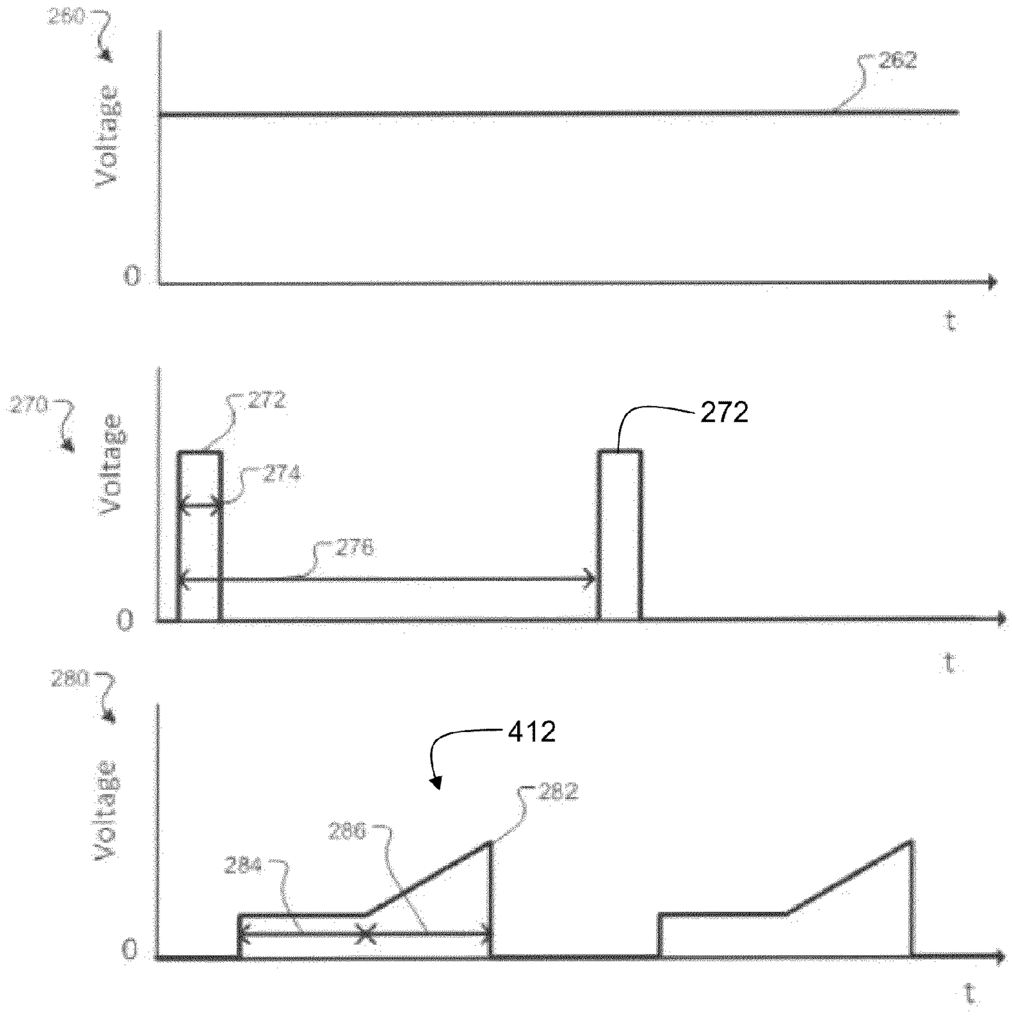
FIG. 2I is a plot showing bias potentials applied to electrodes of an ion source.

Various operating modes can be used to generate charged particles in GDI source 200. For example, in some embodiments, a continuous operating mode is used. FIG. 2I includes a graph 260 showing an embodiment of a continuous mode of operation in which a constant bias voltage 262 is applied between the front and back electrodes 210 and 220 of GDI source 200. In this mode, charged particles are continuously generated within the ion source.

In some embodiments, GDI source 200 is configured for pulsed operation. FIG. 2I includes a graph 270 showing an embodiment of pulsed mode operation, in which a bias potential 272 is applied between front and back electrodes 210 and 220 for a duration of time 274. Repeated applications of bias potential 272 define a repetition frequency for pulsed operation which corresponds to the inverse of the period 276 between successive pulses. In general, the duration of period 276 can be significantly greater (e.g., about 100 times greater) than the duration of time 274 during which bias potential 272 is applied to the electrodes. In some embodiments, for example, duration 274 can be about 0.1 ms, and period 276 can be about 10 ms. More generally, duration 274 can be 5 ms or less (e.g., 4 ms or less, 3 ms or less, 2 ms or less, 1 ms or less, 0.8 ms or less, 0.6 ms or less, 0.5 ms or less, 0.4 ms or less, 0.3 ms or less, 0.2 ms or less, 0.1 ms or less, 0.05 ms or less, 0.03 ms or less) and period 276 can be 50 ms or less (e.g., 40 ms or less, 30 ms or less, 20 ms or less, 10 ms or less, 5 ms or less).

Figure 2J:
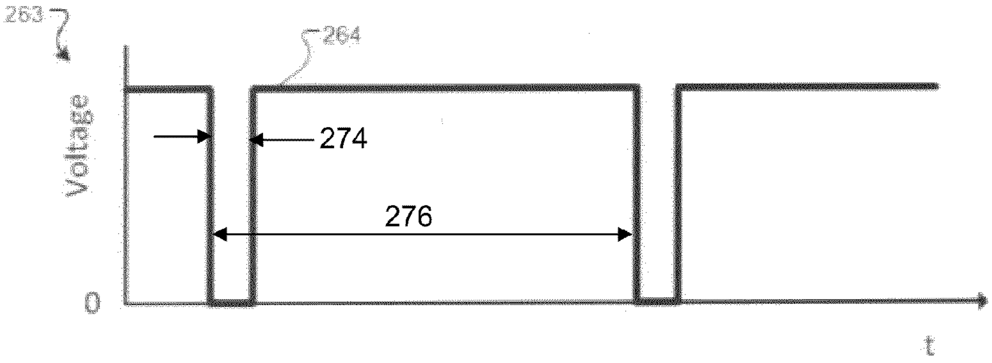
FIG. 2J is a plot showing a bias potential applied to electrodes of an ion source to clean the ion source.

Ions are generated for the duration of time 274 when bias potential 272 is applied to the electrodes. In some embodiments, the timing of the pulsed bias potential 272 during pulsed mode operation can be synchronized with modulation signal 412 used to generate high voltage RF signal 482, which is applied to the center electrode of ion trap 104, as will be discussed in more detail subsequently. Graph 280 in FIG. 2J is a plot of the modulation signal 412 that is used to generate RF signal 482 that is applied to the center electrode of ion trap 104. Comparing graph 280 to graph 270, when the pulsed bias potential 272 is applied to the electrodes of GDI source 200, the modulation signal 412 is turned off. During this time period, ions are generated in GDI source 200. Then bias potential 272 is turned off, and modulation potential 282 is turned on. During interval 284, the ions are trapped and stabilized in ion trap 104. Then, during interval 286, the trapped ions are ejected from ion trap 104 into detector 118 by increasing the amplitude of the electrical potential applied to the center electrode of ion trap 104.

Pulsed mode operation can have several advantages. For example, the repetition frequency, and the duration and/or amplitude of the pulsed bias potential 272 can be adapted to the amount of gas particles to be analyzed that are present and the gas pressure in ion trap 104. In general, controller 108 monitors the ion current measured by detector 118, and based on the magnitude of the ion current, controller 108 can adjust one or more of the parameters associated with pulsed mode operation.

In some embodiments, for example, controller 108 can adjust the amplitude of bias potential 272. Increasing the bias potential can increase the rate at which ions are produced in GDI source 200.

In certain embodiments, controller 108 can adjust the repetition frequency of bias potential 272. For some analytes of interest, increasing the repetition frequency can increase the rate at which ions are generated in GDI source 200. For other analytes, decreasing the repetition frequency can increase the rate at which ions are generated in GDI source 200. Controller 108 can be configured to adjust the repetition frequency in adaptive fashion until the rate of ion generation in GDI source 200 reaches a suitable value.

In some embodiments, controller 108 can be configured to adjust the duty cycle of GDI source 200. Referring to graph 270, the duty cycle of GDI source 200 refers to the ratio of the duration of time 274 during which bias potential 272 is applied to the total period 276. Controller 108 can be configured to adjust the duty cycle of GDI source 200. For example, the duty cycle can be reduced to reduce the rate at which ions are produced in GDI source 200. By reducing the rate at which ions are produced, the signal-to-noise ratio of the measured ion signal can be improved, and unwanted ghost peaks can be eliminated (e.g., peaks due to unwanted charged particles that are produced by GDI source 200 when measuring ions with source 200 turned off. Alternatively, the duty cycle can be increased to increase the rate at which ions are produced in GDI source 200.

In certain embodiments, controller 108 can be configured to adjust the duty to a value between 1% and 50% (e.g., between 1% and 40%, between 1% and 30%, between 1% and 20%, between 1% and 10%).

Another important advantage of pulsed mode operation is that the bias potential applied between electrodes 210 and 220 is turned off when unneeded, e.g., when source 200 has already generated ions. Turning off the bias potential during most of the duty cycle of source 200 can lead to a significant reduction in the amount of power required to operate spectrometer.

In addition, pulsed mode operation avoids the use of a gate or shield positioned between GDI source 200 and detector 118. Eliminating gates and shields, which are commonly used in conventional mass spectrometers, conserves considerable space, and further reduces the amount of power required to operate spectrometer 100.

In some embodiments, the operating condition of GDI source 200 can be checked using an automated calibration process. For example, a user can activate the calibration process where one or more known reference samples are sequentially analyzed. Detection of phantom peaks (i.e., peaks that should not exist in the measured spectra) can indicate that the GDI source 200 is contaminated. For example, either of electrodes 210 and 220 can become embedded with sticky particles or debris that may result in the detection of phantom peaks. In some calibration processes, no samples are injected, and phantom peaks are detected against a background of spectrometer noise. Determination of whether the GDI source 200 needs to be replaced can be based on the calibration results, e.g, based on the number and size of phantom peaks detected.

To facilitate replacement, in some embodiments ion source 102 can be configured as a separate module from the other components of spectrometer 100. For example, as shown in FIG. 2B, GDI source 200 can be implemented as an individual module which can be easily demounted from the other components of spectrometer 100 or from housing 122 by releasing fixing elements 250. Alternatively, electrodes 210 and 220 can be configured to be individually removable from GDI chamber 230. Removal of electrodes 210 and 220 can be achieved, for example, by removing a cover integrated into housing 122 adjacent to the position of the electrodes. When the cover is removed from housing 122, the exposed electrodes can be removed from GDI chamber 230.

In some embodiments, GDI source 200 can be cleaned instead of being replaced. For example, GDI source 200 can be cleaned by applying a potential bias to electrodes 210 and 220 that corresponds to an inverse duty cycle. FIG. 2J shows a graph 263 of an inverse duty cycle where bias potential 264—which is inverted relative to the pulsed mode bias potential shown in graph 270—is applied to electrodes 210 and 220 during the cleaning process. A constant DC potential is applied for most of the duty cycle, and is interrupted only by short potential drops of duration 274. These potential drops are repeated with a time period 276. Without wishing to be bound by theory, it is believed that the rapid voltage changes facilitate the removal of sticky particles embedded in electrodes 210 and 220. Once the GDI source 200 is determined to be cleaned (e.g., using calibration processes described above), GDI source 200 can be switched to normal operation (e.g., pulsed mode operation) for generation of ions.

In some embodiments, controller 108 is configured to adjust the duty cycle during cleaning to a value between 50% and 100% (e.g., between 50% and 90%, between 50% and 80%, between 50% and 70%, between 50% and 60%). The inverse duty cycle can be applied for a total time period of 5 s or more (e.g., 10 s or more, 20 s or more, 30 s or more, 40 s or more, 50 s or more, 1 minute or more, 2 minutes or more, 3 minutes or more, 5 minutes or more).

Other methods can also be used to clean the electrodes of GDI source 200 if they become contaminated. In some embodiments, cleaning gas can be injected into GDI chamber 230 to facilitate the removal of sticky particles on electrodes 210 and 220. Suitable cleaning gases can include noble gases, for example. Further, in certain embodiments, cleaning of the electrodes of GDI source 200 can also be facilitated by heating the electrodes 210 and 220. In some embodiments, electrodes 210 and 220 can be removed from GDI chamber 230 and cleansed in a suitable cleaning solution.

The foregoing discussion focused on the measurement of phantom peaks to determine whether GDI source 200 is contaminated. More generally, other methods can also be used in addition to, or as an alternative to, phantom peak detection. For example, controller 108 can be configured to monitor the measurement of ion currents by detector 118. If the ion signal measured by detector 118 flickers or suddenly changes (e.g., jumps or drops down) by more than a threshold amount, or if the average detected ion/electron signal has decays below a particular threshold value, controller 108 can determine automatically that cleaning or replacement of GDI source 200 is desirable.

A variety of materials can be used to form the electrodes in ion source 102, including electrodes 210 and 220 in GDI source 200. In certain embodiments, the electrodes of ion source 102 can be made from materials such as copper, aluminum, silver, nickel, gold, and/or stainless steel. In general, materials that are less prone to adsorption of sticky particles are advantageous, as the electrodes formed from such materials typically require less frequent cleaning or replacement.

Figure 2K:
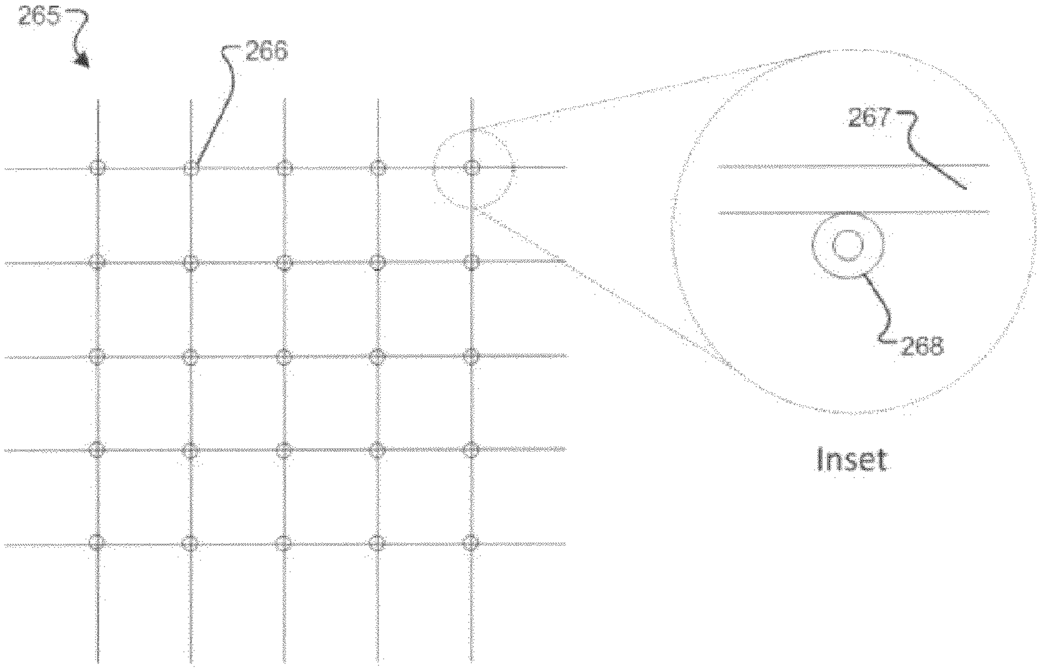
FIG. 2K is a schematic diagram of a capacitive discharge ion source.

The foregoing discussion has focused on the use of GDI source 200 in spectrometer 100. However, the features, design criteria, algorithms, and aspects described above are equally applicable to other types of ion sources that can be used in spectrometer 100, such as capacitive discharge sources and thermionic emitter sources. In particular, capacitive discharge sources are well suited for use at the relatively high gas pressures at which spectrometer 100 operates. As such, the foregoing description applies to such sources as well. For example, FIG. 2K shows an example of a capacitive discharge source 265 that includes an array of ionization sources 266. The inset in FIG. 2K shows a magnified view of a single ionization source 266 with wire 267 and insulator coated wire 268. Plasma discharge occurs from each of sources 266 when a bias potential is applied to wires 267 by voltage source 106. Ions generated by capacitive discharge source 265 enter ion trap 104, where they are trapped and selectively ejected for detection. Additional aspects and features of capacitive discharge sources are disclosed, for example, in U.S. Pat. No. 7,274,015, the entire contents of which are incorporated herein by reference.

Due to the use of compact, closely spaced electrodes, the overall size of ion source 102 can be small. The maximum dimension of ion source 102 refers to the maximum linear distance between any two points on the ion source. In some embodiments, the maximum dimension of ion source 102 is 8.0 cm or less (e.g., 6.0 cm or less, 5.0 cm or less, 4.0 cm or less, 3.0 cm or less, 2.0 cm or less, 1.0 cm or less).

III. Ion Trap

As explained above in Section I, ions generated by ion source 102 are trapped within ion trap 104, where they circulate under the influence of electrical fields created by applying electrical potentials to the electrodes of ion trap 104. The potentials are applied to the electrodes of ion trap 104 by voltage source 106, after receiving control signals from controller 108. To eject the circulating ions from ion trap 104 for detection, controller 108 transmits control signals to voltage source 106 which cause voltage source 106 to modulate the amplitude of a radiofrequency (RF) field within ion trap 104. Modulation of the amplitude of the RF field causes the circulating ions within ion trap 104 to fall out of orbit and exit ion trap 104, entering detector 118 where they are detected.

As explained above in Section I, to ensure that mass spectrometer 100 is both compact and consumes a relatively small amount of electrical power during operation, mass spectrometer 100 uses only a single, small mechanical pump in pressure regulation subsystem 120 to regulate its internal gas pressure. As a result, mass spectrometer 100 operates at internal gas pressures that are higher than internal pressures in conventional mass spectrometers. To ensure that gas particles drawn in to spectrometer 100 are quickly ionized and analyzed, the internal volume of mass spectrometer 100 is considerably smaller than the internal volume of conventional mass spectrometers. By reducing the internal volume of spectrometer 100, pressure regulation subsystem 120 is capable of drawing gas particles quickly into spectrometer 100. Further, by ensuring quick ionization and analysis, a user of spectrometer 100 can rapidly obtain information about a particular substance. A smaller internal volume of spectrometer 100 has the added advantage of a smaller internal surface area that is susceptible to contamination during operation. Conventional mass spectrometers use a variety of different mass analyzers, many of which have large internal volumes that are maintained at low pressure during operation, and/or consume large amounts of power during operation. For example, certain mass spectrometers use linear quadrupole mass filters, which have large internal volumes due to their extension in the axial direction, which enables mass filtering and large charge storage capacities. Some conventional mass spectrometers use magnetic sector mass filters, which are also typically large and may consume large amounts of power to generate mass-filtering magnetic fields. Conventional mass spectrometers can also use hyperbolic ion traps, which can have large internal volumes, and can also be difficult to manufacture.

Figure 3A:
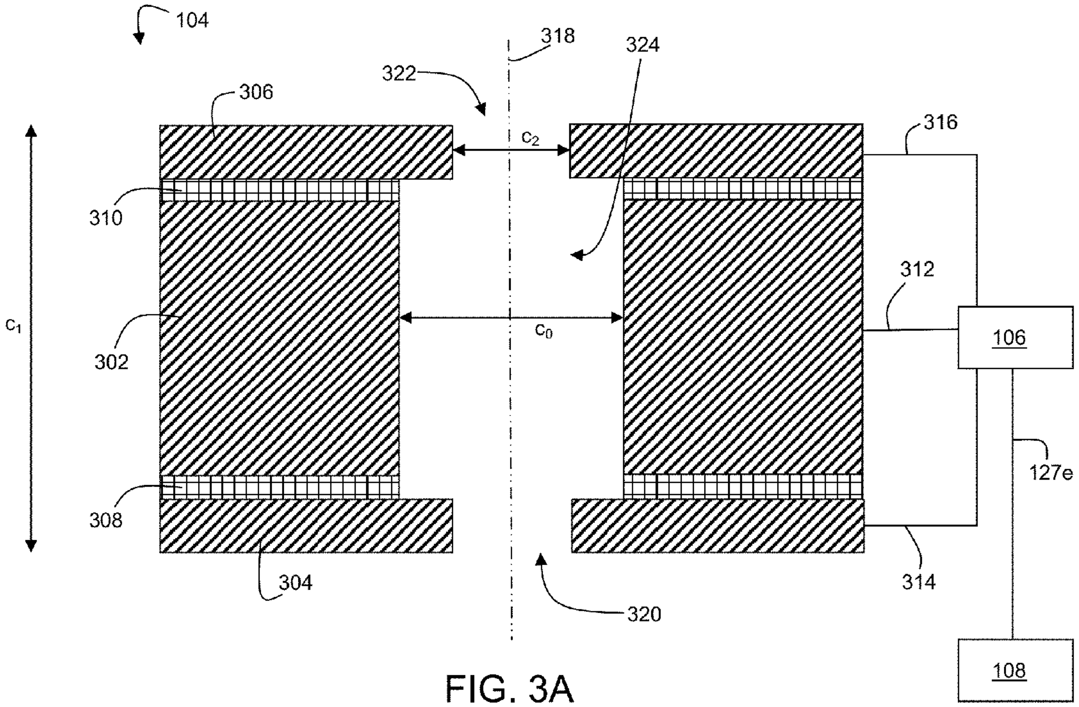
FIG. 3A is a cross-sectional diagram of a embodiment of an ion trap.

In contrast to the foregoing conventional ion trap technologies, the mass spectrometers disclosed herein use compact, cylindrical ion traps for trapping and analyzing ions. FIG. 3A is a cross-sectional diagram of an embodiment of ion trap 104. Ion trap 304 includes a cylindrical central electrode 302, two end cap electrodes 304 and 306, and two insulating spacers 308 and 310. Electrodes 302, 304, and 306 are connected to voltage source 106 via control lines 312, 314, and 316, respectively. Voltage source 106 is connected to controller 108 via control line 127*e*, controller 108 transmits signals to voltage source 106 via control line 127*e*, directing voltage source 106 to apply electrical potentials to the electrodes of ion trap 104.

During operation, ions generated by ion source 102 enter ion trap 104 through aperture 320 in electrode 304. Voltage source 106 applies potentials to electrodes 304 and 306 to create an axial field (e.g., symmetric about axis 318) within ion trap 104. The axial field confines the ions axially between electrodes 304 and 306, ensuring that the ions do not leave ion trap through aperture 320, or through aperture 322 in electrode 306. Voltage source 106 also applies an electrical potential to central electrode 302 to generate a radial confinement field within ion trap 104. The radial field confines the ions radially within the internal aperture of electrode 302.

With both axial and radial fields present within ion trap 104, the ions circulate within the trap. The orbital geometry of each ion is determined by a number of factors, including the geometry of electrodes 302, 304, and 306, the magnitudes and signs of the potentials applied to the electrodes, and the mass-to-charge ratio of the ion. By changing the amplitude of the electrical potential applied to central electrode 302, ions of specific mass-to-charge ratios will fall out of orbit within trap 104 and exit the trap through electrode 306, entering detector 118. Therefore, to selectively analyze ions of different mass-to-charge ratios, voltage source 106 (under the control of controller 108) changes the amplitude of the electrical potential applied to electrode 302 in step-wise fashion. As the amplitude of the applied potential changes, ions of different mass-to-charge ratio are ejected from ion trap 104 and detected by detector 118.

Electrodes 302, 304, and 306 in ion trap 104 are generally formed of a conductive material such as stainless steel, aluminum, or other metals. Spacers 308 and 310 are generally formed of insulating materials such as ceramics, Teflon® (e.g., fluorinated polymer materials), rubber, or a variety of plastic materials.

The central openings in end-cap electrodes 304 and 306, in central electrode 302, and in spacers 308 and 310 can have the same diameter and/or shape, or different diameters and/or shapes. For example, in the embodiment shown in FIG. 3A, the central openings in electrode 302 and spacers 308 and 310 have a circular cross-sectional shape and a diameter $c_0$, and end-cap electrodes 304 and 306 have central openings with a circular cross-sectional shape and a diameter $c_2 < c_0$. As shown in FIG. 3A, the openings in the electrodes and spacers are axially aligned along axis 318 so that when the electrodes and spacers are assembled into a sandwich structure, the openings in the electrodes and spacers form a continuous axial opening that extends through ion trap 104.

In general, the diameter $c_0$ of the central opening in electrode 302 can be selected as desired to achieve a particular target resolving power when selectively ejecting ions from ion trap 104, and also to control the total internal volume of spectrometer 100. In some embodiments, $c_0$ is approximately 0.6 mm or more (e.g., 0.8 mm or more, 1.0 mm or more, 1.2 mm or more, 1.4 mm or more, 1.6 mm or more, 1.8 mm or more). The diameter $c_2$ of the central opening in end-cap electrodes 304 and 306 can also be selected as desired to achieve a particular target resolving power when ejecting ions from ion trap 104, and to ensure adequate confinement of ions that are not being ejected. In certain embodiments, $c_2$ is approximately 0.25 mm or more (e.g., 0.35 mm or more, 0.45 mm or more, 0.55 mm or more, 0.65 mm or more, 0.75 mm or more).

The axial length $c_1$ of the combined openings in electrode 302 and spacers 308 and 310 can also be selected as desired to ensure adequate ion confinement and to achieve a particular target resolving power when ejecting ions from ion trap 104. In some embodiments, $c_1$ is approximately 0.6 mm or more (e.g., 0.8 mm or more, 1.0 mm or more, 1.2 mm or more, 1.4 mm or more, 1.6 mm or more, 1.8 mm or more).

It has been determined experimentally that the resolving power of spectrometer 100 is greater when $c_0$ and $c_1$ are selected such that $c_1/c_0$ is greater than 0.83. Therefore, in certain embodiments, $c_0$ and $c_1$ are selected so that the value of $c_1/c_0$ is 0.8 or more (e.g., 0.9 or more, 1.0 or more, 1.1 or more, 1.2 or more, 1.4 or more, 1.6 or more).

Due to the relatively small size of ion trap 104, the number of ions that can simultaneously be trapped in ion trap 104 is limited by a variety of factors. One such factor is space-charge interactions among the ions. As the density of trapped ions increases, the average spacing between the trapped, circulating ions decreases. As the ions (which all have either positive or negative charges) are forced closer together, the magnitude of repulsive forces between the trapped ions increases.

Figure 3B:
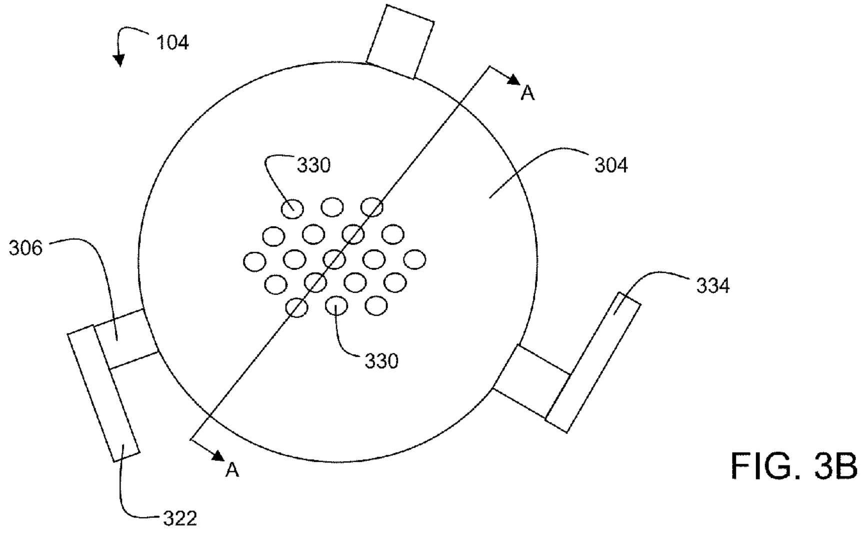
FIG. 3B is a schematic diagram of another embodiment of an ion trap.

To overcome limitations on the number of ions that can simultaneously be trapped in ion trap 104 and increase the capacity of spectrometer 100, in some embodiments spectrometer 100 can include an ion trap with multiple chambers. FIG. 3B shows a schematic diagram of an ion trap 104 with a plurality of ion chambers 330, arranged in a hexagonal array. Each chamber 330 functions in the same manner as ion trap 104 in FIG. 3A, and includes two end cap electrodes and a cylindrical central electrode. End cap electrode 304 is shown in FIG. 3B, along with a portion of end-cap electrode 306. End cap electrode 304 is connected to voltage source 106 through connection point 334, and end cap electrode 306 is connected to voltage source 106 through connection point 332.

Figure 3C:
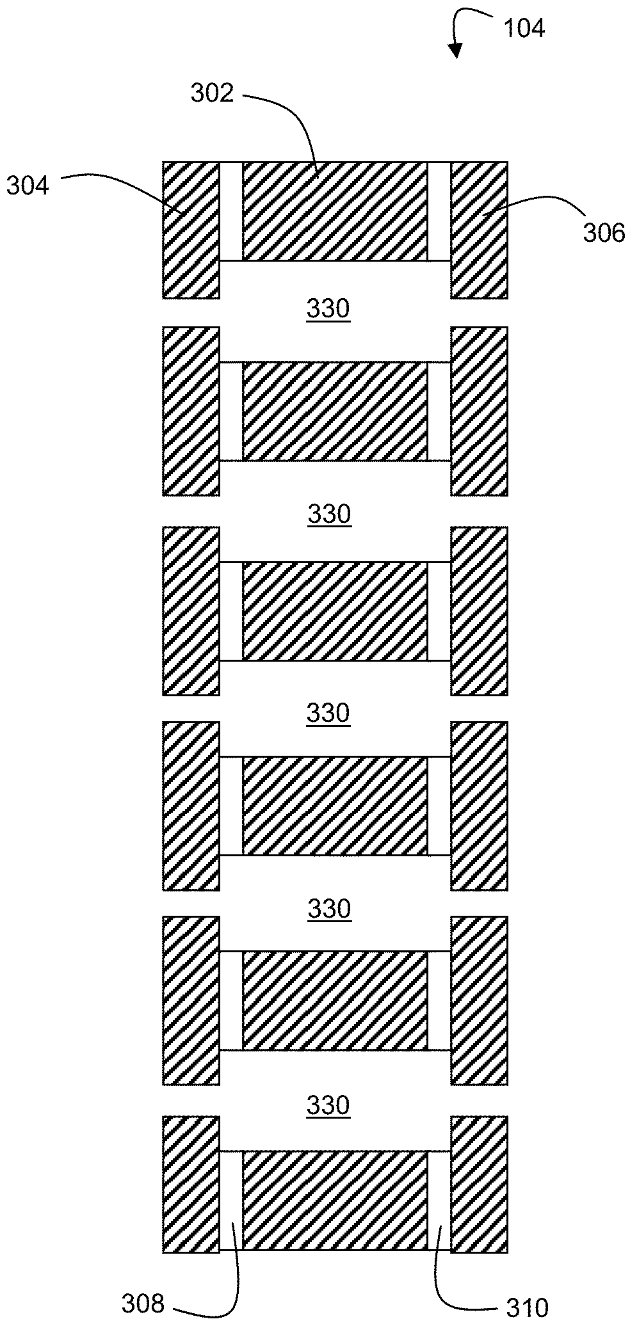
FIG. 3C is a cross-sectional diagram of the ion trap of FIG. 3B.

FIG. 3C is a cross-sectional diagram through section line A-A in FIG. 3B. Each of the five ion chambers 330 that fall along section line A-A are shown. Voltage source 106 is connected via a single connection point (not shown in FIG. 3C) to central electrode 302. As a result, by applying suitable potentials to electrode 302, voltage source 106 (under the control of controller 108) can simultaneously trap ions within each of the chambers 330, and eject ions with selected mass-to-charge ratios from each of the chambers 330.

In some embodiments, the number of ion chambers 330 in ion trap 104 can be matched to the number of apertures formed in end cap electrode 304. As described in Section II, end cap electrode 304 can, in general, include one or more apertures. When end cap electrode 304 includes a plurality of apertures, ion trap 104 can also include a plurality of ion chambers 330, so that each aperture formed in end cap electrode 304 corresponds to a different ion chamber 330. In this manner, ions generated within ion source 102 can be efficiently collected by ion trap 104, and trapped within ion chambers 330. The use of multiple chambers, as described above, reduces space-charge interactions among the trapped ions, increasing the trapping capacity of ion trap 104. In general, the positions and cross-sectional shapes of ion chambers 330 can be the same as the arrangements and shapes of apertures 240 and 294 discussed in Section II.

As an example, referring to FIG. 3B, end cap electrode 304 includes a plurality of apertures arranged in a hexagonal array. Each of the apertures formed in electrode 304 is matched to a corresponding ion chamber 330, and therefore ion chambers 330 are also arranged in a hexagonal array.

In certain embodiments, the number, arrangement, and/or cross-sectional shapes of ion chambers 330 are not matched to the arrangement of apertures in end cap electrode 304. For example, end cap electrode 304 can include only one or a small number of apertures 294, and ion trap 304 can nonetheless include a plurality of ion chambers 330. Because the use of multiple ion chambers 330 increases the trapping capacity of ion trap 104, using multiple ion chambers can provide advantages even if the arrangement of the ion chambers is not matched to the arrangement of apertures in end cap electrode 304.

Additional features of ion trap 104 are disclosed, for example, in U.S. Pat. No. 6,469,298, in U.S. Pat. No. 6,762,406, and in U.S. Pat. No. 6,933,498, the entire contents of each of which are incorporated herein by reference.

IV. Voltage Source

Voltage source 106 provides operating power and electrical potentials to the components of spectrometer 100 based on signals transmitted by controller 108 over control line 127*e*. As discussed above in Section I, important advantages of the mass spectrometers disclosed herein are their compact size and significantly reduced power consumption, relative to conventional mass spectrometers. While spectrometer 100 can generally operate with a variety of voltage sources, to reduce power consumption by spectrometer 100 as much as possible, it is advantageous if voltage source 106 is a high efficiency source.

Figure 4A:
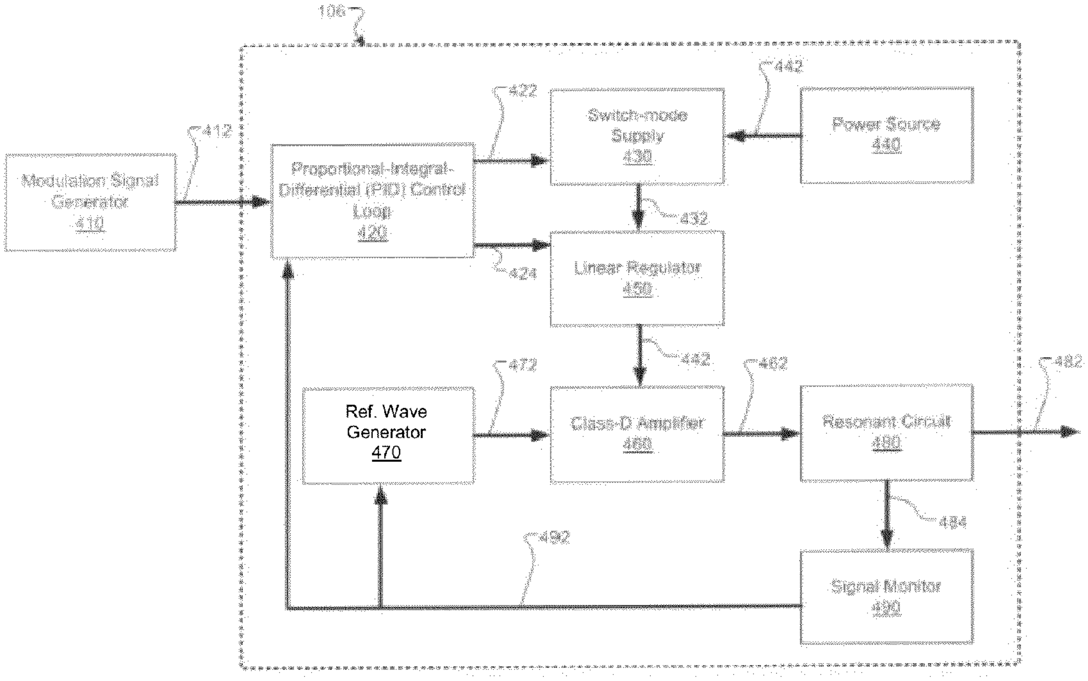
FIG. 4A is a schematic diagram of a voltage source.

However, high efficiency voltage sources that are both small in size, and that generate voltages sufficient to drive the components of spectrometer 100, are not readily obtained commercially. FIG. 4A shows a schematic diagram of an embodiment of a high efficiency voltage source 106 that is configured to provide high voltage RF signal 482 applied to central electrode 302 of ion trap 104. During operation, voltage source 106 can amplify a voltage received from a power source 440, while modifying the waveform of the high voltage RF signal 482 to be suitable for specific mass spectrum measurements.

The design of power supply 106 allows spectrometer 100 to be operated at high power efficiency throughout the various sweeping stages of the high voltage RF signal 482. At each stage, the power efficiency is defined as the ratio of the input electrical power to the output electrical power. In some embodiments, the efficiency of power supply 106 can be 40% or higher (e.g., 50% or higher, 60% or higher, 70% or higher, 80% or higher, 90% or higher) at all stages of the voltage amplification. In contrast, conventional power amplifiers (e.g., emitter followers or class-A amplifiers) typically have a maximum efficiency at the highest amplification level, but significantly reduced efficiencies at lower amplification levels. As such, conventional power amplifiers can be inefficient and unsuitable for applications requiring sweeping voltage amplifications.

In addition to high efficiency operation, voltage source 106 enables relatively low power sources (e.g., batteries) to provide the electrical power and potentials needed to activate the various components of spectrometer 100. As a result, spectrometer 100 has a compact form factor and is considerably lighter than conventional mass spectrometers.

Referring to FIG. 4A, voltage source 106 includes a proportional-integral-differential (PID) control loop 420, a switch-mode supply 430, an optional linear regulator 450, a class-D amplifier 460, and a resonant circuit 480. In some embodiments, various components of voltage source 106 can be integrated into a module, which can be plugged into support base 140. This allows voltage source 106, if defective, to be easily replaced with another module. Alternatively, in certain embodiments, any one or more components of voltage source 106 can be implemented as a separate module, and can be replaceable on its own. In some embodiments, certain or all components can be directly mounted to support base 140. Each of the components shown in FIG. 4A is of relatively low cost and commonly available commercially, allowing voltage source 106 to be manufactured in a cost effective manner.

During operation, PID control loop 420 receives a modulation signal 412 from a modulation signal generator 410, which may or may not be a component of voltage source 106.

Figure 4B:
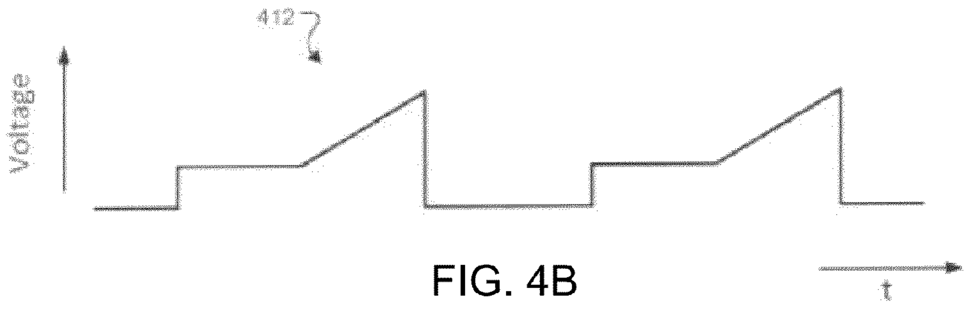
FIG. 4B is a plot showing an unamplified modulation signal for an ion trap.

FIG. 4B shows an example of modulation signal 412, where the variation in amplitude of the signal (i.e., the envelope) is shown as a function of time. The envelope of modulation signal 412 correlates approximately with the envelope of the output high voltage RF signal 482. Based on modulation signal 412, PID control loop 420 sends control signals 422 and 424 to switch-mode supply 430 and linear regulator 450 (if present), respectively.

Figure 4C:
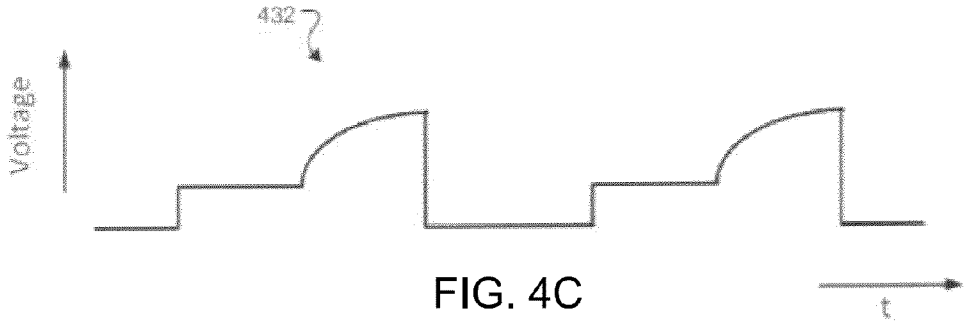
FIG. 4C is a plot showing a modified signal for an ion trap.

Switch-mode supply 430 is configured to receive input power signal 442 from power source 440, which can include a battery (e.g., a Li-ion, Li-Poly, NiCd, or NiMH battery). The voltage supplied by power source 440 is typically between about 0.5 V and about 13V. As an example, the voltage can be about 7.2V. Switch-mode supply 430 amplifies input power signal 442 based on control signal 422, resulting in a modulated voltage signal 432, which is sent to linear regulator 450 (if present). An example of modulated voltage signal 432 is shown in FIG. 4C. Modulated voltage signal 432 typically has an amplitude of between 0 V and about 25 V.

In some embodiments, switch-mode supply 430 includes a switching regulator for efficient power amplification. During operation, input power signal 442 can be less than, equal to, or greater than output voltage signal 432. This feature is particularly advantageous when power source 440 is a battery. Unlike linear power supplies, switch-mode supply 430 (which is a nonlinear amplifier) can dissipate little or no power when switching between various amplification states, leading to high power conversion. In addition, switch-mode supply 430 is typically more compact and lighter conventional linear power supplies due to the smaller internal transformer size and weight.

Linear regulator 450 is optionally included in voltage source 106. If linear regulator 150 is not present in voltage source 106, then modified voltage signal 432 is directly sent from switch-mode supply 430 to class-D amplifier 460. Alternatively, when linear regulator 450 is present in voltage source 106, then linear regulator 150 receives both modulated voltage signal 432 from switch-mode supply 430, and control signal 424 from PID control loop 420.

Linear regulator 450 functions to filter irregularities in modified voltage signal 432. The filtered voltage signal 442 from linear regulator 450 is received by class-D amplifier 442.

Typically, linear regulator 450 includes a low-dropout voltage regulator, where a constant low drop voltage can ensure that the overall efficiency of the voltage source 106 is only slightly lowered due to the presence of linear regulator 450. In certain embodiments, control signal 424 received by the linear regulator 450 is used to modify the envelope of the output voltage signal 442 to be suitable for measuring mass spectra for specific substances.

Reference wave generator 470 is optionally included in voltage source 106. If present, reference wave generator 470 provides a reference wave signal 472 to class-D amplifier 460. In general, reference wave signal 472 has a frequency in the radio frequency range (e.g., from about 0.1 MHz to about 50 MHz). For example, in some embodiments, reference wave signal 472 can have a frequency of 1 MHz or higher (e.g., 2 MHz or higher, 4 MHz or higher, 6 MHz or higher, 8 MHz or higher, 15 MHz or higher, 30 MHz or higher).

Figure 4D:
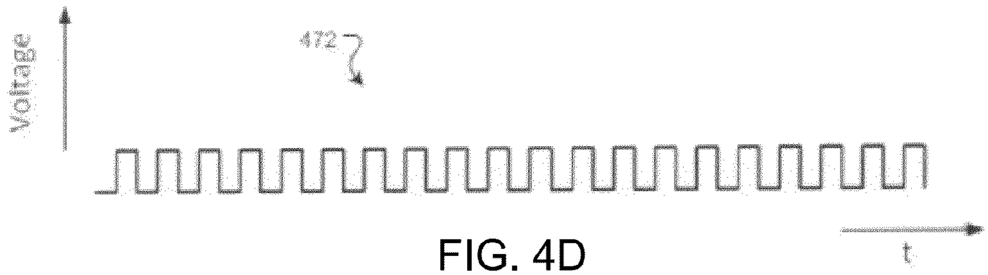
FIG. 4D is a plot showing a reference carrier waveform.

FIG. 4D shows an example of reference wave signal 472. In FIG. 4D, reference wave signal 472 is a square wave. More generally, however, reference wave generator 470 can generate a reference wave signal 472 with a variety of different waveform shapes. In some embodiments, for example, reference wave signal 472 can correspond to any one of a triangular waveform, a sinusoidal waveform, or a nearly-sinusoidal waveform.

Figure 4E:
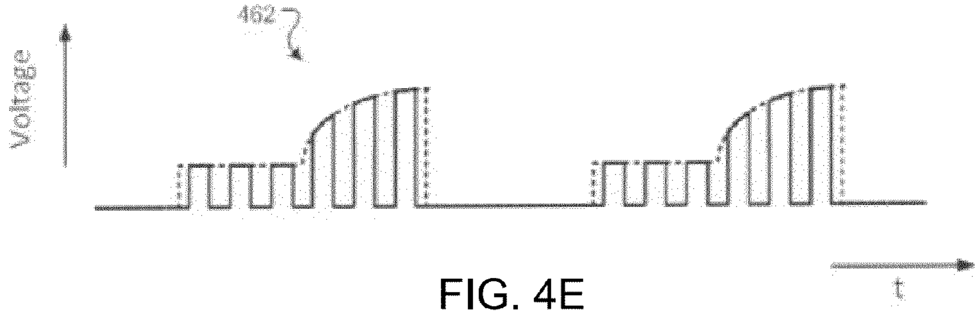
FIG. 4E is a plot showing an amplified modulation signal for an ion trap.

Class-D amplifier 460 receives both reference wave signal 472 (if reference wave generator 470 is present) and filtered voltage signal 442 (or modified voltage signal 432, if linear regulator 450 is not present) and generates a modulated RF signal 462 from these input signals. FIG. 4E shows an example of modulated RF signal 462. In this example, the period of signal 462 is about 10 ms. The amplitude of signal 462 varies between 0 V and about 30 V. The frequency of the carrier wave in RF signal 462 is the same as, or approximately the same as, the frequency of reference wave signal 472. The envelope of RF signal 462 (e.g., denoted by the dashed lines in FIG. 4E) is the same as, or approximately the same as, the envelope of filtered voltage signal 442 (or modified voltage signal 432).

Figure 4F:
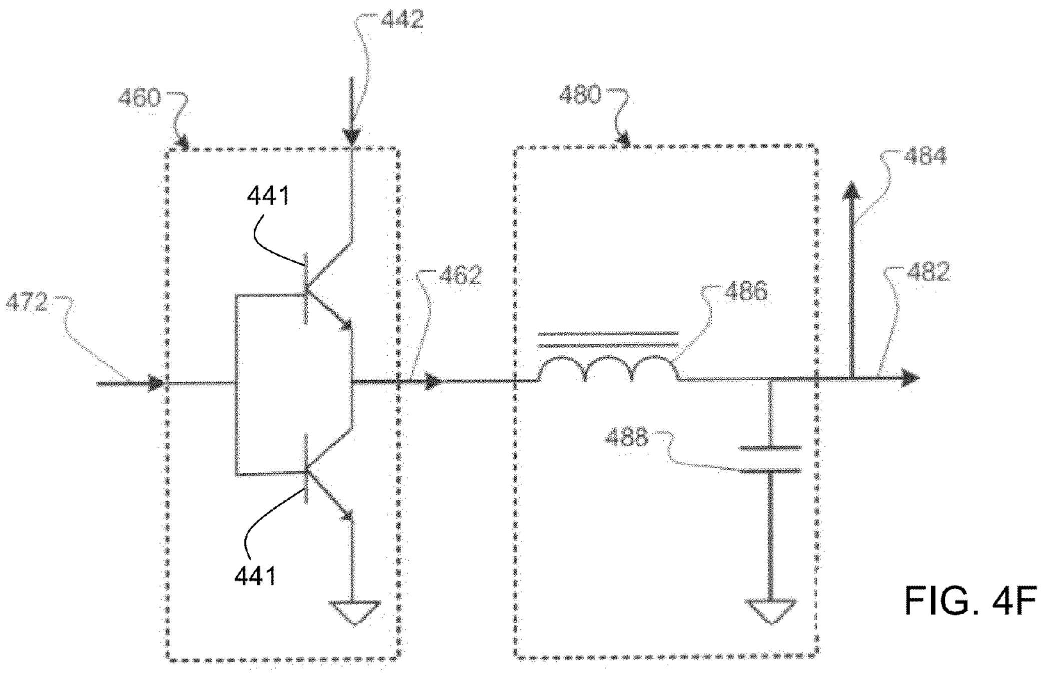
FIG. 4F is a plot showing a resonant circuit for amplifying the signal of FIG. 4E.

FIG. 4F shows a schematic diagram of an embodiment of class-D amplifier 460. Class-D amplifier 460 includes a pair of transistors 441. Within class-D amplifier 460, reference wave signal 472 is modulated by the envelope of filtered voltage signal 442 (or modified voltage signal 432) to generate RF signal 462.

RF signal 462 is received by resonant circuit 480, which is also shown schematically in FIG. 4F. Resonant circuit 480 includes an inductor 486 and a capacitor 488. In some embodiments, the positions of inductor 486 and capacitor 488 may be switched, relative to the positions shown in FIG. 4F. The values of the inductance of inductor 486 and the capacitance of capacitor 488 are generally selected such that the resonant frequency of circuit 480 substantially matches the frequency of reference wave signal 472.

In some embodiments, resonant circuit 480 has a Q-factor of 60 or more (e.g., 80 or more, 100 or more). When RF signal 462 is applied to the resonant circuit 480, a high voltage RF signal 482 is generated on capacitor 488. In general, the waveform of high voltage RF signal 482 is the same as, or approximately the same as, the waveform of RF signal 462, except that the amplitude of high voltage RF signal 482 is significantly larger than the amplitude of RF signal 462. For example, in some embodiments, the maximum amplitude of high voltage RF signal 482 is 100V or higher (e.g., 500V or higher, 1000V or higher, 1500V or higher, 2000V or higher). In general, the high Q-factor of resonant circuit 480 allows for the generation of large amplitude voltages in RF signal 482.

The combination of class-D amplifier 462 and resonant circuit 480 is advantageous for a number of reasons, including low power consumption and frequency adjustment. A further important advantages arises from the fact that a pure sinusoidal reference wave signal 472 is not required for operation. Instead, the combination of class-D amplifier 462 and resonant circuit 480 can use reference wave signals with a variety of waveform shapes. Certain waveform shapes, such as square waves, can often be generated with higher fidelity than pure sinusoidal waveforms. As a result, the combination of class-D amplifier 462 and resonant circuit 480 permits operation with reference wave signals of high stability.

Returning to FIG. 4A, high voltage RF signal 482 can be monitored by optional signal monitor 490, which may or may not be present in voltage source 106. Signal monitor 490 receives a feedback signal 484 from resonant circuit 480, which is generally a lower amplitude replica of the high voltage RF signal 482. Although feedback signal 484 is typically has a much smaller amplitude than high voltage RF signal 482, the amplitude of feedback signal 484 is generally proportional at all points to the amplitude of high voltage RF signal 482.

The feedback signal received from resonant circuit by signal monitor 490 can be transmitted to PID control loop 420 and/or reference wave generator 470 as control signal 492. Based on control signal 492, PID control loop 420 can send modified control signals 422 and 424 to switch-mode supply 430 and linear regulator 450, respectively, to optimize the waveform and amplitude of high voltage RF signal 482. For example, PID control loop 420 can modify the envelope of modified voltage signal 432 based on control signal 492, thereby maximizing the amplitude of high voltage RF signal 482.

In some embodiments, the resonant frequency of resonant circuit 480 may not exactly match the frequency of reference wave signal 472. For example, this may occur due to inaccurate values of the inductance of inductor 486 and/or the capacitance of capacitor 488. Further, the inductance of inductor 486 and/or the capacitance of capacitor 488 can change over time. This can also occur, for example, if class-D amplifier 460 distorts the output frequency of RF signal 462, so that the frequency of RF signal 462 no longer matches the frequency of reference signal wave 472. This mismatch may potentially reduce the efficiency of voltage source 106 because resonant circuit 480 ceases to be an effective resonator for RF signal 462.

Several techniques can be implemented to compensate for this mismatch. In some embodiments, the frequency of reference wave signal 472 can be scanned by reference wave generator 470 while monitoring the control signal 492. Reference wave generator 470 can select the optimum frequency for reference wave signal 472 as the frequency that maximizes the amplitude of control signal 492.

In certain embodiments, the capacitance of capacitor 488 can be varied in resonant circuit 480, to determine which capacitance value maximizes the amplitude of control signal 492. For this purpose, capacitor 488 can be a variable capacitor.

The foregoing techniques for compensating for frequency mismatch can be implemented directly in hardware, in software, or both. For example, controller 108 can be configured to perform one or more of these methods to compensate for frequency mismatch. Controller 108 can be configured to perform these methods automatically and/or on an ongoing basis to continually optimize frequency matching. Alternatively, controller 108 can be configured to only perform these methods upon receiving an instruction from a user, e.g., when a user activates a control on user interface 112. When executed by controller 108, the techniques for compensating for frequency mismatch disclosed herein typically are complete within 5 minutes or less (e.g., 3 minutes or less, 2 minutes or less, 1 minute or less).

High voltage RF signal 482 is applied to ion trap 104 (e.g., to central electrode 302 of ion trap 104) to selectively eject trapped ions for detection by detector 118. The range of mass-to-charge ratios that can be analyzed using ion trap 104 depends upon, among other factors, the profile of RF signal 482 (e.g., the envelope and maximum amplitude). By varying these features of RF signal 482, voltage source 106 (under the control of controller 108) can select the range of mass-to-charge ratios that are analyzed.

In some embodiments, voltage source 106 can include multiple reference wave generators 470 and/or multiple resonant circuits 480. During operation, a combination of a particular reference wave generator 470 and a particular resonant circuit 480 can be selected by controller 108 to generate a suitable high voltage RF signal 482 for analyzing a particular range of mass-to-charge ratios using ion trap 104. To change the range of mass-to-charge ratios that are analyzed, controller 108 selects a different reference wave generator 470 and/or resonant circuit 480.

V. Detector

Detector 118 is configured to detect charged particles leaving ion trap 104. The charged particles can be positive ions, negative ions, electrons, or a combination of these.

Figure 5A:
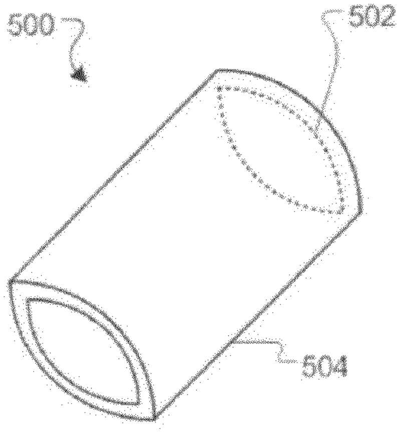
FIG. 5A is a perspective view of an embodiment of a Faraday cup charged particle detector.

A wide variety of different detectors can be used in spectrometer 100. FIG. 5A shows an embodiment of detector 118 that includes a Faraday cup 500. Faraday cup 500 has circular base 502 and a cylindrical sidewall 504. In general, the shape and geometry of Faraday cup 500 can be varied to optimize the sensitivity and resolution of spectrometer 100.

For example, base 502 can have a variety of cross-sectional shapes, including square, rectangular, elliptical, circular, or any other regular or irregular shape. Base 502 can be flat or curved, for example.

Figure 5B:
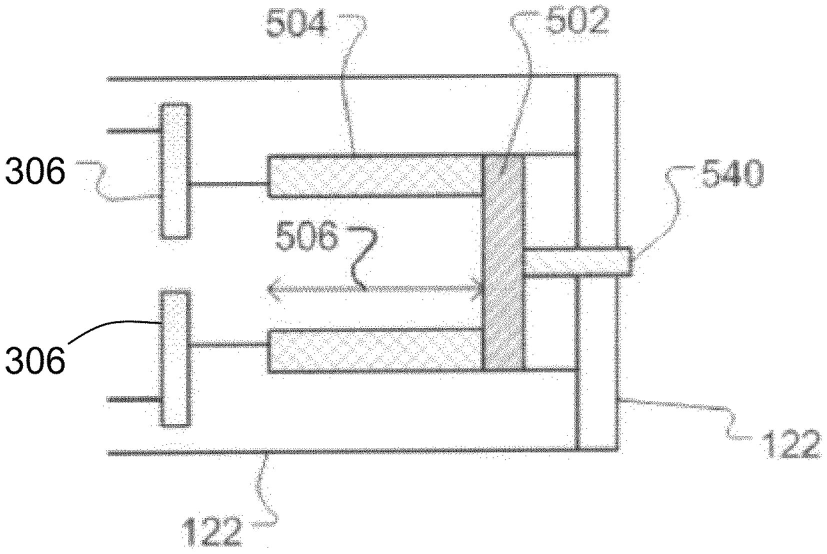
FIG. 5B is a schematic diagram of the Faraday cup detector of FIG. 5A.

FIG. 5B shows a side view of Faraday cup 500. In some embodiments, the length 506 of sidewall 504 can be 20 mm or less (e.g., 10 mm or less, 5 mm or less, 2 mm or less, 1 mm or less, or even 0 mm). In general, length 506 can be selected according to various criteria, including maintaining the compactness of spectrometer 100, providing the required selectivity during detection of charged particles, and resolution. In some embodiments, sidewall 504 conforms to the cross-sectional shape of base 502. More generally, however, sidewall 504 is not required to conform to the shape of base 502, and can have a variety of cross-sectional shapes that are different from the shape of base 502. Moreover, sidewall 504 does not have to be cylindrical in shape. In some embodiments, for example, sidewall 504 can be curved along the axial direction of Faraday cup 500.

In general, Faraday cup 500 can relatively small. The maximum dimension of Faraday cup 500 corresponds to the largest linear distance between any two points on the cup. In some embodiments, for example, the maximum dimension of Faraday cup 500 is 30 mm or less (e.g., 20 mm or less, 10 mm or less, 5 mm or less, 3 mm or less).

Typically, the thickness of base 502 and/or the thickness of sidewall 504 are chosen to ensure efficient detection of charged particles. In some embodiments, for example, the thickness of base 502 and/or of sidewall 504 are 5 mm or less (e.g., 3 mm or less, 2 mm or less, 1 mm or less).

The sidewall 504 and base 502 of Faraday cup 500 are generally formed from one or more metals. Metals that can be used to fabricate Faraday cup 500 include, for example, copper, aluminum, and silver. In some embodiments, Faraday cup 500 can include one or more coating layers on the surfaces of base 502 and/or sidewall 504. The coating layer(s) can be formed from materials such as copper, aluminum, silver, and gold.

During operation of spectrometer 100, as charged particles are ejected from ion trap 104, the charged particles can drift or be accelerated into Faraday cup 500. Once inside Faraday cup 500, the charged particles are captured at the surface of Faraday cup 500 (e.g., the surface of base 502 and/or sidewall 504). Charged particles that are captured either by base 502 or sidewall 504 generate an electrical current, which is measured (e.g., by an electrical circuit within detector 118) and reported to controller 108. If the charged particles are ions, the measured current is an ion current, and its amplitude is proportional to the abundance of the measured ions.

To obtain a mass spectrum of an analyte, the amplitude of the electrical potential applied to central electrode 302 of ion trap 104 is varied (e.g., a variable amplitude signal, high voltage RF signal 482, is applied) to selectively eject ions of particular mass-to-charge ratios from ion trap 104. For each change in amplitude corresponding to a different mass-to-charge ratio, an ion current corresponding to ejected ions of the selected mass-to-charge ratio is measured using Faraday cup 500. The measured ion current as a function of the potential applied to electrode 302—which corresponds to the mass spectrum—is reported to controller 108, In some embodiments, controller 108 converts applied voltages to specific mass-to-charge ratios based on algorithms and/or calibration information for ion trap 104.

Following ejection from ion trap 104 through end cap electrode 306, charged particles can be accelerated to impact detector 118 by forming an electric field between the detector 118 and end cap electrode 306. In certain embodiments, where detector 118 includes Faraday cup 500 for example, the conducting surface of the Faraday cup 500 is maintained at the ground potential established by voltage source 106, and a positive potential is applied to end cap electrode 306. With these applied potentials, positive ions are repelled from end cap electrode 306 toward the grounded conducting surface of Faraday cup 500. Further, electrons passing through end cap electrode 306 are attracted toward end cap electrode 306, and thus do not impact Faraday cup 500. This configuration therefore leads to improved signal-to-noise ratio. More generally, in this configuration, Faraday cup 500 can be at a potential other than ground, as long as it is at a lower potential than end cap electrode 306.

In some embodiments, it is desirable to detect negatively charged particles (e.g., negative ions and/or electrons). To detect such particles, Faraday cup 500 is biased to a higher voltage than end cap electrode 306 to attract negatively charged particles to the Faraday cup 500.

Figure 5C:
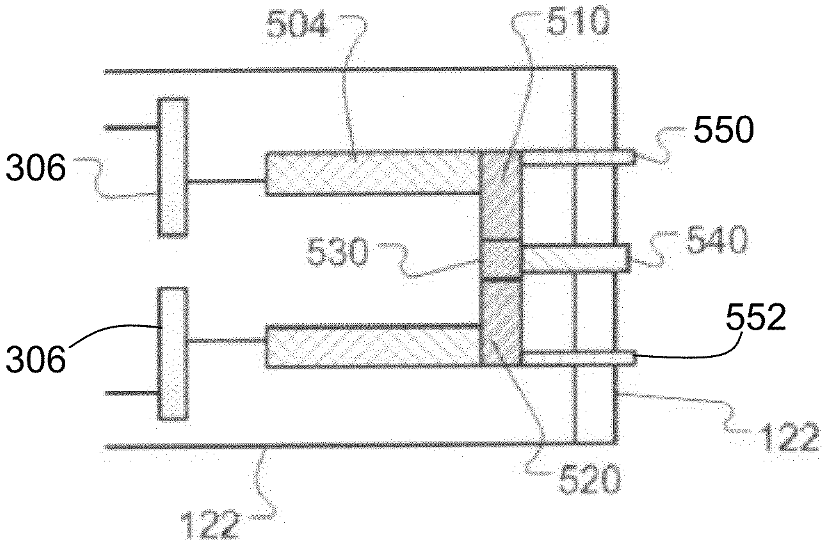
FIG. 5C is a schematic diagram of another embodiment of a Faraday cup detector.

In some embodiments, detector 118 can include a Faraday cup 500 with two regions separated by an insulating region. Different bias potentials can be applied to each region. For example, FIG. 5C shows a Faraday cup 500 including two conducting regions 510 and 520, which are separated by an insulating region 530. By grounding end cap electrode 306 and applying positive and negative bias voltages to regions 510 and 520, respectively, region 510 can detect negatively charged particle and region 520 can detect positively charged particles. This configuration can provide additional information during measurement of a mass spectrum, since both positively and negatively charged ions can be simultaneously detected. Alternatively, measurements of positively and negatively charged ions can be made sequentially, by first activating one of regions 510 and 520 by applying a bias potential, and then activating the other region. As an alternative, in some embodiments, detector 118 can include two Faraday cups 500, where different bias voltages are applied to each Faraday cup 500 for detection of positively and negatively charged ions.

In some embodiments, detector 118 can be directly secured to housing 122. For example. FIG. 5C shows housing 122 including one or more electrodes 550 and 552 that contact Faraday cup 500. Alternatively, in some embodiments, one or more electrodes 550 and 552 can be directly attached to Faraday cup 500. In certain embodiments, one electrode can be used to bias Faraday cup 500, while another electrode can be used to measure current generated by the Faraday cup 500. Alternatively, in certain embodiments, the bias voltage can be applied and current measured using the same electrode.

In certain embodiments, housing 122 can be configured such that detector 118 can be easily mounted or removed. For example, as shown in FIG. 5C, housing 122 includes an opening where Faraday cup 500 can be securely fitted and held by holding elements 540 (e.g., screws or other fasteners). This is particularly advantageous when the Faraday cup 500 becomes damaged or contaminated, which may be determined by detecting phantom peaks during mass spectrum measurements as described above. A contaminated Faraday cup 500 can be replaced by removing cup 500 from the opening in housing 122, and installing a replacement. The contaminated Faraday cup can be repaired or cleaned on the spot. For example, Faraday cup 500 can be baked in a transportable oven such that sticky particles on the surface of Faraday cup 500 are vaporized. The cleaned Faraday cup can be inserted back into housing 122. This replaceablity allows for a minimum downtime of spectrometer 100, even if certain components of the spectrometer become contaminated. In some embodiments, a contaminated Faraday cup 500 can be cleaned by heating (e.g., by applying a high current through base 502 and sidewall 504), while the Faraday cup remains installed in the housing 122. Contaminant particles liberated from the surfaces of base 502 and/or sidewall 504 can be removed from spectrometer by pressure regulation subsystem 120.

In some embodiments, Faraday cup 500 can implemented as a component of pluggable, replaceable module 148, as described in Section I. In a modular configuration, Faraday cup 500 can be formed, for example, as a recess in a plate of conducting material. The plate can be directly attached to another component of module 148, such as ion trap 104, so that the aperture in end cap electrode 306 is aligned with the recess, and ions ejected from ion trap 104 enter the Faraday cup directly. Modules with different Faraday cup dimensions can be used to provide selective detection of different types of analytes.

Figure 5D:
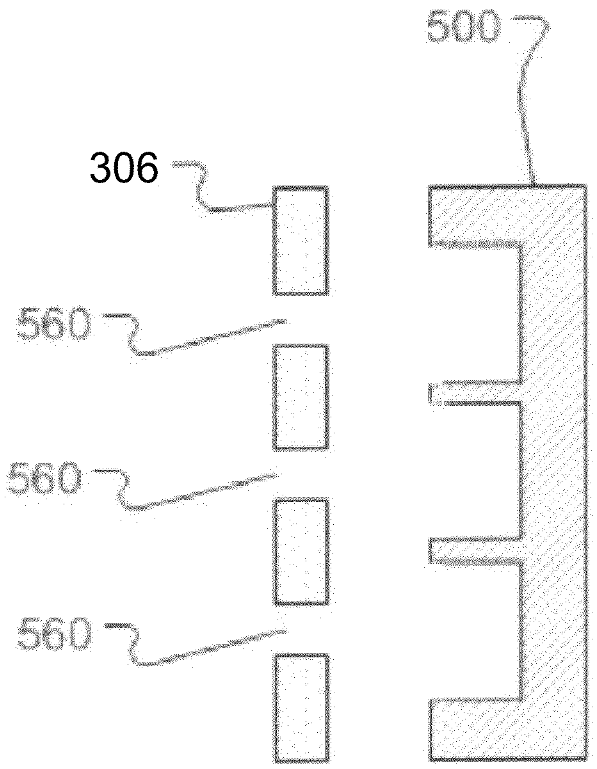
FIG. 5D is a schematic diagram of an array of Faraday cup detectors.

FIG. 5D shows detector 118 including an array of Faraday cup detectors 500, which may or may not be monolithically formed. Arrays of detectors can be advantageous, for example, when ion trap 104 includes an array of ion chambers 330. End cap electrode 306 can include a plurality of apertures 560 aligned with each of the ion chambers, so that ions ejected from each chamber pass through substantially only one of the apertures 560. After passing through one of the apertures 560, the ions are incident on one of the Faraday cup detectors 500 in the array. This array-based approach to ejection and detection of ions can significantly increase the efficiency with which ejected ions are detected. In the array geometry shown in FIG. 5D, the size of each Faraday cup 500 can conform to the size of each aperture 560 formed in end cap electrode 306.

In some embodiments, a biased repelling grid or magnetic field can be placed in front of a Faraday cup 500 to prevent secondary charged particle emission, which may distort the measurement of ejected ions from ion trap 104. Alternatively, in certain embodiments, the secondary emission from Faraday cup 500 can be used for detection of the ejected ions.

While the preceding discussion has focused on Faraday cup detectors due to their low power operation and compact size, more generally a variety of other detectors can be used in spectrometer 100. For example, other suitable detectors include electron multipliers, photomultipliers, scintillation detectors, image current detectors, Daly detectors, phosphor-based detectors, and other detectors in which incident charged particles generate photons which are then detected (i.e., detectors that employ a charge-to-photon transduction mechanism).

VI. Pressure Regulation Subsystem

Pressure regulation subsystem 120 is generally configured to regulate the gas pressure in gas path 128, which includes the interior volumes of ion source 102, ion trap 104, and detector 118. As discussed above in Section 1, during operation of spectrometer 100, pressure regulation subsystem 120 maintains a gas pressure within spectrometer 100 that is 100 mTorr or more (e.g., 200 mTorr or more, 500 mTorr or more, 700 mTorr or more, 1 Torr or more, 2 Torr or more, 5 Torr or more, 10 Torr or more), and/or 100 Torr or less (e.g., 80 Torr or less, 60 Torr or less, 50 Torr or less, 40 Torr or less, 30 Torr or less, 20 Torr or more).

In some embodiments, pressure regulation subsystem 120 maintains gas pressures within the above ranges in certain components of spectrometer 100. For example, pressure regulation subsystem 120 can maintain gas pressures of between 100 mTorr and 100 Torr (e.g., between 100 mTorr and 10 Torr, between 200 mTorr and 10 Torr, between 500 mTorr and 10 Torr, between 500 mTorr and 50 Torr, between 500 mTorr and 100 Torr) in ion source 102 and/or ion trap 104 and/or detector 118. In certain embodiments, the gas pressures in at least two of ion source 102, ion trap 104, and detector 118 are the same. In some embodiments, the gas pressure in all three components is the same.

In certain embodiments, gas pressures in at least two of ion source 102, ion trap 104, and detector 118 differ by relatively small amounts. For example, pressure regulation subsystem 120 can maintain gas pressures in at least two of ion source 102, ion trap 104, and detector 118 that differ by 100 mTorr or less (e.g., 50 mTorr or less, 40 mTorr or less, 30 mTorr or less, 20 mTorr or less, 10 mTorr or less, 5 mTorr or less, 1 mTorr or less). In some embodiments, the gas pressures in all three of ion source 102, ion trap 104, and detector 118 differ by 100 mTorr or less (e.g., 50 mTorr or less, 40 mTorr or less, 30 mTorr or less, 20 mTorr or less, 10 mTorr or less, 5 mTorr or less, 1 mTorr or less).

Figure 6B:
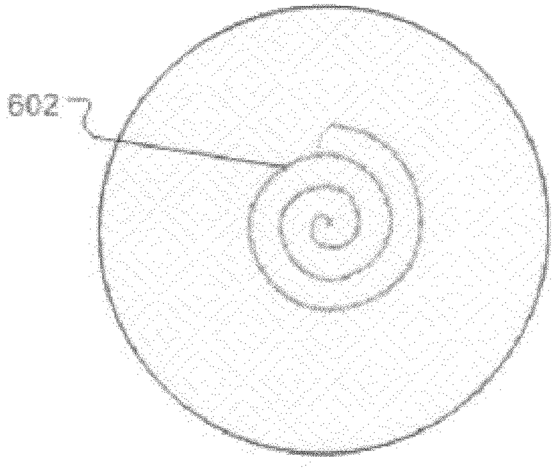
FIG. 6B is a schematic diagram of a scroll pump flange.
Figure 6A:
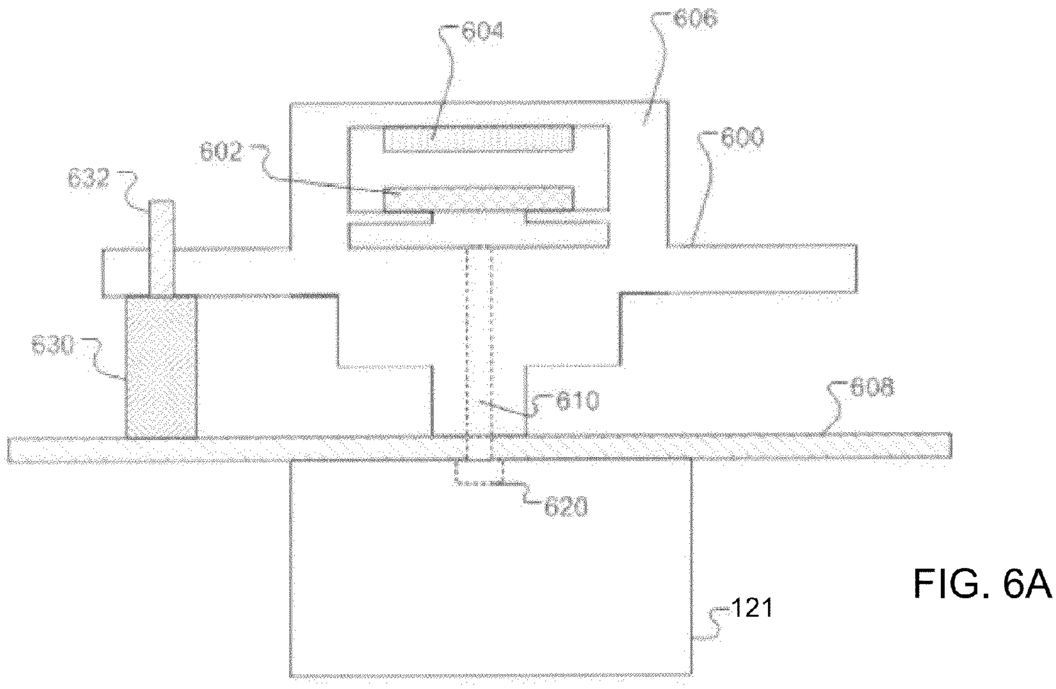
FIG. 6A is a schematic diagram of a pressure regulation subsystem featuring a scroll pump.

As shown in FIG. 6A, pressure regulation subsystem 120 can include a scroll pump 600 which has a pump container 606 with one or more interleaving scroll flanges 602 and 604. Relative orbital motion between scroll flanges 602 and 604 traps gases and liquids, leading to pumping activity. In certain embodiments, scroll flange 604 can be fixed while scroll flange 602 orbits eccentrically with or without rotation. In some embodiments, both scroll flanges 602 and 604 move with offset centers of rotation. FIG. 6B shows a schematic diagram of scroll flange 602. Examples of scroll flange geometries include (but are not limited to) involute, Archimedean spiral, and hybrid curves.

The orbital motion of scroll flanges 602 and 604 allows scroll pump 600 to generate only very small amplitude vibrations and low noise during operation. As such, scroll pump 600 can be directly coupled to ion trap 104 without introducing substantial detrimental effects during mass spectrum measurements. To further reduce vibrational coupling, orbiting scroll flange 602 can be counterbalanced with simple masses. Because scroll pumps have few moving parts and generate only very small amplitude vibrations, the reliability of such pumps is generally very high.

Scroll pump 600 is typically compact in size, and has a small mass. In some embodiments, for example, the maximum dimension of scroll pump 600 (e.g., the largest linear distance between any two points on scroll pump 600) is less than 10 cm (e.g., less than 8 cm, less than 6 cm, less than 5 cm, less than 4 cm, less than 3 cm, les than 2 cm). In certain embodiments, the weight of scroll pump 600 is less than 1.0 kg (e.g., less than 0.8 kg, less than 0.7 kg, less than 0.6 kg, less than 0.5 kg, less than 0.4 kg, less than 0.3 kg, less than 0.2 kg).

The small size and weight of scroll pump 600 allows it to be incorporated into spectrometer 100 in a variety of configurations. In some embodiments, for example, as shown in FIGS. 1D and 1E, scroll pump 600 (as part of pressure regulation subsystem 120) can be mounted directly to support base 140 (e.g., a printed circuit board). In certain embodiments, scroll pump 600 (as part of pressure regulation subsystem 120) can be implemented as a component of pluggable, replaceable module 148, and can be attached directly to one or more of the other components of module 148, such as ion source 102, ion trap 104, and/or detector 118.

FIG. 6A shows scroll pump 600 directly mounted to printed circuit board 608. Pump inlet 610 is directly connected to pump inlet 620 of manifold 121. Scroll pump 600 can be fixed to board 608 by securing element 630 and fixing element 632, which may be positioned 1 cm or more (e.g., 2 cm or more, 3 cm or more, 4 cm or more) from the location of the pump inlets 610 and 620, thereby reducing vibrational coupling between pump 600 and board 608. Alternatively, instead of a direct connection between pump 600 and manifold 121, in some embodiments a tube (e.g., a flexible or rigid tube) can connect pump inlet 610 to pump inlet 620.

Scroll pumps suitable for use in pressure regulation subsystem 120 are available, for example, from Agilent Technologies Inc. (Santa Clara, Calif.). In addition to scroll pumps, other pumps can also be used in pressure regulation subsystem 120. Examples of suitable pumps include diaphragm pumps, diaphragm pumps, and roots blower pumps.

Using a small, single mechanical pump provides a number of advantages relative to the pumping schemes used in conventional mass spectrometers. In particular, conventional mass spectrometers typically use multiple pumps, at least one of which operates at high rotational frequency. Large mechanical pumps operating at high rotational frequencies generate mechanical vibrations that can couple into the other components of the spectrometer, generating undesirable noise in measured information. In addition, even if measures are taken to isolate the components from such vibrations, the isolation mechanisms typically increase the size of the spectrometers, sometimes considerably. Furthermore, large pumps operating at high frequencies consume large amounts of electrical power. Accordingly, conventional mass spectrometers include large power supplies for meeting these requirements, further enlarging the size of such instruments.

In contrast, a single mechanical pump such as a scroll pump can be used in the spectrometers disclosed herein to control gas pressures in each of the components of the system. By operating the mechanical pump at a relatively low rotational frequency, the mechanical coupling of vibrations into other components of the spectrometer can be substantially reduced or eliminated. Further, by operating at low rotational frequencies, the amount of power consumed by the pump is small enough that its modest requirements can be met by voltage source 106.

It has been determined experimentally that in some embodiments, by operating the single mechanical pump at a frequency of less than 6000 cycles per minute (e.g., less than 5000 cycles per minute, less than 4000 cycles per minute, less than 3000 cycles per minute, less than 2000 cycles per minute), the pump is capable of maintaining desired gas pressures within spectrometer 100, and at the same time, its power consumption requirements can be met by voltage source 106.

VII. Housing

Figure 7A:
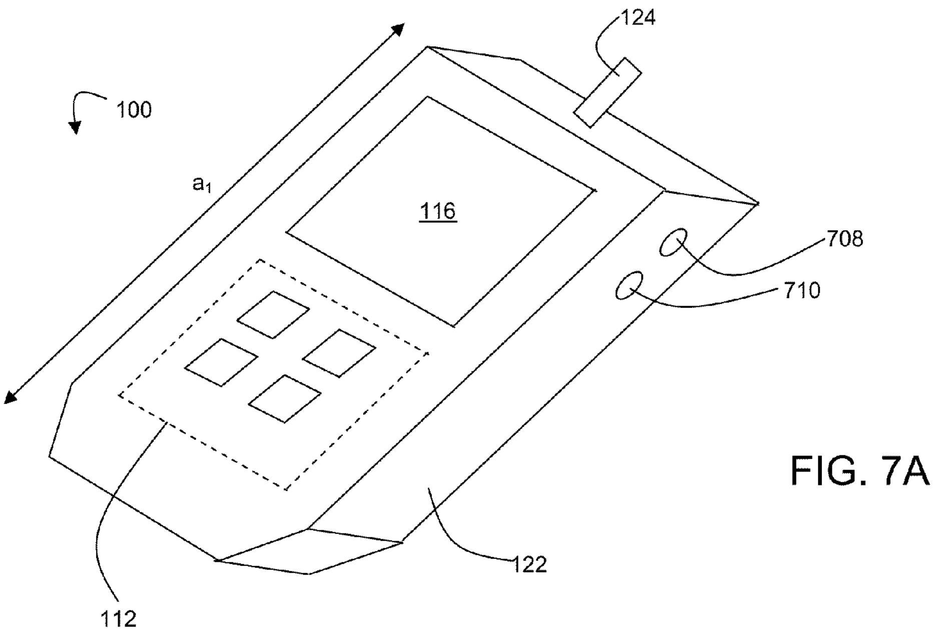
FIG. 7A is a perspective view of a compact mass spectrometer.

As described above in Section I, mass spectrometer 100 includes a housing 122 that encloses the components of the spectrometer. FIG. 7A shows a schematic diagram of an embodiment of housing 122. Sample inlet 124 is integrated within housing 122 and configured to introduce gas particles into gas path 128. Also integrated into housing 122 are display 116 and user interface 112.

In some embodiments, display 116 is a passive or active liquid crystal or light emitting diode (LED) display. In certain embodiments, display 116 is a touchscreen display. Controller 108 is connected to display 116, and can display a variety of information to a user of mass spectrometer 100 using display 116. The information that is displayed can include, for example, information about an identity of one or more substances that are scanned by spectrometer 100. The information can also include a mass spectrum (e.g., measurements of abundances of ions detected by detector 118 as a function of mass-to-charge ratio). In addition, information that is displayed can include operating parameters and information for mass spectrometer 100 (e.g., measured ion currents, voltages applied to various components of mass spectrometer 100, names and/or identifiers associated with the current module 148 installed in spectrometer 100, warnings associated with substances that are identified by spectrometer 100, and defined user preferences for operation of spectrometer 100). Information such as defined user preferences and operating settings can be stored in storage unit 114 and retrieved by controller 108 for display In some embodiments, as shown in FIG. 7A, user interface 112 includes a series of controls integrated into housing 122. The controls, which can be activated by a user of spectrometer 100, can include buttons, sliders, rockers, switches, and other similar controls. By activating the controls of user interface 112, a user of spectrometer 100 can initiate a variety of functions. For example, in some embodiments, activation of one of the controls initiates a scan by spectrometer 100, during which spectrometer draws in a sample (e.g., gas particles) through sample inlet 124, generates ions from the gas particles, and then traps and analyzes the ions using ion trap 104 and detector 118. In certain embodiments, activation of one of the controls resets spectrometer 100 prior to performing a new scan. In some embodiments, spectrometer 100 includes a control that, when activated by a user, re-starts spectrometer 100 (e.g., after changing one of the components of spectrometer 100 such as module 148 and/or a filter connected to sample inlet 124).

When display 116 is a touchscreen display, a portion, or even all, of user interface 112 can be implemented as a series of touchscreen controls on display 116. That is, some or all of the controls of user interface 112 can be represented as touch-sensitive areas of display 116 that a user can activate by contacting display 116 with a finger.

Figure 7B:
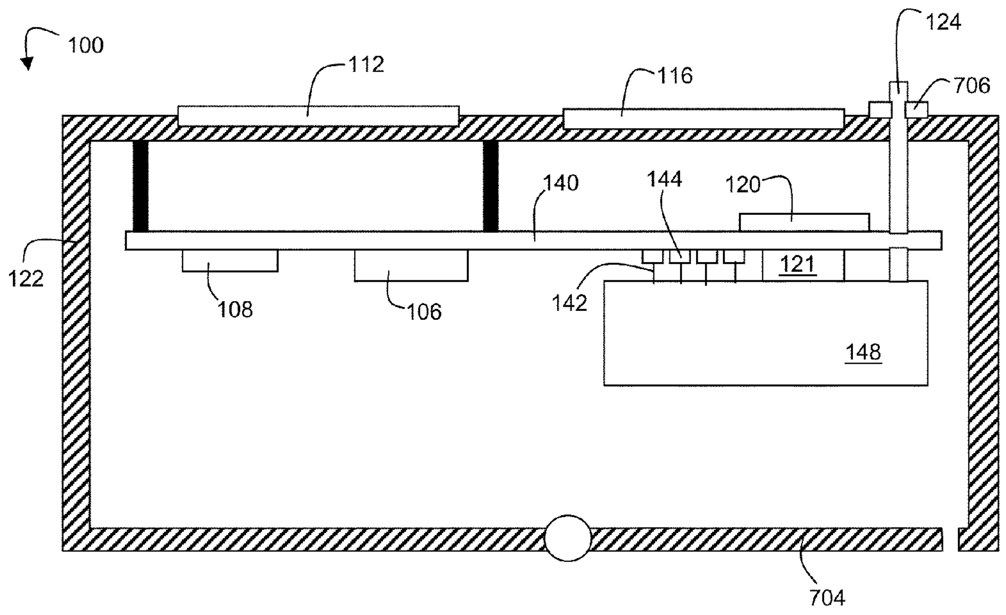
FIGS. 7B and 7C are cross-sectional diagrams of embodiments of a compact mass spectrometer.

As described in Section I, in some embodiments, mass spectrometer 100 includes a replaceable, pluggable module 148 that includes ion source 102, ion trap 104, and (optionally) detector 118. When mass spectrometer 100 includes a pluggable module 148, housing 122 can include an opening to allow a user to access the interior of housing 122 to replace module 148, without disassembling housing 122. FIG. 7B is a cross-sectional view of a mass spectrometer 100 that includes a pluggable module 148. In FIG. 7B, housing 122 includes an opening 702 and a closure 704 that seals opening 702. When module 148 is to be replaced, a user of spectrometer 100 can open closure 704 to expose the interior of spectrometer 100. Closure 704 is positioned so that it provides direct access to pluggable module 148, allowing the user to unplug module 148 from support base 140, and to install another module in its place, without disassembling housing 122. The user can then re-seal opening 702 by fastening closure 704.

In FIG. 7B, closure 704 is implemented in the form of a retractable door. More generally, however, a wide variety of closures can be used to seal the opening in housing 122. For example, in some embodiments, closure 704 can be implemented as a lid that is fully detachable from housing 122.

In general, mass spectrometer 100 can include a variety of different sample inlets 124. For example, in some embodiments, sample inlet 124 includes an aperture configured to draw gas particles directly from the environment surrounding spectrometer 100 into gas path 128. Sample inlet 124 can include one or more filters 706. For example, in some embodiments, filter 706 is a HEPA filter, and prevents dust and other solid particles from entering spectrometer 100. In certain embodiments, filter 706 includes a molecular sieve material that traps water molecules.

As discussed previously, conventional mass spectrometers operate at low internal gas pressures. To maintain low gas pressures, conventional mass spectrometers include one or more filters attached to sample inlets. These filters are selective, and filter out particles of certain types of substances, such as atmospheric gas particles (e.g., nitrogen and/or oxygen molecules) from entering the mass spectrometer. The filters can also be specifically tailor for certain classes of analytes such as biological molecules, and can filter out other types of molecules. As a result, the filters that are used in conventional mass spectrometers—which can include pinch valves, and membrane filters formed from materials such as polydimethylsiloxane which permit selective transport of substances—filter the incoming stream of gas particles to remove certain types of particles from the stream. Without such filters, conventional mass spectrometers could not function, as the low internal gas pressure could not be maintained, and some of the particles admitted into the mass spectrometers would prevent operation of certain components. As an example, thermionic ion sources that are used in conventional mass spectrometers do not operate in the presence of even moderate concentrations of atmospheric oxygen.

The use of substance-specific filters in conventional mass spectrometers has a number of disadvantages. For example, because the filters are selective, fewer analytes can be analyzed without changing filters and/or operating conditions, which can be cumbersome. In particular, for an untrained user of a mass spectrometer, re-configuring the spectrometer for specific analytes by choosing an appropriate selective filter may be difficult. Further, the filters used in conventional mass spectrometers introduce a time delay, because analyte particles do not diffuse instantly through the filters. Depending upon the selectivity of the filters and the concentration of the analyte, a considerable delay can be introduced between the time the analyte is first encountered, and the time when sufficient quantities of analyte ions are detected to generate mass spectral information.

However, because the mass spectrometers disclosed herein operate at higher pressures, there is no need to include a filter such as a membrane filter to maintain low gas pressures within the spectrometer. By operating without the types of filters that are used in conventional mass spectrometers, the spectrometers disclosed herein can analyze a greater number of different types of samples without significant re-configuration, and can perform analyses faster. Moreover, because the components of the spectrometers disclosed herein are generally not sensitive to atmospheric gases such as nitrogen and oxygen, these gases can be admitted to the spectrometers along with particles of the analyte of interest, which significantly increases the speed of analysis and decreases the operating requirements (e.g., the pumping load on pressure regulation subsystem 120) of the other components of the spectrometers.

Accordingly, in general, the filters used in the spectrometers disclosed herein (e.g, filter 706) do not filter atmospheric gas particles (e.g., nitrogen molecules and oxygen molecules) from the stream of gas particles entering sample inlet 124. In particular, filter 706 allows at least 95% or more of the atmospheric gas particles that encounter the filter to pass through.

Different types of filters 706 can be replaceable, and can be changed by a user of spectrometer 100 if they become dirty or ineffective. In some embodiments, mass spectrometer 100 can include multiple filters 706, and a user can selectively install any one or more of the filters depending upon the nature of the sample that is being analyzed.

In certain embodiments, sample inlet 124 can be configured to receive a substance to be analyzed by direct injection. For example, filter 706 can be replaced by a sample injection port attached to sample inlet 124. During use of spectrometer 100, a substance injected into sample inlet 124 through the sample injection port is introduced into gas path 128, ionized by ion source 102, and analyzed by ion trap 104 and detector 118.

Figure 7C:
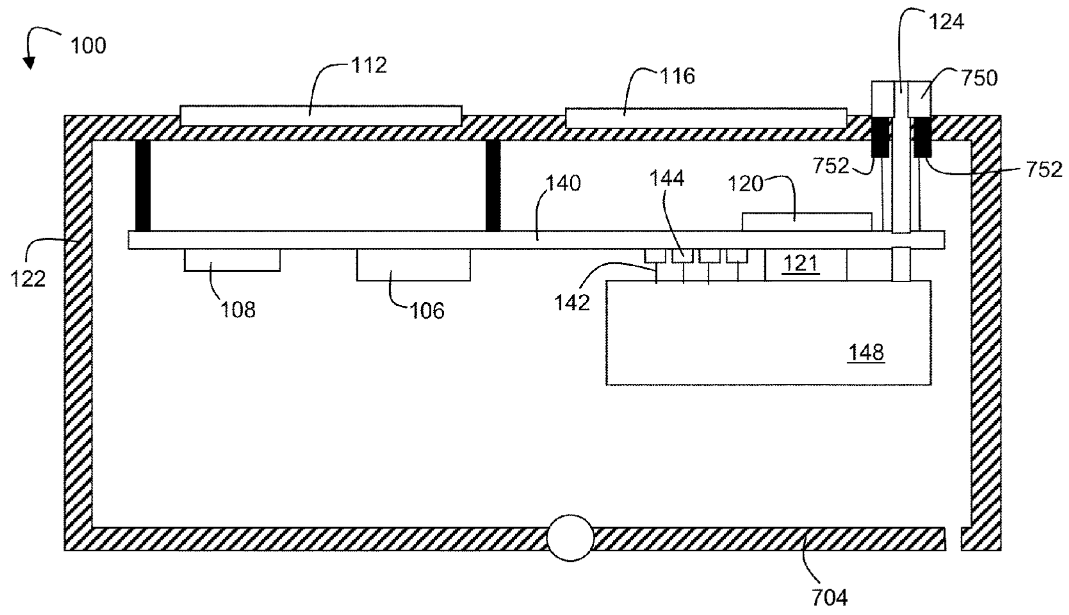

In some embodiments, spectrometer 100 can include a variety of sample introduction modules that can be attached to housing 122 to introduce different types of analytes into spectrometer 100. A sample introduction module 750 is shown schematically in FIG. 7C. Module 750 attaches to housing 122 so that electrodes 752 in housing 122 establish an electrical connection to corresponding electrodes in module 750. Electrodes 752 are connected to controller 108 and to voltage source 106 on support base 140. Voltage source 106 can supply electrical power to module 750 through electrodes 752, and controller 108 and transmit and receive signals to/from module 750. When module 750 is connected to housing 122 (e.g., using a threaded or keyed connection, or a magnetic attachment mechanism, or any of a variety of other attachment mechanisms), voltage source 106 supplies electrical power automatically to activate module 750. Once activated, module 750 reports its identity to controller 108, which can display information about the active module on display 116. Controller 108 can retrieve configuration settings and other operating parameters from storage unit 114, so that spectrometer 100 is configured automatically for analysis of samples introduced through module 750.

In general, various sample introduction modules can be used with spectrometer 100. For example, in some embodiments, module 750 is a vapor thermal desorption module. In certain embodiments, module 750 is a low temperature plasma module. In some embodiments, module 750 is an electrospray ionization module. Each of these modules can be used interchangeably with spectrometer 100 to analyze a wide variety of different samples.

In addition to replaceable modules 750, spectrometer 100 can also include a variety of sensors. For example, in some embodiments, mass spectrometer 100 can include a limit sensor 708 coupled to controller 108. Limit sensor 708 detects gas particles in the environment surrounding mass spectrometer, and reports gas concentrations to controller 108. During operation of mass spectrometer 100 by a user, controller 108 monitors the length of time and concentration of gases measured by limit sensor 708, and displays a warning to the user (e.g., via display 116) if the exposure of the user to gas particles exceeds a threshold concentration or threshold time limit. Information about threshold exposure concentrations and time limits can be stored in storage unit 114, for example, and retrieved by controller 108. Example limit sensors that can be used in mass spectrometer 100 include combustible/LEL gas sensors, photoionization sensors, electrochemical sensors, and temperature and humidity sensors.

In certain embodiments, mass spectrometer 100 can include an explosion hazard sensor 710. Explosion hazard sensor 710, which is connected to controller 108, detects the presence of explosive substances in the vicinity of spectrometer 100. Threshold concentrations for a variety of explosive substances can be stored in storage unit 114, and retrieved by controller 108. During operation of spectrometer 100, when concentrations of one or more explosive substances measured by sensor 710 exceed threshold values, controller 108 can display a warning message to the user of spectrometer 100 via display 116. In some embodiments, the warning message can advise the user to either stop using spectrometer 100, or to use it inside an auxiliary shield (e.g., a cage) to prevent ignition of the one or more explosive substances. Explosion hazard sensors that can be used with mass spectrometer 100 include, for example, combustible sensors, available from MSA (Cranberry Township, Pa.), and RAE Systems (San Jose, Calif.).

Housing 122 is generally shaped so that it can be comfortably operated by a user using either one hand or two hands. In general, housing 122 can have a wide variety of different shapes. However, due to the selection and integration of components of spectrometer 100 disclosed herein, housing 122 is generally compact. As shown in FIGS. 7A and 7B, regardless of overall shape, housing 122 has a maximum dimension $a_1$ that corresponds to a longest straight-line distance between any two points on the exterior surface of the housing. In some embodiments, $a_1$ is 35 cm or less (e.g., 30 cm or less, 25 cm or less, 20 cm or less, 15 cm or less, 10 cm or less, 8 cm or less, 6 cm or less, 4 cm or less).

Further, due to the selection of components within spectrometer 100, the overall weight of spectrometer 100 is significantly reduced relative to conventional mass spectrometers. In certain embodiments, for example, the total weight of spectrometer 100 is 4.5 kg or less (e.g., 4.0 kg or less, 3.0 kg or less, 2.0 kg or less, 1.5 kg or less, 1.0 kg or less, 0.5 kg or less).

VIII. Operating Modes

Figure 8A:
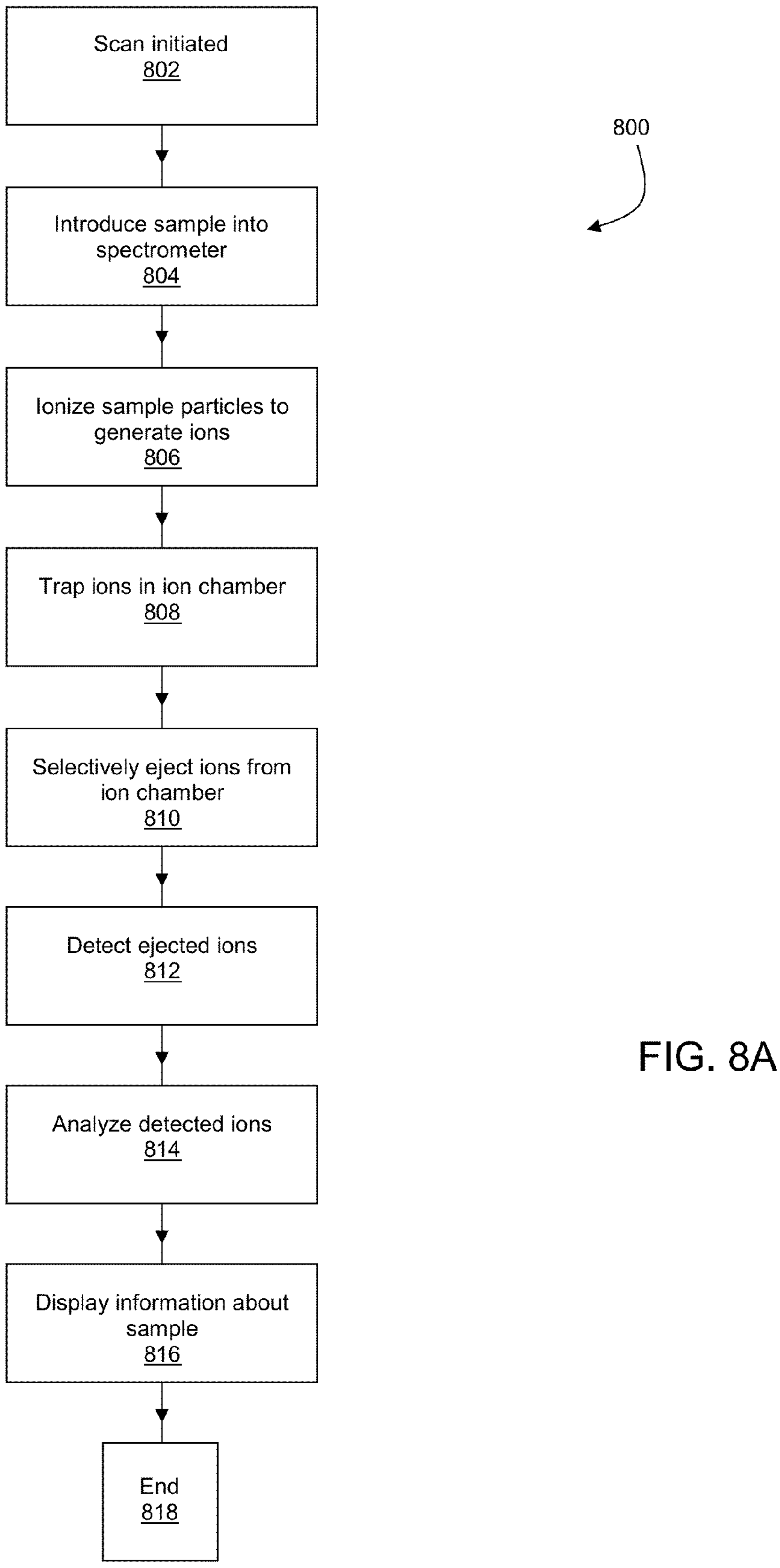
FIG. 8A is a flow chart showing a series of steps for measuring mass spectral information and displaying information about a sample.
Figure 8B:
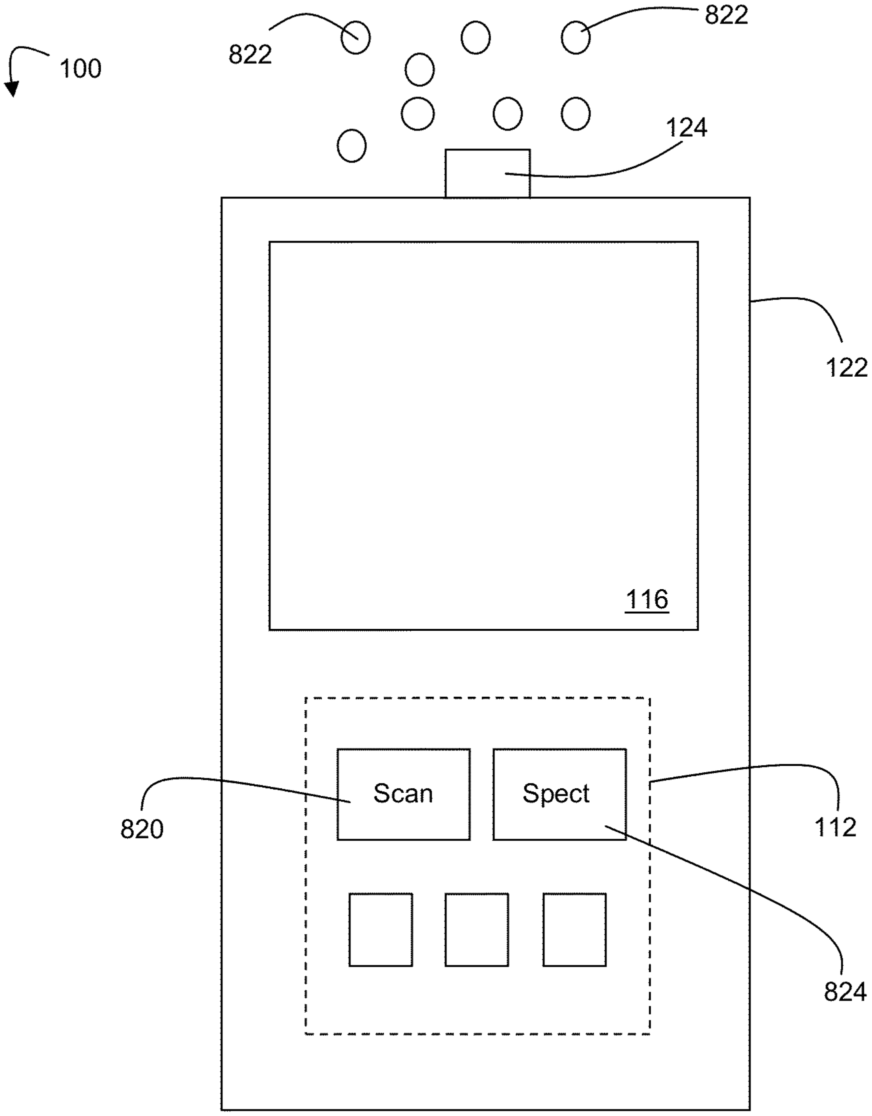
FIG. 8B is a schematic diagram of an embodiment of a compact mass spectrometer.

In general, mass spectrometer 100 operates according to a variety of different operating modes. FIG. 8A is a flow chart 800 that shows a general sequence of steps that are performed in the different operating modes to scan and analyze a sample. In the first step 802, a scan of the sample is initiated. In some embodiments, the scan is initiated by a user of spectrometer 100. For example, spectrometer 100 can be configured to operate in a "one touch" mode where the user can initiate a scan of a sample simply by activating a control in user interface 112. FIG. 8B shows an embodiment of spectrometer 100 in which user interface 112 includes a control 820 for initiating a scan. When control 820 is activated by the user, a scan of the sample (depicted in FIG. 8B as gas particles 822) is initiated.

In some embodiments, controller 108 can initiate a scan automatically based on one or more sensor readings. For example, when spectrometer 100 includes limit sensors such as photoionization detectors and/or LEL sensors, controller 108 can monitor signals from these sensors. If the sensors indicate that a substance of potential interest has been detected, for example, controller 108 can initiate a scan. In general, a wide variety of different sensor-based events or conditions can be used by controller 108 to initiate a scan automatically.

In certain embodiments, spectrometer 100 can be configured to run in "continuous scan" mode. After spectrometer 100 has been placed in continuous scan mode, a scan is repeatedly initiated after expiration of a fixed time interval. The time interval is configurable by the user, and the value of the time interval can be stored in storage unit 114 and retrieved by controller 108. Thus, in step 802 of FIG. 8A, the scan is initiated by spectrometer 100 when the spectrometer is in continuous scan mode.

After the scan has been initiated, the sample is introduced into spectrometer 100 in step 804. A variety of different methods can be used to introduce the sample into the spectrometer. In some embodiments, where the sample consists of gas particles (e.g., gas particles 822 in FIG. 8B), controller 108 activates valve 129, opening the value to admit the gas particles into spectrometer 100 (e.g., into gas path 128). If sample inlet 124 includes a filter 706, the gas particles pass through the filter, which removes dust and other solid materials from the stream of gas particles. As disclosed above, the pressure regulation subsystem maintains a gas pressure that is less than atmospheric pressure in gas path 128. As a result, when valve 129 opens, gas particles 822 are drawn in to sample inlet 124 by the pressure differential between gas path 128 and the environment surrounding spectrometer 100. Alternatively, or in addition, pressure regulation subsystem 120 can cause the gas particles to flow into spectrometer 100.

In certain embodiments, the sample can be introduced into spectrometer 100 via direct injection. As disclosed above in Section VII, spectrometer 100 can include a sample injection port connected to sample inlet 124. The sample injection port allows the user of spectrometer 100 to inject the sample directly into sample inlet 124 for analysis. Once injected, the sample enters gas path 128.

In certain embodiments, a sample in a partially ionized state can be drawn into spectrometer 100 by electrostatic or electrodynamic forces. For example, by applying suitable electrical potentials to electrodes in spectrometer 100, charged particles can be accelerated into spectrometer 100 (e.g., through sample inlet 124).

Next, in step 806, the sample is ionized in ion source 102. As disclosed above, a sample inlet 124 can be positioned in different locations along gas path 128, relative to the other components of spectrometer 100. For example, in some embodiments, sample inlet 124 is positioned so that gas particles introduced into spectrometer 100 enter ion trap 104 first from sample inlet 124. In certain embodiments, sample inlet 124 is positioned so that gas particles introduced into spectrometer 100 enter ion source 102 first from sample inlet 124. In some embodiments, sample inlet 124 is positioned so that gas particles enter detector 118 first from sample inlet 124. Still further, sample inlet 124 can be positioned so that gas particles that enter spectrometer 100 enter gas path 128 at a point between ion source 102 and/or ion trap 104 and/or detector 118.

After the sample (e.g., as gas particles 822) has been introduced into spectrometer 100 at a point along gas path 128, some of the gas particles enter ion source 102. If sample inlet 124 is not positioned so that gas particles 822 enter ion source 102 directly, then movement of gas particles 822 into ion source 102 occurs by diffusion. Once inside ion source 102, controller 108 activates ion source 102 to ionize the gas particles, as disclosed in Section II.

Next, the ions generated in step 806 are trapped in ion trap 104 in step 808. As disclosed in Section II above, movement of the ions from ion source 102 to ion trap 104 generally occurs under the influence of electric fields generated between ion source 102 and ion trap 104. Once inside ion trap 104, the ions are trapped by electric fields internal to the trap, and circulate within the opening in central electrode 302, and between end cap electrodes 304 and 306. The electric fields within ion trap 104 are generated by voltage source 106 under the control of controller 108, which applies suitable electrical potentials to electrodes 302, 304, and 306 to generate the trapping fields.

In step 810, the trapped, circulating ions in ion trap 104 are selectively ejected from the trap. As disclosed above in Section III, selective ejection of ions from trap 104 occurs under the control of controller 108, which transmits signals to voltage source 106 to vary the amplitude of the applied RF voltage to the central electrode 302. As the amplitude of the potential is varied, the amplitude of the electric field in the internal opening of central electrode 302 also varies. Further, as the amplitude of the field within central electrode 302 varies, circulating ions with specific mass-to-charge ratios fall out of circulating orbit within central electrode 302, and are ejected from ion trap 104 through one or more apertures in end cap electrode 306. Controller 108 is configured to direct voltage source 106 to sweep the amplitude of the applied potential according to a defined function (e.g., a linear amplitude sweep) to selectively eject ions of specific mass-to-charge ratios from ion trap 104 into detector 118. The rate at which the applied potential is swept can be determined automatically by controller 108 (e.g., to achieve a target resolving power of spectrometer 100), and/or can be set by a user of spectrometer 100.

After the ions have been selectively ejected from ion trap 104, they are detected by detector 118 in step 812. As disclosed in Section V, a variety of different detectors can be used to detect the ions. For example, in some embodiments, detector 118 includes a Faraday cup that is used to detect the ejected ions.

For each mass-to-charge ratio selected by the amplitude of the electrical potential applied to central electrode 302 in ion trap 104, detector 118 measures a current related to the abundance of ions detected with the selected mass-to-charge ratio. The measured currents are transmitted to controller 108. As a result, the information that controller 108 receives from detector 118 corresponds to detected abundances of ions as a function of mass-to-charge ratio for the ions. This information corresponds to a mass spectrum of the sample.

More generally, controller 108 is configured to detect ions according to a mass-to-charge ratio for the ions, which means that controller 108 detects or receives signals that correlate with the detection of ions and are related to the mass-to-charge ratio for the ions. In some embodiments, controller 108 detects ions or receives information about ions directly as a function of mass-to-charge ratio. In certain embodiments, controller 108 detects ions or receives information about ions as a function of another quantity, such as an electrical potential applied to ion trap 104, that is related to the mass-to-charge ratio for the ions. In all such embodiments, controller 108 detects ions according to a mass-to-charge ratio.

In step 814, the information received from detector 118 is analyzed by controller 108. In general, to analyze the information, controller 108 (e.g., electronic processor 110 in controller 108) compares the mass spectrum of the sample to reference information to determine whether the mass spectrum of the sample is indicative of any of the known substances. The reference information can be stored, for example, in storage unit 114, and retrieved by controller 108 to perform the analysis. In some embodiments, controller 108 can also retrieve reference information from databases that are stored at remote locations. For example, controller 108 can communicate with such databases using communication interface 117 to obtain mass spectra of known substances, for use in analyzing the information measured by detector 118.

The information measured by detector 118 is analyzed by controller 108 to determine information about an identity of the sample. If the sample includes multiple compounds, controller 108—by comparing the measured information from detector 118 to reference information—can determine information about the identities of some or all of the multiple compounds.

Controller 108 is configured to determine a variety of information about the identity of a sample. For example, in some embodiments, the information includes one or more of the sample's common name, IUPAC name, CAS number, UN number, and/or its chemical formula. In certain embodiments, the information about the identity of the sample includes information about whether the sample belongs to a certain class of substances (e.g., explosives, high energy materials, fuels, oxidizers, strong acids or bases, toxic agents). In some embodiments, the information can include information about hazards associated with the sample, handling instructions, safety warnings, and reporting instructions. In certain embodiments, the information can include information about a concentration or level of the sample measured by the spectrometer.

In certain embodiments, the information can include an indication as to whether or not the sample corresponds to a target substance. For example, when a scan is initiated in step 802, a user of spectrometer 100 can place the spectrometer in targeting mode, in which spectrometer 100 scans samples to specifically determine whether a sample corresponds to any of a series of identified target substances. Controller 108 can use a variety of data analysis techniques such as digital filtering and expert systems to search for particular spectral features in the measured mass spectral information. For a particular target substance, controller 108 can search for particular mass spectral features that are characteristic for the target substance, such as peaks at particular mass-to-charge ratios. If certain spectral features are missing from the measured mass spectral information, or if the measured information includes spectral features where none should appear, the information about the identity of the sample determined by controller 108 can include an indication that the sample does not correspond to the target substance. Controller 108 can be configured to determine such information for multiple target compounds.

After the sample analysis is complete, controller 108 displays information about the sample to the user in step 816, using display 116. The information that is displayed depends upon the operating mode of spectrometer 100 and the actions of the user. As disclosed in Section I, spectrometer 100 is configured so that it can be used by persons who do not have special training in the interpretation of mass spectra. For persons without such training, complete mass spectra (e.g., ion abundances as a function of mass-to-charge ratio) often carry little meaning. As a result, spectrometer 100 is configured so that in step 816, it does not display the measured mass spectrum of the sample to the user. Instead, spectrometer 100 displays only some (or all) of the information about the identity of the sample, as determined in step 814, to the user. For users without special training, information about the identity of the sample is of primary significance.

In addition to the information about the identity of the sample, controller 108 can also display other information. For example, in some embodiments, spectrometer 100 can access a database (e.g., stored in storage unit 114, or accessible via communication interface 117) of known hazardous materials. If the information about the identity of the sample is present in the database of hazardous materials, controller 108 can display alerting messages and/or additional information to the user. The alerting messages can include, for example, information about the relative hazardousness of the sample. The additional information can include, for example, actions that the user should consider taking, including actions to limit exposure of the user or others to the substance, and other security-related actions.

In some embodiments, spectrometer 100 is configured to display the mass spectrum of the sample to the user when a control is activated. Referring to FIG. 8B, user interface 112 includes a control 824 that, when activated by the user, displays the mass spectrum of the sample on display 116. Control 824 permits users trained in the interpretation of mass spectra to view the information directly measured by detector 118. This information can be useful, for example, when a conclusive match between the measured mass spectral information and reference information is not obtained. Further, when spectrometer 100 is used for analyses in laboratories, for example, users can activate control 824 in an effort to infer more detailed chemical information, such as the fragmentation mechanism for particular ions. In certain embodiments, spectrometer 100 is configured to display the mass spectrum of the sample only when control 824 is activated by a user, and/or only after information about the identity of the sample has been displayed. That is, spectrometer 100 can be configured so that under normal operation, the detailed mass spectral information is not shown to the user; it is only by activating control 824 that the user sees this detailed information.

In some embodiments, control 824 can be configured to allow two different modes of operation. For example, when control 824 is activated to a first state by a user of spectrometer 100, information about the identity of the sample is displayed to the user on display 116 when the analysis is completed. When control 824 is activated to a second state, the mass spectral information (e.g., ion abundances as a function of mass-to-charge ratio) is displayed. Thus, control 824 can have the form of a two-way switch that permits the user to select a desired information display mode during operation of the spectrometer. In certain embodiments, when control 824 is activated to the second state, spectrometer 100 can also be configured to display information about the identity of the sample, in addition to the mass spectral information.

In step 818, the process shown in flow chart 800 terminates. If the scan was initiated in step 802 by the user activating control 820, then spectrometer 100 waits for control 820 to be activated again before initiating another scan. Alternatively, if spectrometer 100 is in continuous scan mode, then spectrometer 100 waits for a defined time interval, and then initiates another scan automatically after the interval has elapsed, or waits for another external trigger such as a sensor signal.

As discussed previously, in general, spectrometer 100 does not use a filter that filters atmospheric gas particles. As a result, when particles of an analyte are introduced into the spectrometer, atmospheric gas particles are also introduced, forming a mixture of gas particles in spectrometer 100. Because spectrometer 100 operates at pressures that are substantially higher than the internal pressures in conventional mass spectrometers, and because the components of spectrometer 100 are generally relatively insensitive to atmospheric gas particles, the spectrometers disclosed herein can be used to introduce analytes in ways that are not possible with conventional mass spectrometers. In particular, particles of an analyte can be introduced by continuously drawing in a mixture of particles of the analyte and atmospheric gas particles, without filtering any of the particles. In some embodiments, spectrometer 100 can be configured to continuously introduce a mixture of gas particles into gas path 128 through sample inlet 124 for a period of at least 10 s (e.g., at least 15 s, at least 20 s, at least 30 s, at least 45 s, at least 1 minute, at least 1.5 minutes, at least 2 minutes, at least 3 minutes, at least 4 minutes, at least 5 minutes) or more.

When particles of an analyte are continuously introduced for an extended duration of time, spectrometer 100 can also adjust the duty cycle of ion source 102 so that ion source 102 generates ions for an extended period of time (e.g., a portion of, or the entire, period during which analyte particles are introduced). As explained previously, the duty cycle of ion source 102 can generally be adjusted (e.g., by adjusting time duration 274 in FIG. 2I, for example) to control the time period during which ions are produced. In some embodiments, spectrometer 100 is configured to adjust the duty cycle of ion source 102 so that ions are continuously generated by ion source 102 for 10 s or more (e.g., 20 s or more, 30 s or more, 40 s or more, 50 s or more, 1 minute, 1.5 minutes or more, 2 minutes or more, 3 minutes or more, 4 minutes or more 5 minutes or more).

As discussed above, spectrometer 100 achieves both compactness and low power operation by eliminating certain high power-consumption components that are typically found in conventional mass spectrometers. Among these components, vacuum pumps—in particular, turbomolecular pumps—are both heavy, and consume large quantities of power. Spectrometer 100 does not include such pumps, and as a result, is both significantly lighter, and consumes significantly less power, than conventional mass spectrometers.

Using pressure regulation subsystem 120, spectrometer 100 operates at internal gas pressures that are significantly higher than the internal gas pressures of conventional mass spectrometers. In general, at higher pressures, the resolution of a mass spectrometer is degraded due to a variety of mechanisms, including collision-induced line broadening and ion-neutral charge exchange. Thus, to obtain the highest possible resolution mass spectra, the internal gas pressure in a mass spectrometer should be maintained as low as possible.

However, as explained above, useful information about a sample, including information about the identity of the sample, can be obtained and provided to a user by measuring the sample's mass spectrum when the mass spectrometer's resolution is worse than the best possible value. In particular, sufficiently precise correspondences between measured mass spectral information and reference information can be achieved even when mass spectrometer 100 operates at a higher internal gas pressure—and therefore a poorer resolution—than conventional mass spectrometers.

Because mass spectrometer 100 operates at lower resolution than a conventional mass spectrometer, mass spectrometer 100 can be further configured, in some embodiments, to adaptively adjust the operation of certain components to further reduce its overall power consumption. Components are adaptively operated either to achieve a target resolution in the measured mass spectral information, or to achieve a sufficient correspondence between the mass spectral information and reference information on a known substance or condition.

Figure 8C:
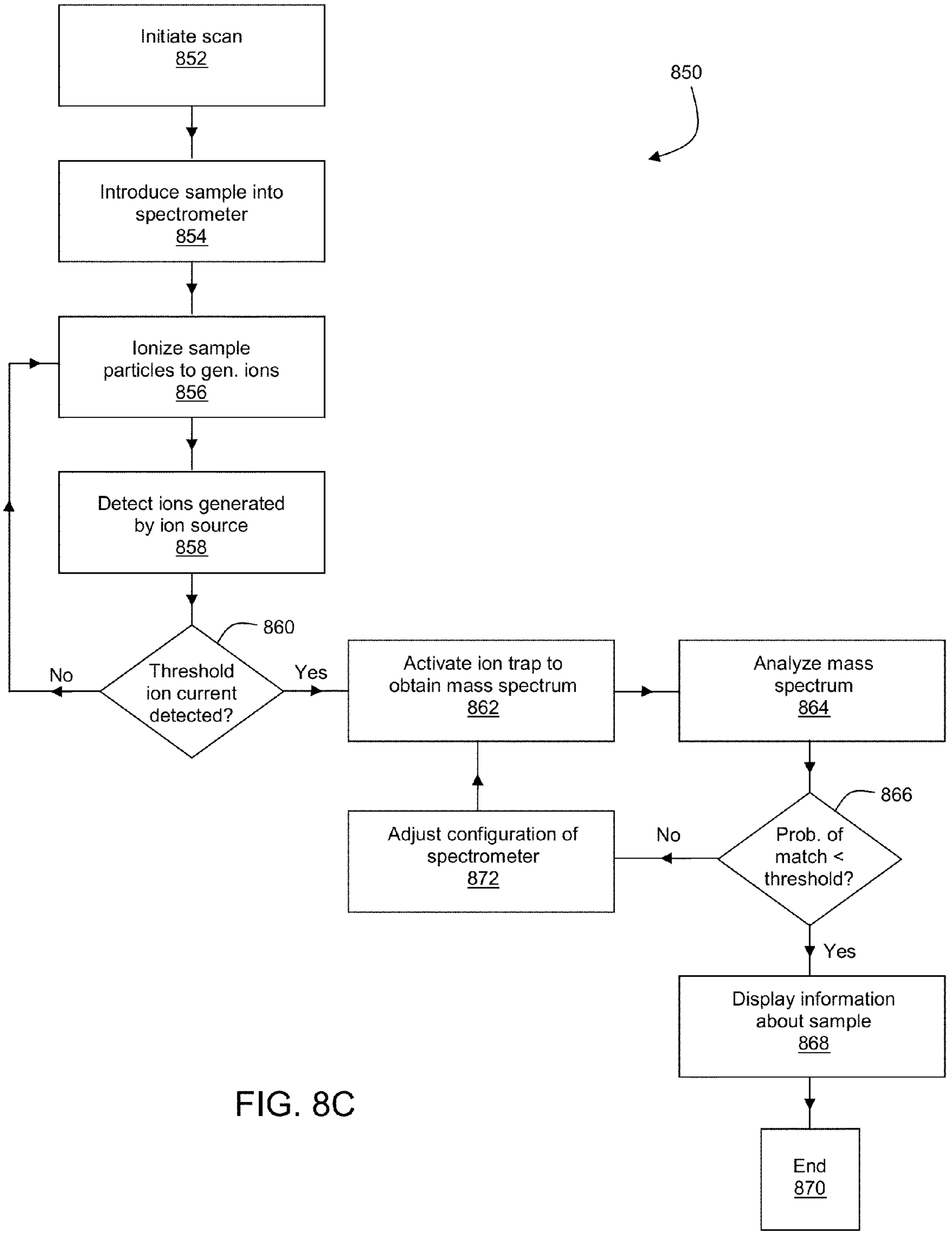
FIG. 8C is a flow chart showing a series of steps for measuring mass spectral information and adjusting a configuration of a mass spectrometer.

FIG. 8C shows a flow chart 850 that includes a series of steps for adaptive operation of mass spectrometer 100 to achieve a sufficient correspondence between measured mass spectral information and reference information on a known substance or condition. The target resolution can be set by the user of mass spectrometer 100 (e.g., either through a user-defined setting, or through visual inspection of measured mass spectral information), or set automatically by controller 108. In first step 852, a scan is initiated in the same manner as disclosed above in connection with step 802. Next, in step 854, a sample is introduced into spectrometer 100 in the same manner as disclosed above in connection with step 804. In step 856, sample particles are ionized to produce ions, as disclosed above in connection with step 806.

Then, in step 858, sample ions generated by ion source 102 are detected using detector 118. Step 858 can be performed without activating ion trap 104 to trap or selectively eject ions. Instead, in step 858, ions generated by ion source 102 pass directly through end cap electrodes 304 and 306 of ion trap 104, and are incident on detector 118. Voltage source 106 can be configured to apply electrical potentials to electrodes in ion source 102 and detector 118 to create an electric field between ion source 102 and detector 118 to promote the transport of ions.

Next, in step 860, controller 108 determines whether a threshold ion current has been detected by detector 118. The threshold ion current can be a user-defined and/or user-adjustable setting of spectrometer 100. Alternatively, the threshold ion current can be determined automatically by spectrometer 100 based on, for example, a measurement of dark current and/or noise in detector 118 by controller 108. If the threshold current has not yet been reached, ionization of the sample and detection of sample ions continues in steps 856 and 858. Alternatively, if the threshold ion current has been reached, controller 108 activates ion trap 104 in step 862 to trap and selectively eject ions into detector 118. The ejected ions are detected by detector 118, and the mass spectral information is analyzed by controller 108 in step 864 in an attempt to determine information about an identity of the sample.

As part of the analysis in step 864, controller 108 can determine a probability that the measured mass spectral information for the sample originates from a known substance or condition. In step 866, controller 108 compares the determined probability to a threshold probability to determine whether the analysis of the mass spectral information is limited by the resolution of spectrometer 100. If the probability is larger than the threshold value, then controller 108 displays information about the sample (e.g., an identity of the sample and/or information about an identity of the sample) using display 116, and the process concludes at step 870.

However, if the probability is less than the threshold probability value in step 866, then the analysis of the mass spectral information may be limited by the resolution of spectrometer 100. To increase the enhance the resolution of spectrometer 100, controller 108 adaptively adjusts the configuration of the spectrometer, before control returns to step 862.

Controller 108 is configured to adjust the configuration in a variety of ways to increase the resolution of spectrometer 100. In some embodiments, controller 108 is configured to activate buffer gas source 150 to introduce buffer gas particles into gas path 128. The introduced buffer gas particles can include, for example, nitrogen molecules, hydrogen molecules, or atoms of a noble gas such as helium, argon, neon, or krypton. Buffer gas source 150 can include a replaceable cylinder containing the buffer gas particles, and a valve connected to controller 108 via control line 127*g*, or a buffer gas generator. Controller 108 can be configured to activate the valve in buffer gas source 150 so that controlled quantities of buffer gas particles are released into gas path 128. Once released into gas path 128, the buffer gas particles mix with the ions generated by ion source 102, and facilitate trapping and selective ejection of the ions into detector 118, thereby increasing the resolving power of spectrometer 100.

In certain embodiments, controller 108 reduces the internal gas pressure in spectrometer 100 to increase the resolving power of spectrometer 100. To reduce the internal gas pressure, controller 108 activates pressure regulation subsystem 120 via control line 127*d*. Alternatively, or in addition, controller 108 can close valve 129 to reduce the internal gas pressure. In some embodiments, valve 129 can be alternately opened and closed in pulsed fashion with a particular duty cycle to reduce the internal gas pressure. In certain embodiments, spectrometer 100 can include multiple sample inlets, and valve 129 can be closed to seal sample inlet 124, while another in-line valve in a smaller diameter sample inlet can be opened. By using a different sample inlet to reduce the gas pressure in spectrometer 100, no change in pumping speed is necessary. Reducing the internal gas pressure in spectrometer 100 increases the resolution of spectrometer 100 by reducing the frequency of collisions between ions in ion source 102, ion trap 104, and detector 118.

In some embodiments, to improve the resolution of spectrometer 100, controller 108 increases the frequency at which the electrical potential applied to center electrode 302 changes. By decreasing the rate at which the applied potential changes, the rate at which the internal electric field within electrode 302 changes is also decreased. As a result, the selectivity with which ions are ejected from ion trap 104 increases, improving the resolution of spectrometer 100.

In certain embodiments, controller 108 is configured to change the axial electric field frequency or amplitude within ion trap 104 to change the resolution of spectrometer 100. Changing the axial electric field in ion trap 104 can shift the ejection boundary of the ion trap, thereby either extending or reducing the high-mass range of the spectrometer and modifying the resolving power and/or resolution of spectrometer 100.

In some embodiments, controller 108 is configured to increase the resolution of spectrometer 100 by changing a duty cycle of ion source 102. Reducing the ionization time has been observed experimentally to improve resolution in mass spectrometer 100. Thus, referring to graph 270 in FIG. 2I, by reducing the duration of time 274 during which bias potential 272 is applied to ion source 102 (e.g., reducing the duty cycle of ion source 102), the resolution of spectrometer 100 can be increased.

Conversely, reducing the resolution of spectrometer 100 can also be useful in certain situations. For example, referring to graphs 270 and 280 in FIG. 2I, by increasing the duration of time 274 during which bias potential 272 is applied to ion source 102 (e.g., increasing the duty cycle of ion source 102), and therefore reducing the duration of time over which the amplitude of the potential applied to electrode 302 of ion trap 104 is increased (e.g., during time periods 284 and 286 in graph 280), the resolution of spectrometer 100 is reduced, but the sensitivity of spectrometer 100 increases, thereby increasing the signal-to-noise ratio of the mass spectral information measured using spectrometer 100. The increased sensitivity can be particularly useful when attempting to detect very low concentrations of certain substances.

In certain embodiments, controller 108 is configured to increase the resolution of spectrometer 100 by increasing the duration of time over which the electrical potential applied to electrode 302 of ion trap 104 is increased (e.g., interval 286 in FIG. 2I). By increasing the sweep duration, circulating ions are ejected more slowly from ion trap 104, increasing the resolution of the measured mass spectral information.

In some embodiments, controller 108 is configured to change the resolution of spectrometer 100 by adjusting the ramp profile associated with the amplitude sweep of the potential applied to electrode 302. As shown in graph 280 of FIG. 2I, the amplitude of the potential applied to electrode 302 typically increases according to a linear ramp function. More generally, however, controller 108 can be configured to increase the amplitude of the potential applied to electrode 302 according to a different ramp profile. For example, the ramp profile can be adjusted by controller 108 so that the applied potential increases according to a series of different linear ramp profiles, each of which represents a different rate of increase of the potential. As another example, the ramp profile can be adjusted so that the amplitude of the potential applied to electrode 302 increases according to a nonlinear function such as an exponential function or a polynomial function.

As discussed above, controller 108 is configured to take any one or more of the above actions to change the resolution of spectrometer 100. The order in which these actions are taken can either be determined by spectrometer 100, or by user preferences. For example, in some embodiments, a user of spectrometer 100 can designate which of the above steps, and in which order, controller 108 takes to increase the resolution and/or reduce the power consumption of spectrometer 100. The user selections can be stored as a set of preferences in storage unit 114. Alternatively, in some embodiments, the order of actions taken by controller 108 can be permanently encoded into the logic circuitry of controller 108, or stored as non-modifiable settings in storage unit 114.

In certain embodiments, controller 108 can determine an order of actions based on other considerations. For example, to ensure that spectrometer 100 consumes as little electrical power as possible, the order of actions taken by controller 108 to improve the resolving power of spectrometer 100 can be determined according to increase in power consumption as a result of each action. Controller 108 can be configured with information about how each of the actions disclosed above increases overall power consumption, and can select an appropriate order of actions based on the power consumption information, with actions that cause the smallest increases in power consumption occurring first. Alternatively, controller 108 can be configured to measure the increase in power consumption associated with each of the actions, and can select an appropriate order of actions based on the measured power consumption values.

Although in flow chart 850 adjustments to the configuration of spectrometer 100 are based on the probability that the measured mass spectral information corresponds to known reference information, adjustments to the configuration of spectrometer 100 can also be made based on other criteria. In some embodiments, for example, adjustments to the configuration of spectrometer 100 can be made based on whether or not a target resolution of spectrometer 100 has been achieved. In step 864, controller 108 determines the actual resolution of spectrometer 100 based on the measured mass spectral information (e.g., based on the largest FWHM of a single ion peak within the measurement window of spectrometer 100). In step 866, the actual resolution is compared by controller 108 to a target resolution for spectrometer 100. If the actual resolution is less than the target resolution, then in step 872, controller 108 adjusts the configuration of spectrometer 100, as discussed above, to improve the resolution of the spectrometer.

Hardware, Software, and Electronic Processing

Any of the method steps, features, and/or attributes disclosed herein can be executed by controller 108 (e.g., electronic processor 110 of controller 108) and/or one or more additional electronic processors (such as computers or preprogrammed integrated circuits) executing programs based on standard programming techniques. Such programs are designed to execute on programmable computing apparatus or specifically designed integrated circuits, each comprising a processor, a data storage system (including memory and/or storage elements), at least one input device, and at least one output device, such as a display or printer. The program code is applied to input data to perform functions and generate output information which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD-ROM or magnetic diskette) that, when read by a computer, can cause the processor in the computer to perform the analysis and control functions described herein.

Other Embodiments

In some embodiments, spectrometer 100 is configured to operate at even higher gas pressures, e.g., at pressures up to 1 atm (e.g., 760 Torr). That is, the internal gas pressure in one or more of ion source 102, ion trap 104, and/or detector 118 is between 100 Torr and 760 Torr (e.g., 200 Torr or more, 300 Torr or more, 400 Torr or more, 500 Torr or more, 600 Torr or more) when spectrometer 100 is detecting ions according to a mass-to-charge ratio for the ions.

Certain components disclosed herein are already well suited to operation at pressures of up to 1 atm (and even higher pressures). For example, some of the ion sources disclosed herein, such as glow discharge ion sources, can operate at pressures up to 1 atm with little or no modification. In addition, certain types of detectors such as Faraday detectors (e.g., Faraday cup detectors and arrays thereof) can also operate at pressures of up to 1 atm with little or no modification.

The ion traps disclosed herein can be modified for operation at pressures of up to 1 atm. For example, referring to FIG. 3A, to operate at pressures of 1 atm, dimension $c_0$ of ion trap 104 should be reduced to between 1.5 microns and 0.5 microns (e.g., between 1.5 microns and 0.7 microns, between 1.2 microns and 0.5 microns, between 1.2 microns and 0.8 microns, approximately 1 micron). Further, to operate at gas pressure of up to 1 atm, voltage source 106 can be modified to provide sweeping voltages to ion trap 104 that repeat with a frequency in the GHz range, e.g., a frequency of 1.0 GHz or more (e.g., 1.2 GHz or more, 1.4 GHz or more, 1.6 GHz or more, 2.0 GHz or more, 5.0 GHz or more, or even more). With these modifications to ion trap 104 and voltage source 106, mass spectrometer 100 can operate at pressures of up to 1 atm, so that the use of pressure regulation subsystem 120 is significantly curtailed. In some embodiments, it can even be possible to eliminate pressure regulation subsystem 120 from spectrometer 100, e.g., so that spectrometer 100 is a pumpless spectrometer.

A number of embodiments have been described. Nevertheless, it will be understood that various modifications may be made without departing from the spirit and scope of the disclosure. Accordingly, other embodiments are within the scope of the following claims.

What is claimed is:

1. A mass spectrometer, comprising:
an ion source;
an ion trap;
an ion detector;
a pressure regulation system;
a voltage source connected to the ion source, the ion trap, the ion detector, and the pressure regulation system; and
a controller connected to the ion source, the ion trap, the ion detector, and the voltage source,
wherein during operation of the mass spectrometer, the controller is configured to:
activate the ion source to generate ions from gas particles;
activate the ion detector to detect ions generated by the ion source; and
adjust a resolution of the mass spectrometer based on the detected ions;
wherein the controller is configured to adjust the resolution of the spectrometer by adjusting values of multiple operating parameters, and to determine an order in which the values are adjusted based on information about changes in power consumption associated with adjusting each of the parameters.

2. The mass spectrometer of claim 1, wherein the controller is configured to:
repeatedly apply an electrical potential using the voltage source to a central electrode of the ion trap to eject ions from the trap, the repeated applications of the electrical potential defining a repetition frequency of the electrical potential; and
adjust the resolution by changing the repetition frequency of the electrical potential.

3. The mass spectrometer of claim 2, wherein the controller is configured to increase the resolution by increasing the repetition frequency of the electrical potential.

4. The mass spectrometer of claim 2, wherein the controller is configured to:
repeatedly apply an electrical potential difference between electrodes of the ion source using the voltage source to generate the ions, the repeated applications of the electrical potential defining a repetition frequency of the ion source; and
adjust the resolution by changing the repetition frequency of the ion source.

5. The mass spectrometer of claim 4, wherein the controller is configured to synchronize the repetition frequency of the ion source and the repetition frequency of the electrical potential applied to the central electrode of the ion trap.

6. The mass spectrometer of claim 1, wherein the controller is configured to adjust the resolution by changing a maximum amplitude of an electrical potential applied to a central electrode of the ion trap by the voltage source.

7. The mass spectrometer of claim 1, wherein the controller is configured to:
apply an axial electrical potential difference between electrodes at opposite ends of the ion trap using the voltage source; and
adjust the resolution by changing a magnitude of the axial electrical potential difference.

8. The mass spectrometer of claim 7, wherein the controller is configured to increase the resolution by increasing a magnitude of the axial electrical potential difference.

9. The mass spectrometer of claim 1, wherein the controller is configured to:
repeatedly apply an electrical potential difference between electrodes of the ion source using the voltage source, wherein:
the repeated applications of the electrical potential define a repetition period of the ion source; and
the repetition period comprises a first time interval during which the electrical potential difference is applied between the electrodes of the ion source, and a second time interval during which the electrical potential difference is not applied between the electrodes of the ion source; and adjust the resolution by adjusting a duty cycle of the ion source, wherein the duty cycle corresponds to a ratio of the first time interval to the repetition period.

10. The mass spectrometer of claim 9, wherein the controller is configured to increase the resolution by decreasing the duty cycle of the ion source.

11. The mass spectrometer of claim 1, further comprising:

a pluggable module comprising the ion source, the ion trap, the detector, and a first plurality of electrodes connected to the ion source, the ion trap, and the detector; and a support base comprising a second plurality of electrodes configured to engage the first plurality of electrodes, wherein the voltage source and the controller are mounted on the support base; and wherein the pluggable module is configured to releasably connect to the support base.

12. The mass spectrometer of claim 1, wherein a maximum dimension of the mass spectrometer is less than 35 cm.

13. The mass spectrometer of claim 1, wherein a total mass of the mass spectrometer is less 5 than 4.5 kg.

14. The mass spectrometer of claim 1, wherein the controller is configured to measure power consumption values associated with each of the operating parameters to determine the information about changes in power consumption.

15. The mass spectrometer of claim 1, wherein the mass spectrometer comprises the information about changes in power consumption in a storage unit, and wherein the controller is configured to retrieve the information to determine the order.

16. A method, comprising:

introducing gas particles into an ion source of a mass spectrometer;

generating ions from the gas particles;

detecting the ions using a detector of the mass spectrometer; and adjusting a resolution of the mass spectrometer based on the detected ions, wherein adjusting the resolution comprises:

adjusting values of multiple operating parameters of the mass spectrometer; and determining an order in which the values are adjusted based on information about changes in power consumption associated with adjustments of each of the parameters.

17. The method of claim 16, wherein the generated ions are trapped in an ion trap prior to detection, the method further comprising:

repeatedly applying an electrical potential to a central electrode of the ion trap to eject ions from the trap for detection, the repeated applications of the electrical potential defining a repetition frequency of the electrical potential; and adjusting the resolution by changing the repetition frequency of the electrical potential.

18. The method of claim 17, further comprising increasing the resolution by increasing the repetition frequency of the electrical potential.

19. The method of claim 17, further comprising:

repeatedly applying an electrical potential difference between electrodes of the ion source to generate the ions, the repeated applications of the electrical potential defining a repetition frequency of the ion source; and adjusting the resolution by changing the repetition frequency of the ion source.

20. The method of claim 19, further comprising synchronizing the repetition frequency of the ion source and the repetition frequency of the electrical potential applied to the central electrode of the ion trap.

21. The method of claim 16, further comprising adjusting the resolution by changing a maximum amplitude of an electrical potential applied to a central electrode of the ion trap.

22. The method of claim 16, further comprising:

applying an axial electrical potential difference between electrodes at opposite ends of the ion trap; and adjusting the resolution by changing a magnitude of the axial electrical potential difference.

23. The method of claim 22, further comprising increasing the resolution by increasing a magnitude of the axial electrical potential difference.

24. The method of claim 16, further comprising:

repeatedly applying an electrical potential difference between electrodes of the ion source, wherein:

the repeated applications of the electrical potential define a repetition period of the ion source; and the repetition period comprises a first time interval during which the electrical potential difference is applied between the electrodes of the ion source, and a second time interval during which the electrical potential difference is not applied between the electrodes of the ion source; and adjusting the resolution by adjusting a duty cycle of the ion source, wherein the duty cycle corresponds to a ratio of the first time interval to the repetition period.

25. The method of claim 24, further comprising increasing the resolution by decreasing the duty cycle of the ion source.

26. The method of claim 16, further comprising measuring power consumption values associated with each of the operating parameters to determine the information about changes in power consumption.

27. The method of claim 16, further comprising retrieving the information about changes in power consumption from a storage unit to determine the order.

* * * * *

UNITED STATES PATENT AND TRADEMARK OFFICE

CERTIFICATE OF CORRECTION

PATENT NO. : 9,099,286 B2
APPLICATION NO. : 13/732066
DATED : August 4, 2015
INVENTOR(S) : Christopher D. Brown et al.

It is certified that error appears in the above-identified patent and that said Letters Patent is hereby corrected as shown below:

In The Claims

Column 66

Line 8 (Approx.), in Claim 1, after "ions;" insert -- and --

Column 67

Line 20 (Approx.), in Claim 13, delete "less 5 than" and insert -- less than --

Signed and Sealed this
Twelfth Day of January, 2016

Michelle K. Lee
*Director of the United States Patent and Trademark Office*